United States Patent
Shiga et al.

(10) Patent No.: US 7,617,318 B2
(45) Date of Patent: Nov. 10, 2009

(54) STORAGE SYSTEM AND A STORAGE MANAGEMENT SYSTEM

(75) Inventors: Kenta Shiga, Yokohama (JP); Daiki Nakatsuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 369 days.

(21) Appl. No.: 10/971,904

(22) Filed: Oct. 21, 2004

(65) Prior Publication Data

US 2006/0047907 A1 Mar. 2, 2006

(30) Foreign Application Priority Data

Aug. 30, 2004 (JP) ............................ 2004-250571

(51) Int. Cl.
*G06F 15/16* (2006.01)

(52) U.S. Cl. .................................................... 709/228

(58) Field of Classification Search ................. 711/114, 711/203–208; 709/228, 229
See application file for complete search history.

(56) References Cited

U.S. PATENT DOCUMENTS

| | | | |
|---|---|---|---|
| 6,597,956 B1 | 7/2003 | Aziz et al. | |
| 7,093,035 B2 * | 8/2006 | Hashimoto | ............... 710/36 |
| 2003/0055933 A1 | 3/2003 | Ishizaki et al. | |
| 2003/0085914 A1 | 5/2003 | Takaoka et al. | |
| 2003/0208589 A1 | 11/2003 | Yamamoto | |
| 2004/0117546 A1 | 6/2004 | Mizuno | |
| 2005/0257274 A1 * | 11/2005 | Shiga et al. | ............... 726/28 |
| 2006/0004876 A1 * | 1/2006 | Matsunami et al. | ......... 707/200 |
| 2006/0031636 A1 * | 2/2006 | Mizuno | ..................... 711/114 |

OTHER PUBLICATIONS

European Patent Office (EPO) Search Report for EPO patent application EP04026460 Sep. 17, 2008).

* cited by examiner

*Primary Examiner*—Christian P Chace
*Assistant Examiner*—Gary W Cygiel
(74) *Attorney, Agent, or Firm*—Townsend and Townsend and Crew LLP

(57) ABSTRACT

A storage device managing one or more logical volumes is connected with a name management device through an IP-SAN 6 composed of a switch. The storage device stores a topology table saving connecting relation among physical ports of host, physical ports of the storage device and physical ports of the switch, reads an identifier of the host and an identifier of the logical volume, selects a unused first physical port of the switch by referring to the topology table, selects a second physical port of the switch connected with the storage device, registers a group composed of the host and the logical volume with the name management device, and executes a configuration of allowing packets to be transferred between the first and the second physical ports with respect to the switch.

16 Claims, 27 Drawing Sheets

FIG.5A

| VLAN ID (1201) | STATE (1202) |
|---|---|
| 1 | used |
| 2 | unused |
| ... | ... |

FIG.5B

| SWITCH ID (1231) | STATE (1232) |
|---|---|
| SW01 | 192.168.0.1 |
| SW02 | 192.168.0.2 |
| ... | ... |

FIG.5C

| STORAGE-PORT ID (1251) | IP ADDRESS (1252) | MAC ADDRESS (1253) | SUBNET MASK (1254) | GATEWAY (1255) |
|---|---|---|---|---|
| 1 | 172.16.0.1 | 0000E2929337 | 255.255.255.0 | 172.16.0.254 |
| 2 | 172.16.0.2 | 0000E2929338 | 255.255.255.0 | 172.16.0.254 |
| ... | ... | ... | ... | ... |

FIG.5D

| TARGET (1261) | STORAGE-PORT ID (1262) | VLAN ID (1263) |
|---|---|---|
| iqn.2004-06.com.hitachi:tar01 | 1 | 1 |
| iqn.2004-06.com.hitachi:tar02 | 2 | 2 |
| ... | ... | ... |

FIG.6A

| TARGET | LUN |
|---|---|
| iqn.2004-06.com.hitachi:tar01 | 1 |
| iqn.2004-06.com.hitachi:tar02 | 2 |
| . . . | . . . |

| INITIATOR | TARGET |
|---|---|
| iqn.1999-08.com.abc:host01 | iqn.2004-06.com.hitachi:tar01 |
| iqn.1999-08.com.abc:host02 | iqn.2004-06.com.hitachi:tar02 |
| . . . | . . . |

| SWITCH ID | STORAGE -PORT ID | CONNECTED DEVICE TYPE | CONNECTED DEVICE ID | CONNECTED PORT ID |
|---|---|---|---|---|
| SW01 | 1 | host | iqn.1999-08.com.abc:host01 | null |
| SW01 | 2 | null | null | null |
| . . . | . . . | . . . | . . . | . . . |
| SW01 | 13 | storage | STR01 | 1 |
| . . . | . . . | . . . | . . . | . . . |

| SWITCH-PORT ID (3211) | VLAN ID (3212) | VLAN TYPE (3213) |
|---|---|---|
| 1 | 1 | port |
| . . . | . . . | . . . |
| 13 | 1,2 | tag |
| . . . | . . . | . . . |

FIG.7B

| SWITCH-PORT ID (3221) | MAC ADDRESS (3222) |
|---|---|
| 1 | 0000E2929337 |
| 13 | 0000E2929338 |
| . . . | . . . |

FIG.7C

| iSCSI NODE (5211) | NODE TYPE (5212) | IP ADDRESS (5213) |
|---|---|---|
| iqn.2004-06.com.hitachi:tar01 | target | 172.16.0.1 |
| iqn.1999-08.com.abc:host01 | initiatoer | 172.16.0.128 |
| . . . | . . . | . . . |

FIG.7D

| DOMAIN ID (5221) | iSCSI NODE (5222) |
|---|---|
| DD1 | iqn.2004-06.com.hitachi:tar01 |
| DD1 | iqn.1999-08.com.abc:host01 |
| . . . | . . . |

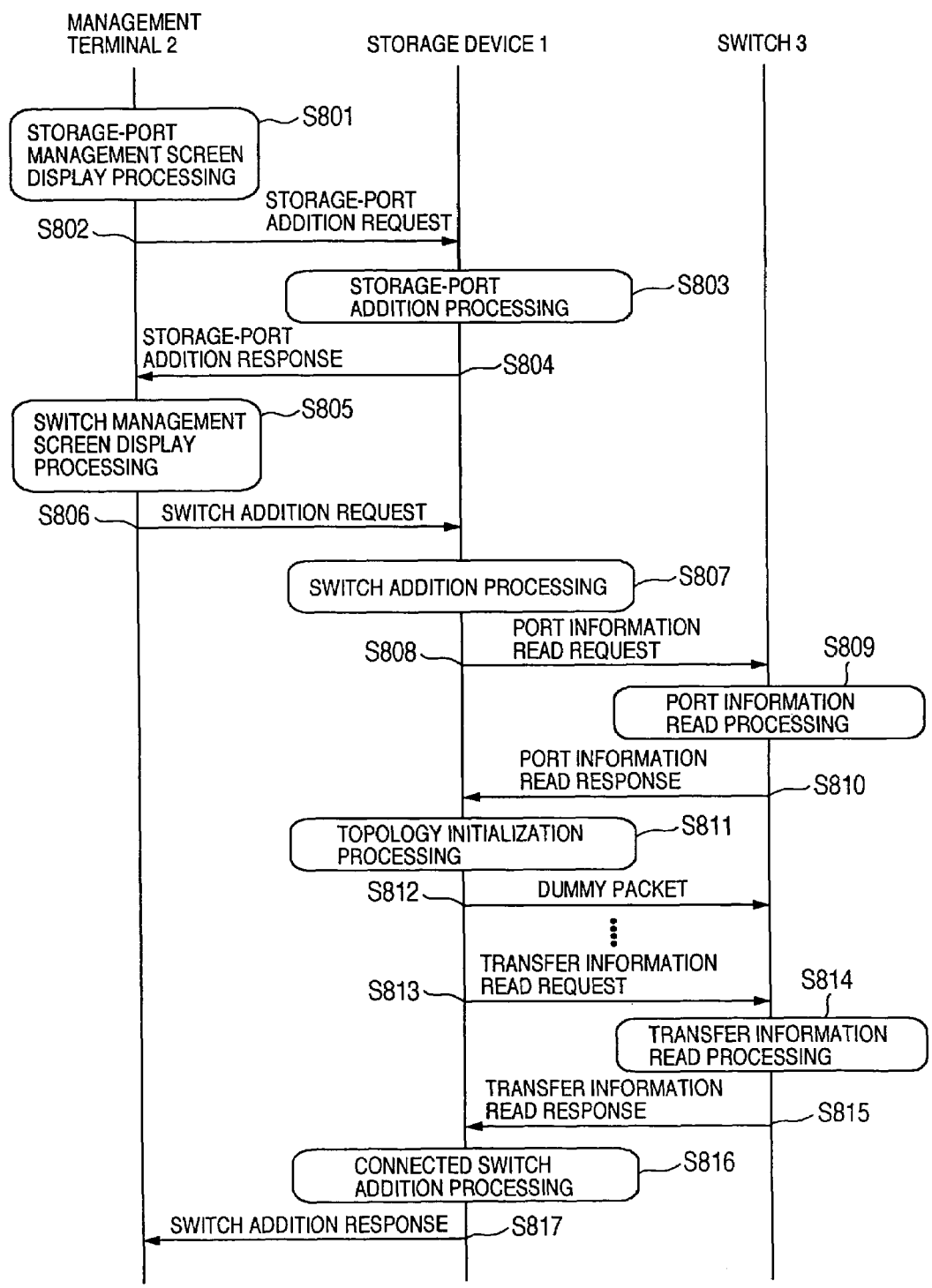

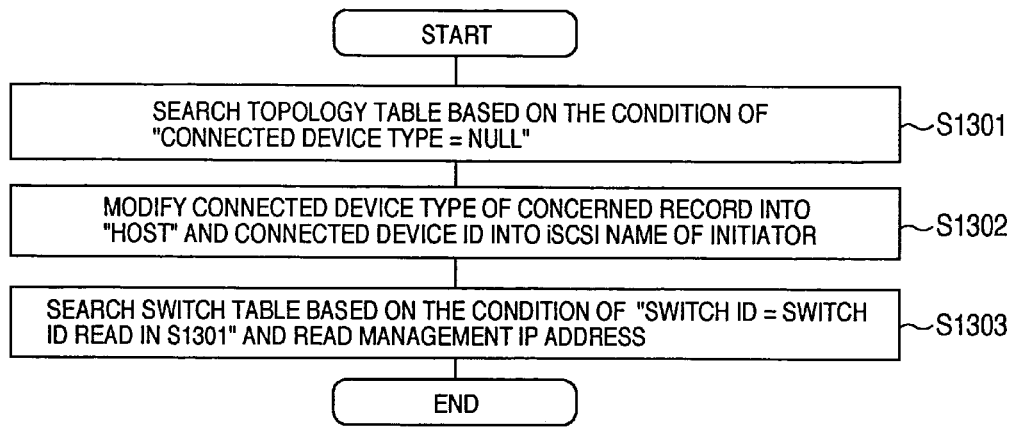
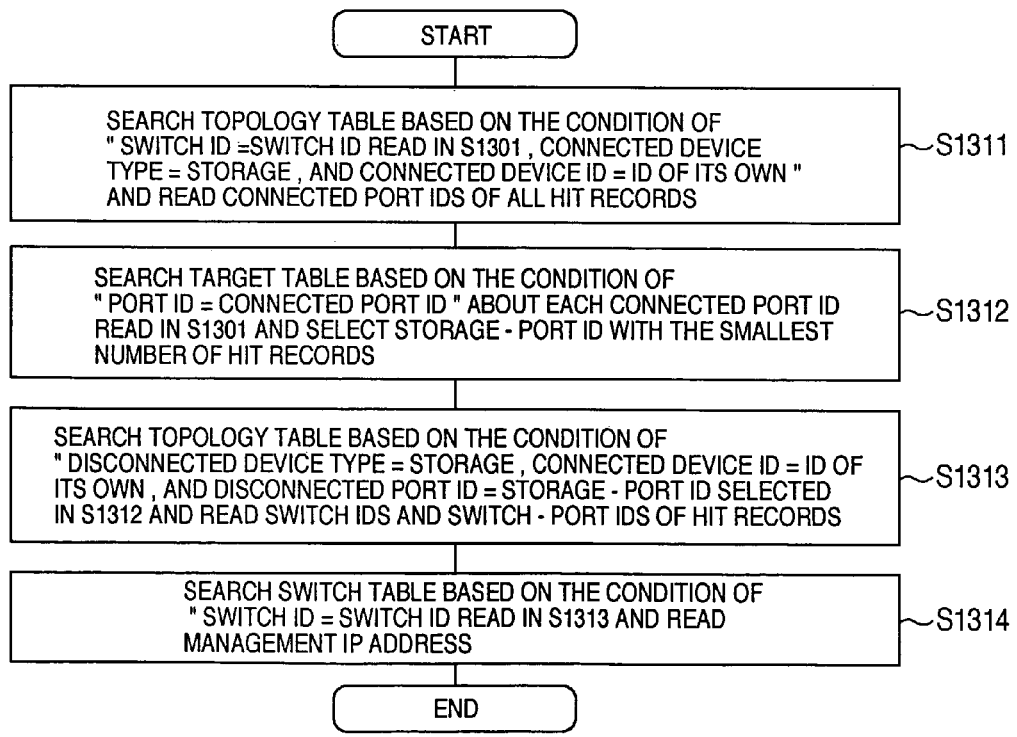

FLOWCHART SHOWING OPERATING ROUTINE OF HOST - SIDE PORT ASSIGNING PROCESSING 2

FLOWCHART SHOWING OPERATING ROUTINE OF STORAGE - SIDE PORT ASSIGNING PROCESSING 2

NEW VLAN ASSIGNING PROCESSING

VLAN SEARCH PROCESSING 1

VLAN SEARCH PROCESSING 2

SECOND COMMUNICATION SEQUENCE OF PATH ADDITION

THIRD COMMUNICATION SEQUENCE OF PATH ADDITION

FIRST COMMUNICATION SEQUENCE OF PATH DELETION

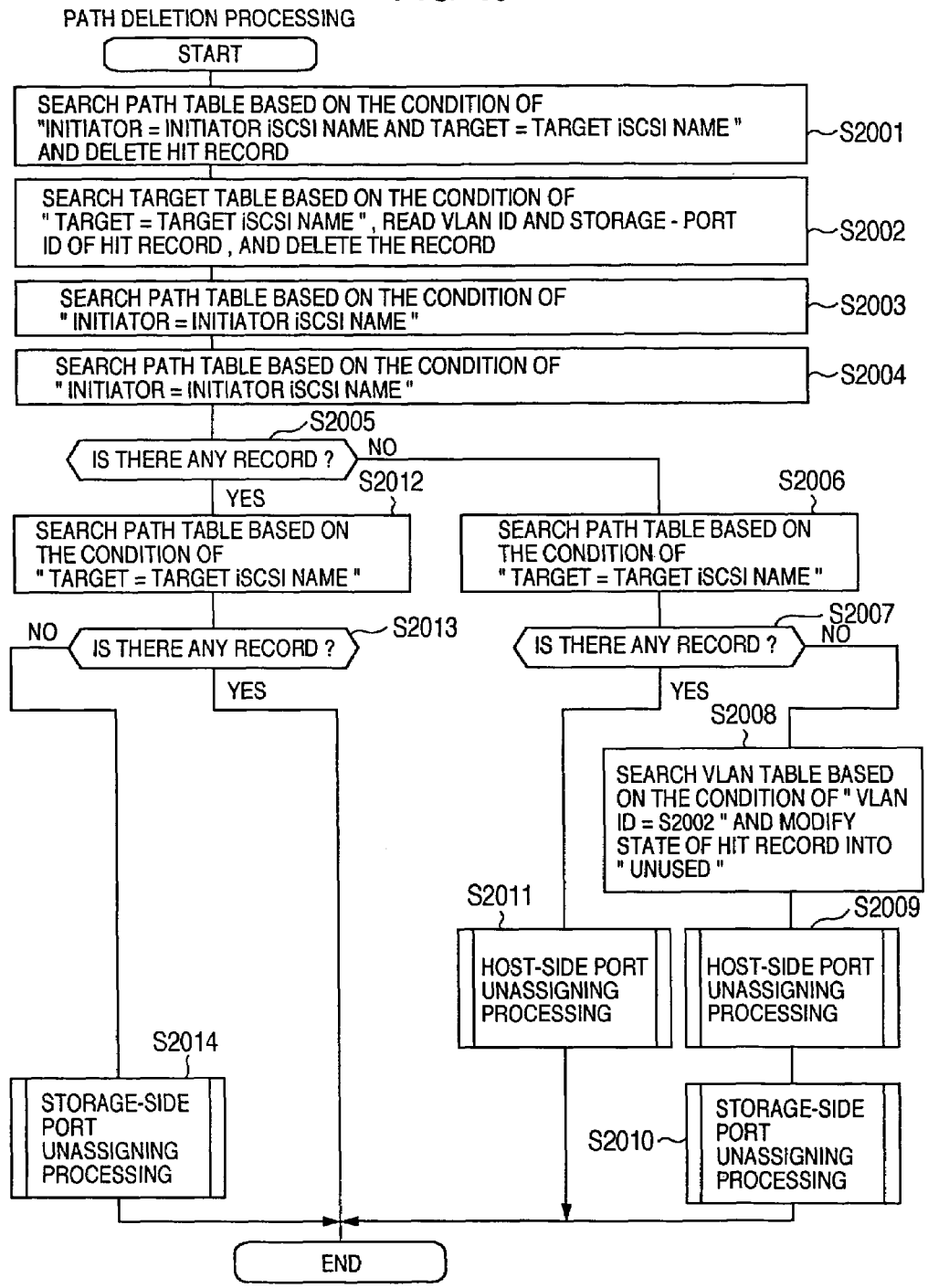

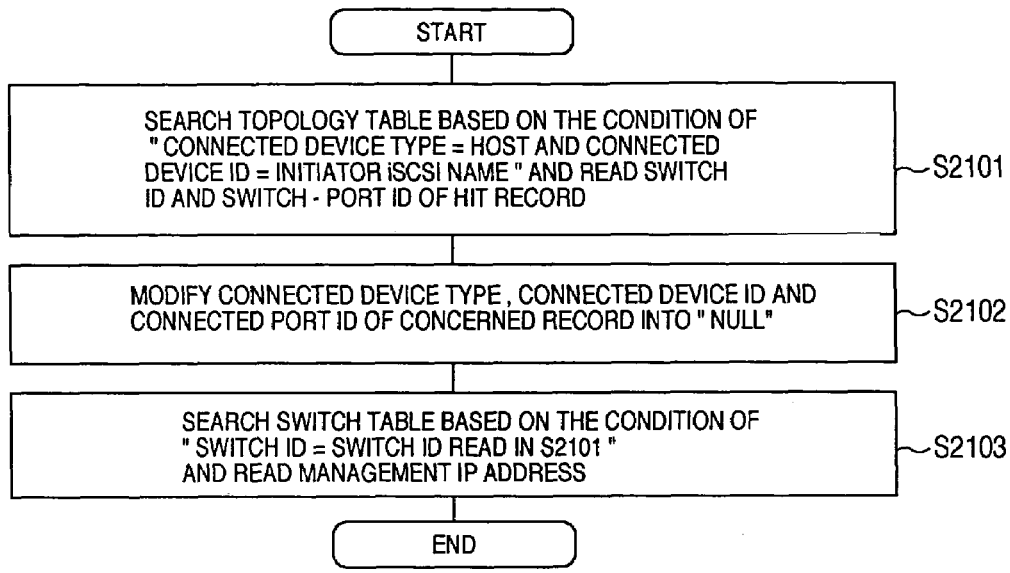
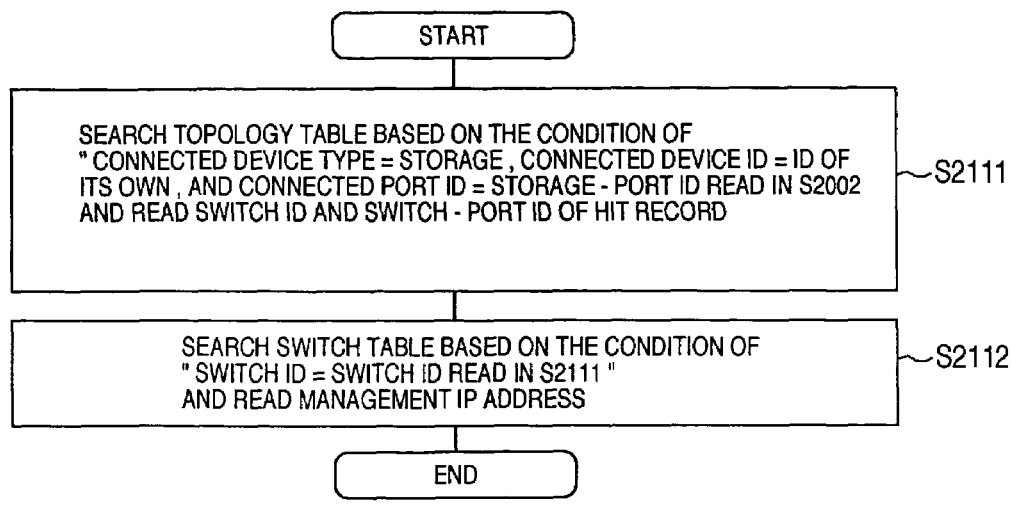

THIRD COMMUNICATION SEQUENCE OF PATH DELETION

| STORAGE ID | MANAGEMENT IP ADDRESS |
|---|---|
| STR1 | 192.168.0.3 |
| STR2 | 192.168.0.4 |
| . . . | . . . |

STORAGE SYSTEM AND A STORAGE MANAGEMENT SYSTEM

INCORPORATION BY REFERENCE

The present application claims priorities From Japanese applications JP 2004-250571 filed on Aug. 30, 2004 the contents of which are hereby incorporated by reference into this applicaton.

BACKGROUND OF THE INVENTION

The present invention relates to a system having one or more storage devices and an information processing apparatus connected with the storage devices through a network.

In place of a configuration having a storage device directly connected with a computer (often referred to as a "host" or a "host computer"), today, another configuration is prevailing in which one or more storage devices are connected with a plurality of hosts through a network. The connecting configuration of storage device(s) through a network is called a storage area network (referred to as a "SAN"). The SAN has been heretofore configured by using fibre channel technology (referred to as "FC"). Hereafter, a SAN configured by using the FC technology is called an FC-SAN.

Conventionally, in the FC-SAN, hosts and storage devices are divided into groups each called a zone through the use of a function of a switch called zoning in order to limit accessible hosts to the storage devices by managing the groups. For example, as a method of setting zones in FC-SAN, the setting method has been disclosed as shown in the Official Gazette of the Japanese Patent Laid-open No. 2003-141055.

On the other hand, today, a remark is focused on an IP-SAN which is a SAN configured by using an IP (Internet Protocol) network. Like the zoning of the FC-SAN, the IP-SAN enables system administrators to limit accessible host(s) to the storage devices through the use of a VLAN (Virtual Local Area Network) of a switch. The VLAN is a function of dividing one physical network into a plurality of logical networks. When one physical IP-SAN is divided into a plurality of logical IP-SANs and the hosts and the storage device to be used by the hosts are connected with each logical IP-SAN, a false access by an administrator of a certain host to a storage device to be used by another host may be prevented. Also, another false access by a cracker having intruded into a host to a storage device to be used by another host may be prevented, for reducing damage caused by cracking into a minimum. Further, if a certain host is infected with a virus, reinfection to another host may be prevented, which also leads to reducing damage caused by the virus to a minimum.

In a case that a host communicates with a storage device through the aforementioned IP-SAN, iSCSI is mainly used. iSCSI (Internet Small Computer System Interface) is a protocol in which SCSI protocol is encapsulated with TCP/IP (Transmission Control Protocol/Internet Protocol). Of devices and software for performing communications through iSCSI, software and devices that send commands for requesting writing or reading of data and that send data to be written are each called an iSCSI initiator. On the other hand, devices and software for receiving the write command and the data from the iSCSI initiator, writing the data onto a storage device, receiving the read command from the iSCSI initiator, reading data from the storage device, and transmitting the data to the iSCSI initiator are each called an iSCSI target. iSCSI initiators and iSCSI targets are collectively called iSCSI nodes. Each iSCSI node has an identifier called an iSCSI name.

When an iSCSI initiator logs in an iSCSI target, the iSCSI name and the IP address of the iSCSI target are required. The obtention of such information of the iSCSI target is called "discovery". For each host operating as an iSCSI initiator, work of specifying the iSCSI name and the IP address of the iSCSI target is quite heavy in load. Hence, one or more methods of not setting the iSCSI target information into the iSCSI initiator but causing the iSCSI initiator to perform the discovery are regulated in the iSCSI protocol.

As one of those methods, a method of connecting a name management device with an IP-SAN may be referred. The name management device is a device that manages combinations of an iSCSI name and an IP address of each iSCSI node. As a communication protocol between the name management device and the iSCSI nodes, iSNSP (Internet Simple Naming Service Protocol), SLP (Service Location Protocol) and so forth may be used. Hereafter, an operating process about the discovery executed through the use of the name management device will be described below. At first, a storage device that operates as an iSCSI target, after started, registers its own iSCSI name and IP address with the name management device. On the other hand, a host that operates as an iSCSI initiator, after started, inquires the iSCSI name and the IP address of the iSCSI target in which the iSCSI initiator may log from the name management device and then obtain such information. As described above, since the name management device unifies management of the combinations of the iSCSI name and the IP address, the work of setting the information to the hosts may be greatly reduced.

SUMMARY OF THE INVENTION

In order to limit iSCSI target(s) about which an iSCSI initiator performs "discovery", a system administrator or the like has to register a discovery domain (DD) with a name management device. The discovery domain corresponds to a set of an iSCSI initiator and an iSCSI target in which the iSCSI initiator may log.

In an IP-SAN, a concerned person with a system (who is representatively referred to as a "system administrator") is required to register these discovery domains without mismatching them to VLANs. For example, in a case that a host operates as an iSCSI initiator, called an "initiator 1", and a storage device operates as an iSCSI target, called a "target A", are connected with the same VLAN, the "initiator 1" logs in the "target A". For reading or writing data, the "initiator 1"and the "target A" are required to belong to the same discovery domain. Conversely, in a case that an iSCSI initiator, called an "initiator 2" and a iSCSI target, called a "target B", belong to the same discovery domain, for executing iSCSI communication between the host operates as the "initiator 2" and the storage device operates as the "target B", those devices are required to be connected with the same VLAN.

As described above, in the IP-SAN, it is required to set the VLANs to a switch for limiting the communication range and to set the discovery domains to the name management device for limiting the discovery range and further to secure the matching of these settings. For setting the VLANs and the discovery domains as keeping both matched to each other, the prior art is insufficient because it is arranged on the presumption that the zone is set merely to the switch. Hence, the prior art is required to be improved.

In order to solve the foregoing problem, therefore, the present inventors propose the below-described invention. The invention discloses a storage system, which comprises a storage means for storing a topology table for saving connecting relation among physical ports of one or more storage devices, physical ports of one or more computers, and physical ports of one or more packet transfer devices, a selecting means for receiving an identifier of a first computer and an identifier of a first logical volume from a system administrator or the like, referring to the topology table, selecting a physical port that is not used as the first physical port out of the physical ports of the packet transfer devices, referring to the topology table, selecting a physical port that is connected with the storage device as the second physical port out of the physical ports of the packet transfer devices, a registration means for registering a group consisting of the first computer and the first logical volume with a name management device, and a setting means for performing such a setting as enabling packet transfer between the first physical port and the second physical port.

Other objects, features and advantages of the invention will become apparent from the following description of the embodiments of the invention taken in conjunction with the accompanying drawings.

BRIEF DESCRIPTION OF THE DRAWINGS

FIG. 5A is a diagram showing an exemplary arrangement of a VLAN table;

FIG. 5B is a diagram showing an exemplary arrangement of a switch table;

FIG. 5C is a diagram showing an exemplary arrangement of a storage-port table;

FIG. 5D is a diagram showing an exemplary arrangement of a target table;

FIG. 6A is a diagram showing an exemplary arrangement of an LU table;

FIG. 6B is a diagram showing an exemplary arrangement of a bus table;

FIG. 6C is a diagram showing an exemplary arrangement of a topology table;

FIG. 7A is a diagram showing an exemplary arrangement of a switch-port table;

FIG. 7B is a diagram showing an exemplary arrangement of a transfer information table;

FIG. 7C is a diagram showing an exemplary arrangement of an iSCSI node table;

FIG. 7D is a diagram-showing -an exemplary arrangement of a domain table;

FIG. 8 is a diagram showing an exemplary communication sequence about registration of information about physical ports of the storage device and registration of information about the switch according to the first embodiment of the present invention;

FIG. 13A is a flowchart showing a process 1 of assigning a port to the host;

FIG. 13B is a flowchart showing a process 1 of assigning a port to the storage device;

FIG. 20 is a flowchart showing an example of an operating process about deletion of a path according to the first embodiment of the present invention;

FIG. 21A is a flowchart showing an example of a process of unassigning the port from the host;

FIG. 21B is a flowchart showing an example of a process of unassigning the port from the storage device;

DESCRIPTION OF THE EMBODIMENTS

Hereafter, each embodiment of the present invention will be described with reference to the appended drawings, in which the same components have the same numbers. The present invention is not limited by the embodiments and covers any kind of applications complying with the spirit of the invention. Unless specified, the number of each component may be singular or plural.

Figure 1:
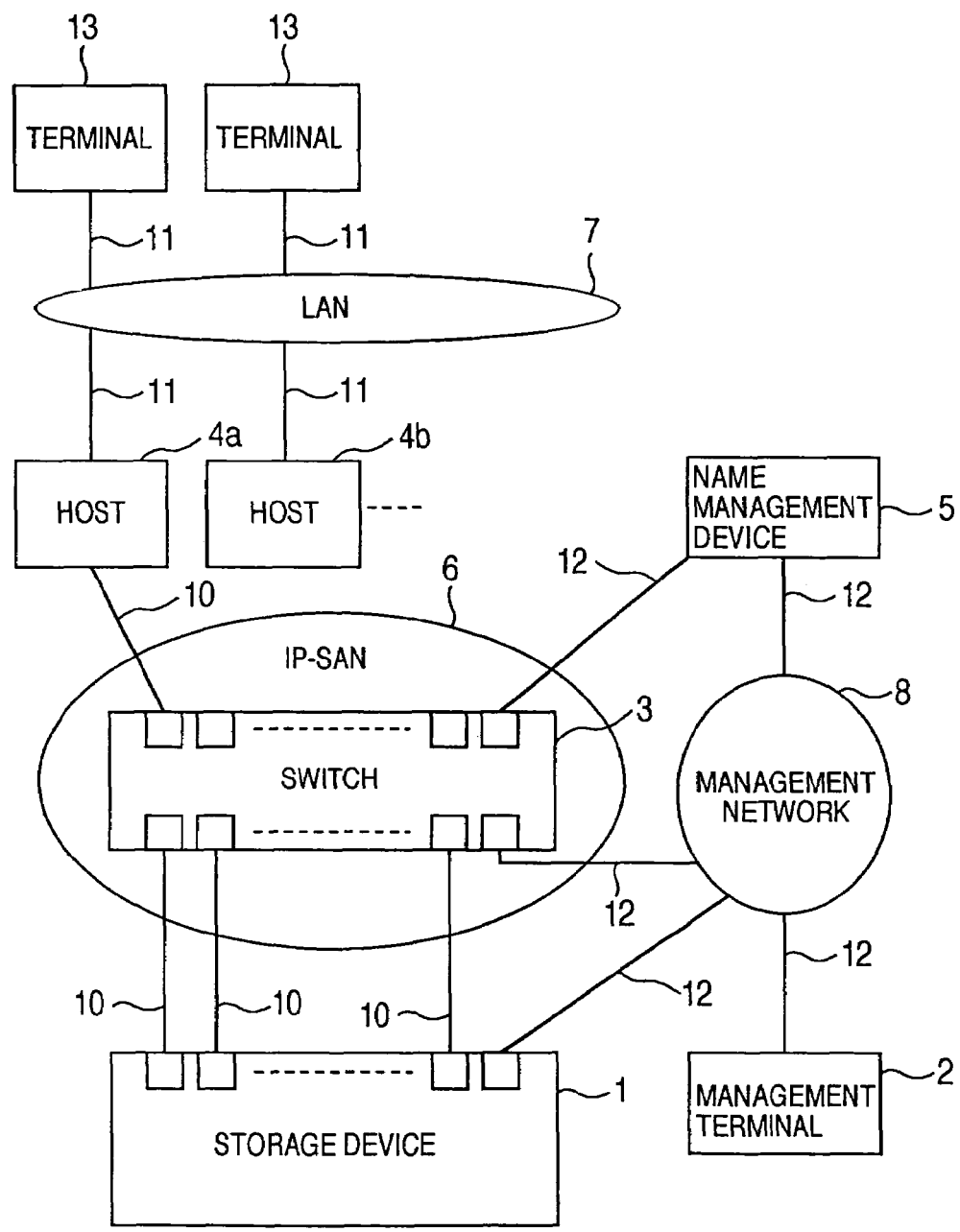
FIG. 1 is a block diagram showing an exemplary system arrangement according to the first embodiment of the present invention.

FIG. 1 shows an exemplary arrangement of the system according to the first embodiment of the invention. The system of this embodiment includes a storage device 1 serving as a storage system having a function of communicating with a host 4 through iSCSI and one or more storage devices, a management terminal 2 to be used by a system administrator for setting the storage device 1, a switch 3 operating as a packet transfer device for transferring packets, hosts 4a and 4b (collectively referred to as the "host 4") having a function of communicating with the storage device 1 through the use of iSCSI, a terminal 13 to be used by an end user or the like for utilizing services provided by the host 4, a name management device 5 for unifying management of the iSCSI names of the host 4 and the storage device 1, an IP-SAN 6 operating as an IP network for communication between the host 4 and the storage device 1 through iSCSI, and communication between the host 4 or the storage device 1 and the name management device 5, a LAN 7 serving as an IP network for communication between the terminal 13 and the host 4, and a management network 8 operating as an IP network for communication between the switch 3 and the name management device 4.

The storage device 1 and the IP-SAN 6 are connected with a communication line 10 such as a UTP (Unshielded Twisted Pair) cable or an optical fibre cable. The IP-SAN 6 and the host 4a are also connected with such a communication line 10. Further, the hosts 4a and 4b, the terminal 13, and the LAN 7 are connected with a communication line 11. Moreover, the storage device 1, the management terminal 2, the switch 3, the name management device 5, and the management network 8 are connected with a communication line 12.

In this embodiment, after a path for keeping communication between an iSCSI initiator and an iSCSI target is set to the storage device 1 and then the host 4 operating as the iSCSI initiator is connected with the IP-SAN 6. In FIG. 1, in terms of the host 4a, the path has been already set to the storage device 1. Hence, the host 4a is connected with the IP-SAN 6 through the communication line 10. On the other hand, in terms of the host 4b, the path has not been set to the storage device 1. Hence, the host 4b is not connected with the IP-SAN 6.

Further, this embodiment is arranged on the assumption that the host 4 and the storage device 1 with which the host 4 communicates through iSCSI are connected with the same switch 3.

In a case that the device like the storage device 1 is connected with the IP network such as the IP-SAN 6 and the LAN 7 through radio communication technology, the communication lines 10, 11 and 12 are not necessary. Further, in this embodiment, the IP-SAN 6 and the LAN 7 are separate from each other. Instead of that, the IP-SAN 6 may cover the LAN 7. In this case, however, though the cost of constructing the system may be suppressed, packets to be used for communications between the storage device 1 and the host 4 and other packets to be used for communications between the host 4 and the terminal 13 are mingled on one network, so that the network traffics are disadvantageously made heavy. In order to overcome this disadvantage, the arrangement of this embodiment is preferable. Further, this embodiment discloses that the IP-SAN 6 and the management network 8 are separate from each other, while the IP-SAN 6 may cover the management network 8. In this case, though the cost of constructing the system may be suppressed, if the switch 3 on the IP-SAN 6 fails, the system administrator is not able to manage the storage device 1 from the management terminal 2. It means that the adverse affect in case of failure is heavy. For overcoming this disadvantage, the arrangement of this embodiment is preferable.

The terminal 13 is a general computer and includes a CPU (Central Processing Unit), a main memory, an I/O units, and a network interface (referred to as an "NIF") that serves as an interface for connecting the terminal 13 with the other devices through the communication line 11.

Figure 2:
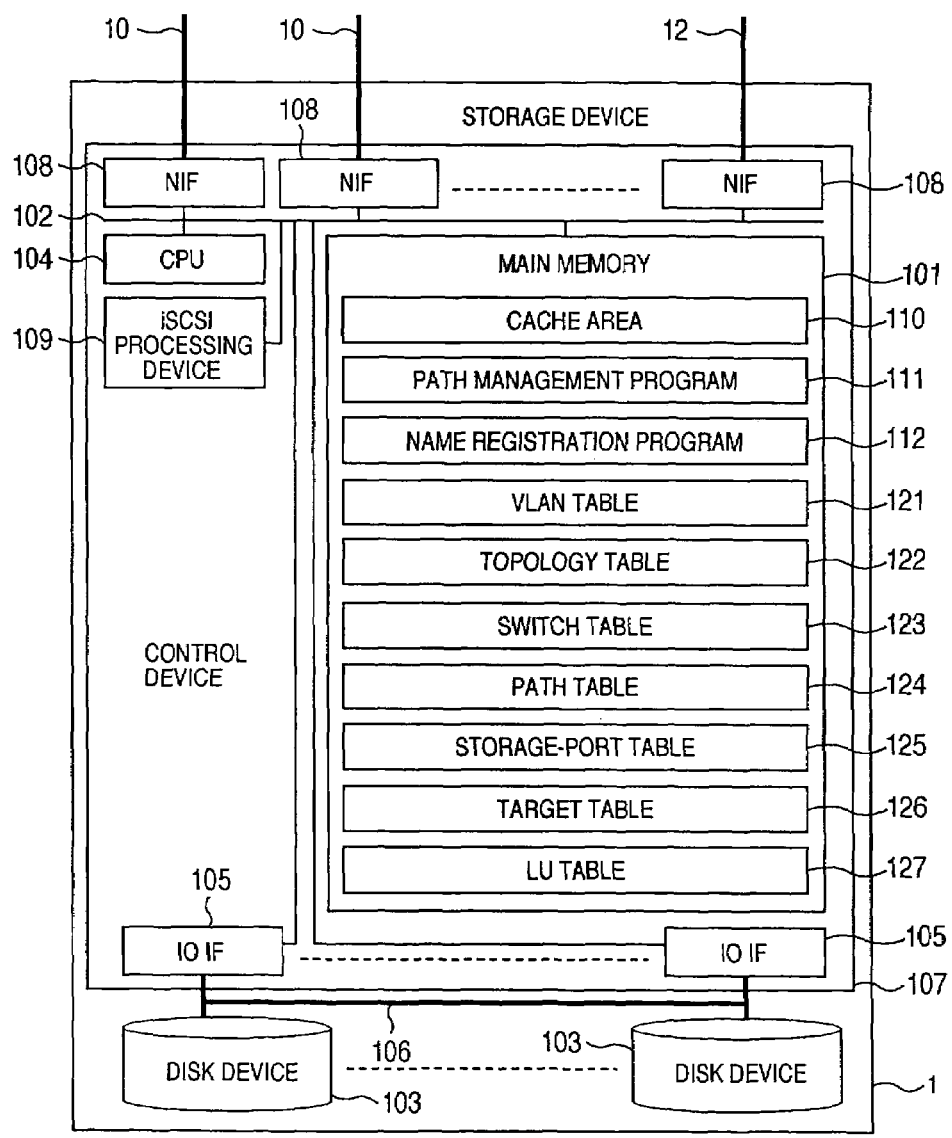
FIG. 2 is a block diagram showing an exemplary arrangement of a storage device included in the first embodiment of the present invention.

FIG. 2 shows an exemplary arrangement of the storage device 1. The storage device 1 is a storage system having one or more storage devices. The storage device includes a device composed of a nonvolatile storage medium such as a hard disk drive or a DVD (Digital Versatile Disc). Further, the storage system may take a RAID (Redundant Array of Inexpensive Disc) arrangement. The storage device 1 includes the storage device (referred to as the "disk device") 103, a control device 107 for controlling writing or reading of data in or from the disk device 103, and a communication line 106 for connecting the control device 107 with the disk device 103.

The control device 107 includes a volatile memory (referred to as the "main memory") 101, a communication line 102 such as a bus, a central processing unit (referred to as the "CPU") 104, an IO interface (referred to as the "IO IF") that serves as an interface for connecting the control device 107 with the communication line 106, an NIF 108 for connecting the control device 107 with the communication lines 10 or 12, and an iSCSI processing device 109 for analyzing or assembling iSCSI packets. The NIF 108 includes one or more physical ports (each of which is referred to as a "storage port"). In this embodiment, the hardware called the iSCSI processing device 109 has a role of analyzing and assembling iSCSI packets. Instead of that, for reducing the manufacturing cost of the storage device 1, the CPU 104 may have a role of analyzing or assembling the iSCSI packets according to content of a program. In fact, however, since the storage device 1 is required to process a massive amount of iSCSI packets, it is preferable to use the arrangement of this embodiment with higher processing performance.

The main memory 101 stores a cache area 110 for storing data read from the disk device 103 or data received from the host 4 or the like, a path management program 111 to be executed by the CPU 104 when creation or deletion of a path is executed, and a name registration program 112 to be executed by the CPU 104 when an iSCSI name of an iSCSI target is registered with the name management device 5. Further, the foregoing programs are saved in the disk device 103 or the main memory 101 by reading them from a portable recording medium or downloading them from another computer through a network. These programs are transferred to the main memory 101 if necessary and then are executed by the CPU 104.

Further, the main memory 101 stores a VLAN table 121 that stores information about VLANs inside the IP-SAN 6, a topology table 122 that stores connecting relation among the devices located inside the IP-SAN 6, a switch table 123 that stores information about switch 3 inside IP-SAN 6, a path table 124 that stores information about paths, a storage-port table 125 that stores information about storage ports, a target table 126 that stores information about iSCSI targets managed by the storage device 1, and an LU table 127 that stores information about logical units (referred to as an "LU") managed by the storage device 1. Moreover, the LU means a logical storage area that is composed of physical storage areas included in the disk device. The LU may be composed of a storage area included by one disk device or may be defined as a set of storage areas of the disk devices.

In this embodiment, it is arranged that each table is stored in the main memory 101. If the storage device 1 fails, for preventing the loss of the information stored in the tables, the information stored in the tables may be copied into the disk device 103 periodically or each time the content of each table is modified.

Figure 3A:
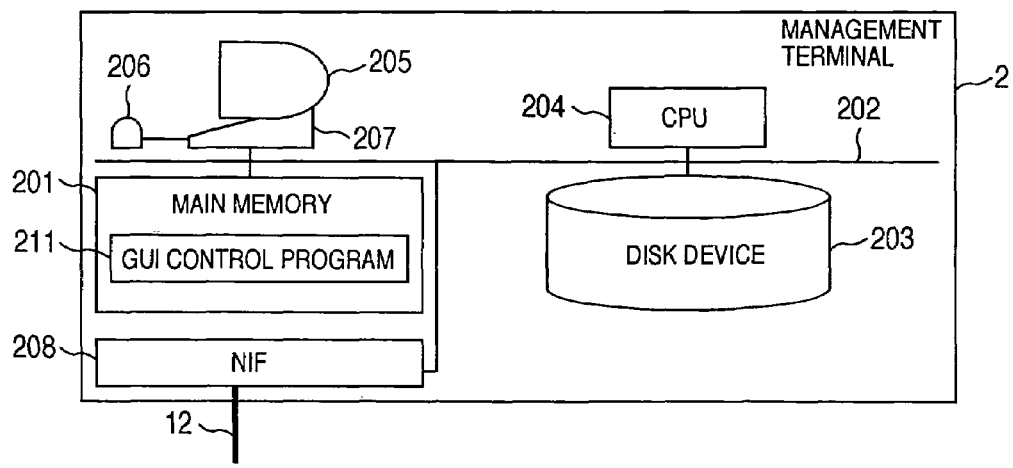
FIG. 3A is a diagram showing an exemplary arrangement of a management terminal.

FIG. 3A shows an exemplary arrangement of the management terminal 2. The management terminal 2 is a computer having a main memory 201, a communication line 202, a disk device 203, a CPU 204, an output device (referred to as a "display") 205, a pointing device 206 such as a mouse, a character input device 207 such as a keyboard, and an NIF 208. The main memory 201 stores a GUI control program 211 to be executed by the CPU 204 when a graphical user interface is supplied to the system administrator.

Figure 3B:
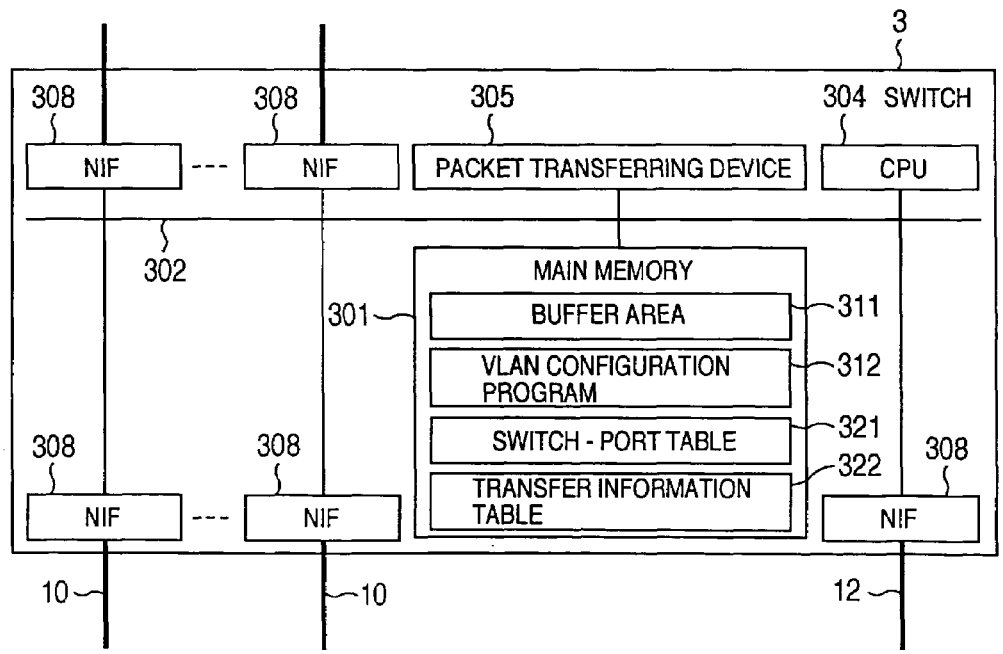
FIG. 3B is a diagram showing an exemplary arrangement of a switch.

FIG. 3B shows an exemplary arrangement of the switch 3. The switch 3 includes a main memory 301, a communication line 302, a CPU 304, an NIF 308, and a packet transfer device 305 for transmitting packets received by the NIF 308 to another device through another NIF 308. The NIF 308 includes one or more physical ports (each of which is referred to as a "switch port"). The main memory 301 includes a buffer area 311 for temporarily saving waiting packets to be transferred and stores a VLAN configuration program 312 to be executed by the CPU 304 when information about the VLANs is set to the packet transfer device 305 in response to a request for creating a VLAN and a request for deleting a VLAN sent from another device including the storage device 1. Further, the main memory 301 also stores a switch-port table 321 that saves information about VLANs of each switch port and a transfer information table 322 that saves network addresses of other devices connected with the switch ports.

Figure 4A:
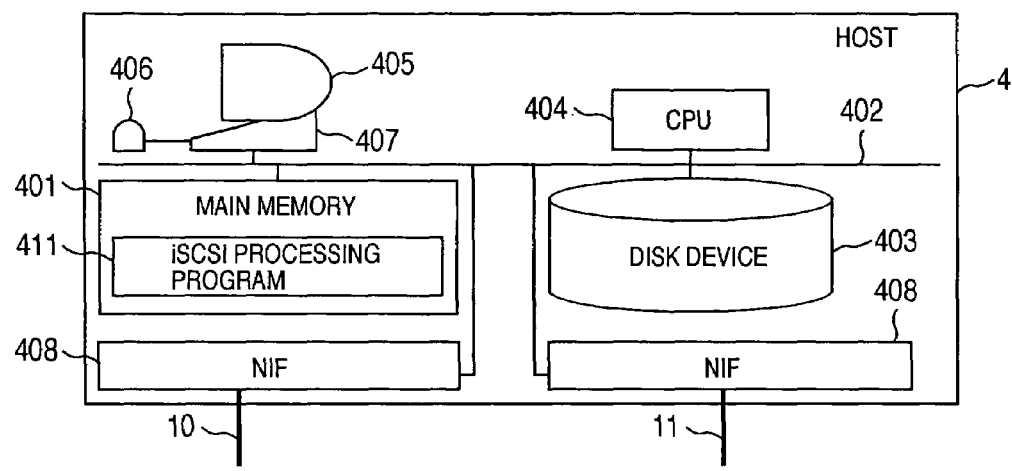
FIG. 4A is a diagram showing an exemplary arrangement of a host.

FIG. 4A shows an exemplary arrangement of the host 4. The host 4 is a-computer having a main memory 401, a communication line 402, a disk device 403, a CPU 404, a display 405, a pointing device 406, a character input device 407, and an NIF 408. The NIF 408 includes one or more physical ports (each of which is referred to as a "host port"). The main memory 401 stores an iSCSI processing program 411 to be executed by the CPU 404 when iSCSI packets are analyzed or assembled. In this embodiment, it is arranged that the CPU 404 executes the analysis and the assembly of iSCSI packets according to the content of the iSCSI processing program 411. For improving processing speed, like the storage device 1, the analysis and the assembly of iSCSI packets may be processed by hardware.

Figure 4B:
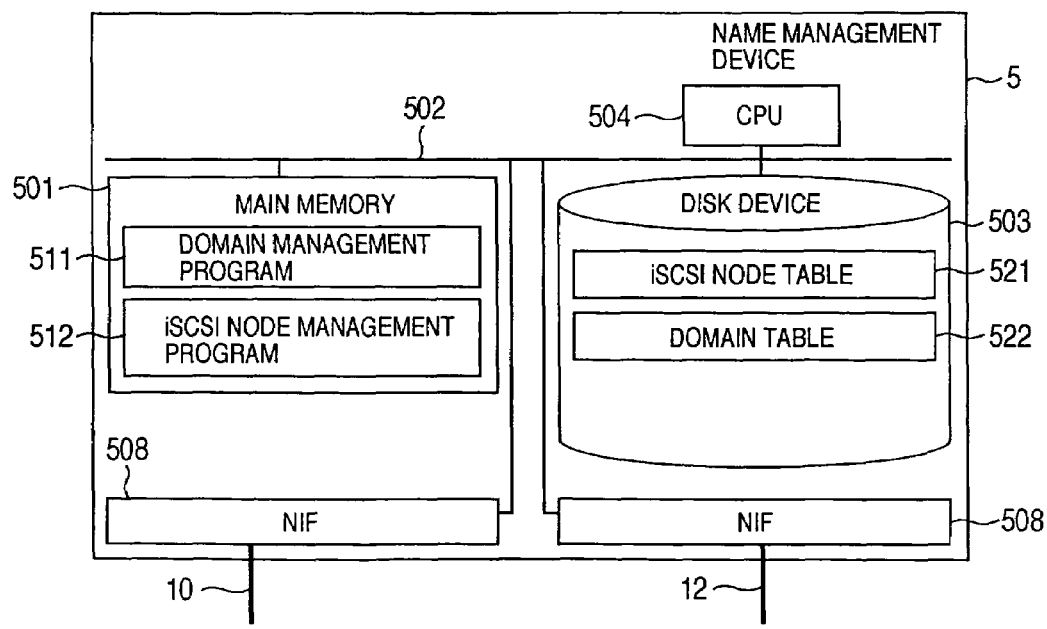
FIG. 4B is a diagram showing an exemplary arrangement of a name management device.

FIG. 4B shows an exemplary arrangement of the name management device 5. The name management device 5 is a computer having a main memory 501, a communication line 502, a disk device 503, a CPU 504, and an NIF 508. The main memory 501 stores a domain management program 511 to be executed by the CPU 504 when a domain table 522 is modified in response to a request from another device including the storage device 1 or the like and further an iSCSI node management program 512 to be executed by the CPU 504 when an iSCSI node table 521 is modified in response to a request from another device including the storage device 1 or the like. Further, the disk device 503 stores the iSCSI node table 521 that saves corresponding relation between an iSCSI node and an IP address and the domain table 522 that saves corresponding relation between an iSCSI node and a discovery domain. In this embodiment, the name management device 5 may use iSNSP for communicating with another device. Instead of iSNSP, however, the device 5 may use another protocol like SLP for that purpose.

In turn, the description will be oriented to the data structures of various tables stored in the main memory 101 of the storage device 1. The VLAN table 121, the topology table 122, the switch table 123, the path table 124, the storage-port table 125, the target table 126, and the LU table 127 are all composed in an array structure. Those tables may store one or more records. However, the data structure of each table is not limited to the array structure.

FIG. 5A shows an exemplary data structure of the VLAN table 121. The VLAN table 121 includes the same number of records as the VLANs located in the IP-SAN 6. In general, the number of VLANs is 4096. Each record of the VLAN table 121 includes an entry 1201 in which a VLAN ID is registered that is an identifier for identifying the VLAN corresponding with the concerned record, and an entry 1202 in which the usage state of the VLAN is registered. In this embodiment, in a case that an entry 1202 of a certain record of the VLAN table 121 has "used" registered therein, it indicates that the VLAN corresponding with the record is used inside the IP-SAN 6, while in a case that the entry 1202 has "unused" registered therein, it indicates that the VLAN corresponding with the record is not used inside the IP-SAN 6.

FIG. 5B shows an exemplary data structure of the switch table 123. The switch table 123 includes the same number of records as the switches 3 composing the IP-SAN 6. Each record of the switch table 123 includes an entry 1231 and an entry 1232, in which entry 1231 registered is a switch ID that serves as an identifier for identifying the switch 3 corresponding with the record and in which entry 1232 registered is a management IP address that serves as a destination IP address to which packets for changing settings of the switch 3 are to be transmitted by another device.

FIG. 5C shows an exemplary data structure of the storage-port table 125. The storage-port table 125 includes the same number of records as the storage ports included in the storage device 1. Each record of the storage-port table 125 includes entries 1251 to 1255, in which entry 1251 registered is a storage-port ID that serves as an identifier for identifying the storage port corresponding with the record, in which entries 1252 and 1253 are respectively registered an IP address and a MAC (Medium Access Control) address assigned to the storage port, in which entry 1254 registered is a subnet mask of a subnet to which the IP address belongs, and in which entry 1255 registered is an IP address of a default gateway of the subnet.

FIG. 5D shows an exemplary data structure of the target table 126. The target table 126 includes the same number of records as the number of combinations of an iSCSI target operating in the storage device 1 and a storage port assigned to the iSCSI target. Each record of the target table 126 includes entries 1261 to 1263, in which entry 1261 is registered an iSCSI name of the iSCSI target, in which entry 1262 is registered a storage-port ID of the storage port assigned to the iSCSI target, and in which entry 1263 is registered a VLAN ID of the VLAN connected with the storage port.

FIG. 6A shows an exemplary data structure of the LU table 127. The LU table 127 includes the same number of records as the iSCSI targets operating in the storage device 1. Each record of the LU table 127 includes entries 1271 and 1272, in which entry 1271 is registered an iSCSI name of the iSCSI target corresponding with the record and in which entry 1272 is registered an LUN that serves as an identifier for identifying the LU assigned to the iSCSI target.

FIG. 6B shows an exemplary data structure of the path table 124. The path table 124 includes the same number of records as paths between each of iSCSI initiators operating in the hosts 4 and each of iSCSI targets operating in the storage device 1. Each record of the path table 124 includes entries 1241 and 1242, in which entry 1241 is registered an iSCSI name of an iSCSI initiator operating in the host 4 and in which entry 1242 is registered an iSCSI name of an iSCSI target with which the iSCSI initiator establishes an iSCSI session.

FIG. 6C shows an exemplary data structure of the topology table 122. The topology table 122 includes the same number of records as the physical ports of the switch 3. Each record of the topology table 122 includes entries 1221 to 1225, in which entry 1221 is registered a switch ID of the switch 3, in which entry 1222 is registered a switch port ID that serves as an identifier for identifying a switch port included in the switch 3, in which entry 1223 is registered a type of connecting device for representing a type of a device connected with the switch port, in which entry 1224 is registered a connecting device ID that serves as an identifier for identifying the device, and in which entry 1225 is registered a connecting port ID that serves as an identifier for identifying a physical port of the device to be connected with the switch port.

In this embodiment, in a case that "null" is registered in an entry 1223 of a certain record of the topology table 122, it indicates that no device is connected with the switch port corresponding with the record. In a case that "host" is registered in the entry 1223, it indicates that a host 4 is connected with the switch port corresponding with the record. In a case that "storage" is registered in the entry 1223, it indicates that the storage device 1 is connected with the switch port corresponding with the record. In a case that "switch" is registered in the entry 1223, it indicates that another switch 3 is connected with the switch port corresponding with the record.

Further, in a case that "null" is registered in an entry 1223 of a certain record of the topology table 122, it indicates that "null" is saved in the entries 1224 and 1225 of the record. In a case that "host" is registered in the entry 1223, it indicates that an iSCSI name of an iSCSI initiator operating in a host 4 is saved in the entry 1224 and "null" is saved in the entry 1225. In a case that "storage" is registered in the entry 1223, it indicates that a storage ID that serves as an identifier for identifying the storage device 1 is saved in the entry 1224 of the record and a storage-port ID is saved in the entry 1225 of the record. In a case that "switch" is registered in the entry 1223, it indicates that a switch ID is saved in the entry 1224 of the record and a switch port ID is saved in the entry 1225 of the record.

In turn, the description will be oriented to the data structures of various tables stored in the main memory 301 of the switch 3. The switch port table 321 and the transfer information table 322 are each composed in an array structure. Those tables may store one or more records. However, the data structure of each table is not limited to the array structure.

FIG. 7A shows an exemplary data structure of the switch port table 321. The switch port table 321 includes the same number of records as the switch ports included in the switch 3. Each record of the switch port table 321 includes entries 3211 to 3213, in which entry 3211 is registered a switch port ID of the switch port corresponding with the record, in which entry 3212 is registered a VLAN ID of the VLAN connected with the switch port, and in which entry 3213 is registered a VLAN type for representing a type of the VLAN. In this embodiment, in a case that "port" is saved in the entry 3213 of a certain record of the switch port table 321, it indicates that the VLAN to be identified by the content of the entry 3212 is a port-based VLAN. In a case that "tag" is saved in the entry 3213, it indicates that the VLAN to be identified by the content of the entry 3212 of the record is a tagged VLAN. The tagged VLAN is a VLAN by which one switch port can belong to a plurality of VLANs. In general, since the port unit price (price for one physical port) of the storage device 1 is higher than the port unit price of the switch 3, the number of the storage ports of the storage device 1 is smaller than the number of the switch ports of the switch 3. Hence, in this embodiment, each of the switch ports connected with the storage device 1 belongs to a tag VLAN.

FIG. 7B shows an exemplary data structure of the transfer information table 322. The transfer information table 322 includes the same number of records as the switch ports included in the switch 3. Each record of the transfer information table 322 includes entries 3221 and 3222, in which entry 3221 is registered a switch-port ID of the switch port corresponding with the record and in which entry 3222 is registered a source MAC address of packets received by the switch port.

Hereafter, the description will be oriented to the way of use of the switch-port table 321 and the transfer information table 322. The packet transfer device 305 of the switch 3 uses the switch-port table 321 and the transfer information table 322 for determining which of NIF 308 packets received by the NIF 308 are to be transferred. That is, when the NIF 308 receives a packet through the switch port, the packet transfer device 305 of the switch 3 reads the source MAC address of the packet and searches the transfer information table 322 based on the condition that the content of the entry 3221 (switch-port ID) matches with the switch-port ID of the switch port and the content of the entry 3222 (MAC address) matches with the source MAC address. If no record that matches with this condition is found, the packet transfer device 305 of the switch 3 adds the record to the transfer information table 322. The switch-port ID is registered in the entry 3221 of the record to be added and the source MAC address is registered in the entry 3222 (MAC address) of the record to be added.

Further, the packet transfer device 305 of the switch 3 searches the switch-port table 321 based on the condition that the content of the entry 3211 (switch-port ID) matches with the switch-port. ID and then reads the content of the entry 3212 (VLAN ID) of the record that matches with the condition.

Then, the packet transfer device 305 of the switch 3 reads the destination MAC address of the packet and then searches the transfer information table 322 based on the condition that the content of the entry 3222 (MAC address) matches with the destination MAC address. If any record that matches with this condition is found, the packet transfer device 305 of the switch 3 transfers the packet to the NIF 308 having the switch port corresponding with the content of the entry 3221 (switch-port ID) of the record. If no proper record is found, the packet transfer device 305 of the switch 3 searches the switch-port table 321 based on the condition that the content of the entry 3212 (VLAN ID) includes the VLAN ID and then reads the contents of the entry 3211 (switch-port ID) and the entry 3213 (VLAN type) of each of all records that matches with this condition. Then, the packet transfer device 305 of the switch 3 transfers the packet to each NIF 308 having the switch port corresponding with each of these switch-port IDs. In this transfer, if the content of the entry 3213 (VLAN type) is "tag", the VLAN ID is added to the header of the packet when transferring the packet.

In turn, the description will be oriented to the data structures of various tables stored in the disk device 503 of the name management device 5. The iSCSI node table 521 and the domain table 522 are each composed in an array structure and may store one or more records. However, the data structure of each table is not limited to the array structure.

FIG. 7C shows an exemplary data structure of the iSCSI node table 521. The iSCSI node table 521 includes the same number of records as the number of combinations of a iSCSI node operating in the host 4 or the storage device 1 and an IP address assigned to the iSCSI node. Each record of the iSCSI node table 521 includes entries 5211 to 5213, in which entry 5211 is registered an iSCSI name of the iSCSI node corresponding with the record, in which entry 5212 is registered a node type composed of a character string for distinguishing if the iSCSI node is an iSCSI initiator or an iSCSI target, and in which entry 5213 is registered an IP address assigned to the iSCSI node. In this embodiment, in a case that "initiator" is registered in the entry 5212 of a certain record of the iSCSI node table 521, it indicates that the iSCSI node corresponding with this record is an iSCSI initiator. In a case that "target" is registered in the entry 5212, it indicates that the iSCSI node corresponding with this record is an iSCSI target.

FIG. 7D shows an exemplary data structure of the domain table 522. The domain table 522 includes the same number of records as the number of combinations of a discovery domain registered with the name management device 5 and an iSCSI node which belongs to the discovery domain. Each record of the domain table 522 includes the entries 5221 and 5222, in which entry 5221 is registered a domain ID that is an identifier for identifying the discovery domain corresponding with the record and in which entry 5222 is registered an iSCSI name of an iSCSI node which belongs to the discovery domain.

Hereafter, the description will be oriented to the communication sequence, the graphical user interface (simply referred to as a "GUI"), and the operating process of this embodiment. The GUI is displayed on the display 205 when the CPU 204 of the management terminal 2 executes the GUI control program 211. The system administrator sets various parameters on the displayed GUI by using a character input device 207 and the pointing device 206. In place of the GUI to be described about this embodiment, the management terminal 2 may be equipped with a command line interface having the same functions as the GUI.

In this embodiment, the system administrator or the like performs operations according to the following sequence. At first, the system administrator instructs the storage device 1 and the switch 3 to initialize the table through the use of the management terminal 2. Then, with the management terminal 2, the system administrator sets information of each storage port of the storage device 1 to the storage device 1 itself. Next, also with the management terminal 2, the system administrator sets information of each of the switches 3 composing the IP-SAN 6 to the storage device 1. After the completion of the aforementioned operations, with the management terminal 2, the system administrator adds a path between an iSCSI initiator and an iSCSI target. That is, the system administrator enters the iSCSI names of the iSCSI initiator and the iSCSI target, between which the path is to be set, and an LUN to the management terminal 2. Then, the storage device 1 configures a discovery domain to which the iSCSI initiator and the iSCSI target to the name management device 5. Further, the system administrator sets to the switch 3 a VLAN to which the host 4 operating as the iSCSI initiator and the storage device 1 operating as the iSCSI target are both connected. As described above, the storage device 1 implements the configuration of the discovery domain and the VLAN so that the discovery domain matches with the VLAN in one-to-one manner, for the purpose of preventing occurrence of the mismatch of both.

At first, the description will be oriented to the initialization of the table used in this embodiment.

When the system administrator instructs the storage device 1 to perform the table initializing process with the management terminal 2, the storage device 1 causes the CPU 104 to perform the VLAN table initializing process and the storage-port table initializing process.

In the VLAN table initializing process, the CPU 104 of the storage device 1 adds to the VLAN table 121 each record in which the entry 1201 (VLAN ID) is an integer ranging from "1" to "4096" and the entry 1202 (state) is "unused".

Further, in the storage-port table initializing process, the CPU 104 of the storage device 1 assigns a storage-port ID to each storage port included in the storage device 1, read a MAC address of each storage port from the NIF 108 having the storage port, and then add to the storage-port table 125 each record in which the entry 1251 (storage-port ID) is the assigned storage port ID, the entry 1253 (MAC address) is said MAC address, and the entry 1252 (IP address), the entry 1254 (subnet mask) and the entry 1255 (gateway) are "0. 0. 0. 0". In this embodiment, the CPU 104 sequentially assigns an integer value starting from "1" as the storage-port ID to each storage port.

Then, the CPU 104 of the storage device 1 eliminates all records in the tables except the VLAN table 121 and the storage-port table 125.

Afterwards, when the system administrator instructs the switch 3 to perform the table initializing process through the management terminal 2, the CPU 304 of the switch 3 performs the switch-port table initializing process. In this process, the CPU 304 assigns the switch-port ID to each switch port of the switch 3 and then adds to the switch-port table 321 each record in which the entry 3211 (switch-port ID) is the assigned switch port ID, the entry 3212 (VLAN ID) is the VLAN ID of the default VLAN, and the entry 3213 (VLAN type) is "port". In this embodiment, the CPU 304 sequentially assigns an integer value starting from "1" as a switch-port ID to each switch port. Further, the default VLAN ID is "4096".

Then, the CPU 304 of the switch 3 eliminates all records in the tables except the switch-port table 321.

In turn, the description will be oriented to the process of setting each storage port included in the storage device 1 and the process of setting the switches 3 composing the IP-SAN 6.

FIG. 8 illustrates the communication sequence to be executed when the system administrator sets the information of each storage port included in the storage device 1 and information of the switches 3 composing the IP-SAN 6 to the storage device 1 through the use of the management terminal 2.

At first, when the system administrator instructs the management terminal 2 to display a storage-port management screen 920, the CPU 204 of the management terminal 2 executes the storage-port management screen display processing for displaying the storage-port management screen 920 on the display 205 (S801).

Figure 9A:
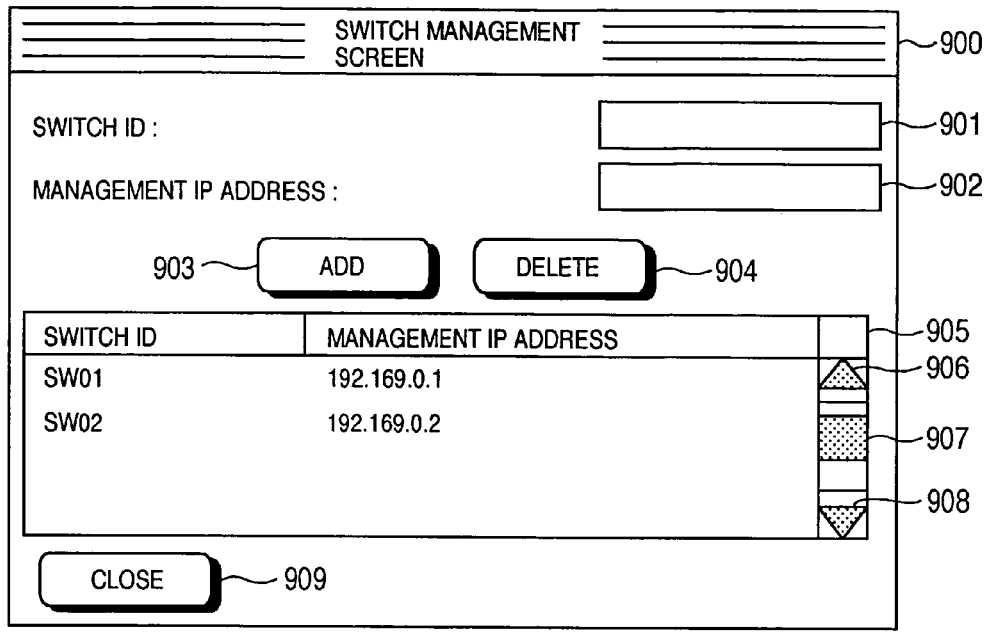
FIG. 9A is a diagram showing an example of a switch management screen.
Figure 9B:
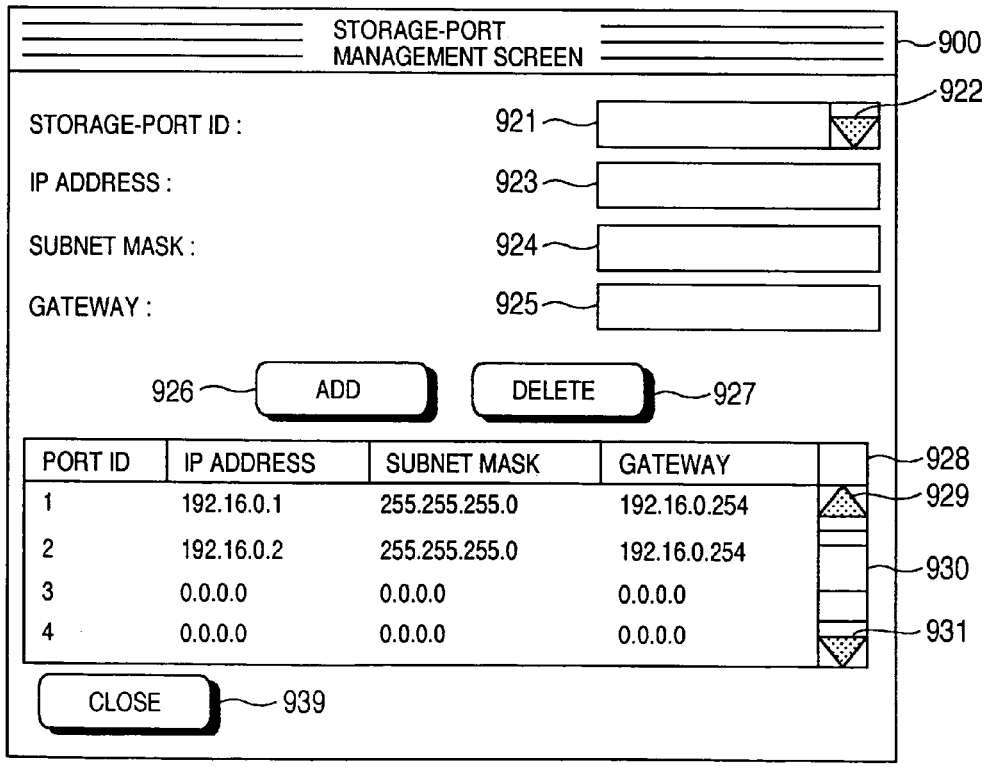
FIG. 9B is a diagram showing an example of a storage-port management screen.

FIG. 9B shows a display example of the storage-port management screen 920 to be used for registering or deleting information of the storage port in or from the storage device 1. As shown, the storage-port management screen 920 includes a button 922 for selecting a storage-port ID of the storage port in which information is to be registered from a list, an area 921 for displaying a storage-port ID selected by using the button 922, an area 923 to which the IP address assigned to the storage port is to be inputted, an area 924 to which a subnet mask of the subnet connected with the storage port is to be inputted, an area 925 to which an IP address of a default gateway of the subnet is to be inputted, a button 926 to be used when the information inputted from the areas 921 to 925 is to be registered, a button 927 to be used when the information of the storage port specified by using the area 928 is deleted from the storage device 1, an area 928 for displaying information of the storage port having been registered in the storage device 1, buttons 929, 930 and 931 to be used when the display range of the area 928 is changed, and a button 939 to be used when the storage-port management screen 920 is closed.

Hereafter, the description will be oriented to the operation of the storage-port management screen display processing. In this processing, the CPU 204 of the management terminal 2 reads all records of the storage-port table 125 from the storage device 1 through the management network 8 and to display the content of each record on the area 928 when displaying the storage-port management screen 920 on the display 205. This is the storage-port management screen display processing.

Afterwards, when the system administrator specifies the button 926 after each parameter is set, the CPU 204 of the management terminal 2 assembles the storage-port addition request containing the content inputted into the areas 921 to 925 and then to transmit the request to the storage device 1 (S802). When the storage device 1 receives the storage-port addition request, the CPU 104 of the storage device 1 executes the path management program 111 for executing the storage-port addition processing (S803). In the storage-port addition processing, the CPU 104 of the storage device 1 reads the contents inputted into the areas 921 to 925 from the storage-port addition request.

Then, the CPU 104 of the storage device 1 searches the record in which the content of the entry 1251 (storage-port ID) matches with the content of the area 921 from the storage-port table 125 of the storage device 1. Then, the CPU 104 of the storage device 1 registers the contents inputted into the areas 923, 924 and 925 in the entry 1252 (IP address), the entry 1254 (subnet mask), and the entry 1255 (gateway) of the searched record, respectively. After the completion of the foregoing storage-port addition processing, the CPU 104 of the storage device 1 transmits the storage-port addition response for representing the storage-port addition becomes successful (S804). When the management terminal 2 receives the storage-port addition response, the CPU 204 of the management terminal 2 modifies the display content of the area 928 in correspondence with the modified content of the storage-port table 125.

The system administrator repeats the operation from the steps S801 to S804 the same times as the number of storage ports.

Next, when the system administrator instructs the management terminal 2 to display the switch management screen 900, the CPU 204 of the management terminal 2 performs the switch management screen display processing for displaying the switch management screen 900 on the display 205 (S805).

FIG. 9A shows a display example of the switch management screen 900 to be used when the information of the switch 3 is registered in or deleted from the storage device 1. The switch management screen 900 includes an area 901 to which a switch ID of the switch 3 to be registered is inputted, an area 902 to which a management IP address of the switch is inputted, a. button 903 to be used when the information inputted in the areas 901 and 902 is registered in the storage device 1, a button 904 to be used when the information of the switch 3 specified by using the area 905 is deleted from the storage device 1, an area 905 for displaying the information of the switch having been registered in the storage device 1, buttons 906, 907 and 908 to be used when the display range of the area 905 is changed, and a button 909 to be used when the switch management screen 900 is closed.

Hereafter, the description will be oriented to the operation of the switch management screen display processing of the management terminal 2. In this processing, the CPU 204 of the management terminal 2 reads all records of the switch table 123 from the storage device 1 through the management network 8 and then display the content of each record on the area 905 when displaying the switch management screen 900 on the display 205. This is the switch management screen display processing.

Afterwards, when the system administrator specifies the button 903 after each parameter is set, the CPU 204 of the management terminal 2 assembles the switch addition request containing the contents inputted in the areas 901 and 902 and then to transmit the switch addition request to the storage device 1 (S806). When the storage device 1 receives the switch addition request, the CPU 104 of the storage device 1 executes the path management program 111 and perform the switch addition processing (S807). In the switch addition processing, the CPU 104 of the storage device 1 reads the contents inputted into the areas 901 and 902 from the switch addition request.

Next, the CPU 104 of the storage device 1 adds a record to the switch table 123. The contents inputted in the areas 901 and 902 are registered in the entry 1231 (switch ID) and the entry 1232 (management IP address) of this record. After the completion of the foregoing switch addition processing, the CPU 104 of the storage device 1 transmits a port information read request to the management IP address inputted in the area 902 (S808). When the switch 3 receives the port information read request, the CPU 304 of the switch 3 executes the VLAN configuration program 312 for performing the port information read processing (S809). In this processing, the CPU 304 of the switch 3 reads the entry 3211 (switch port ID) of each record of the switch-port table 321 and then create a list of the switch-port IDs. After the completion of the foregoing port information read processing, the CPU 304 of the switch 3 assembles the port information read response containing the list of the switch port IDs and then transmit the response to the storage device 1 (S810).

When the storage device 1 receives the port information read response, the CPU 104 of the storage device 1 executes the path management program 111 for performing a topology initialization processing (S811). In this processing, the CPU 104 of the storage device 1 reads a list of the switch-port IDs from the port information read response and then add the same number of records as the switch-port IDs to the topology table 122. The content of the area 901 read in the step 807 is registered in the entry 1221 (switch ID) of each record. The switch-port ID is registered in the entry 1222 (switch-port ID). The "null" is registered in the entry 1223 (connected device type), the entry 1224 (connected device ID), and the entry 1225 (connected port ID).

After the completion of the foregoing topology initialization processing, the storage device 1 checks which of the switch ports of the switch 3 having the switch ID inputted in the area 901 is connected with the storage device 1 along the following routine. At first, the CPU 104 of the storage device 1 transmits a dummy packet from all storage ports included in the storage device 1 (S812). Any packet may be used as the dummy packet if the source MAC address is a MAC address assigned to each storage port. In this embodiment, the dummy packet is an ARP (Address Resolution Protocol) request to the IP address of the default gateway of each storage port.

After the completion of transmitting the dummy packet, the CPU 104 of the storage device 1 transmits a transfer information read request for requesting the content of the transfer information table 322 to the management IP address inputted to the area 902 (S813). This transfer information read request is an SNMP (Simple Network Management Protocol) Get for obtaining an ipNetToMediaTable of MIB-2 (Management Information Base-2, RFC1213). When the switch 3 receives the transfer information read request, the CPU 304 of the switch 3 executes the VLAN configuration program 312 for performing the transfer information read processing (S814). In this processing, the CPU 304 of the switch 3 reads all records of the transfer information table 322 and assemble the transfer information read response containing all combinations of the switch port ID and the MAC address.

After the completion of the foregoing transfer information read processing, the CPU 304 of the switch 3 transmits the transfer information read response to the storage device 1 (S815). When the storage device 1 receives the transfer information read response, the CPU 104 of the storage device 1 executes the path management program 111 for performing the connected switch addition processing (S816). In this connected switch addition processing, the CPU 104 of the storage device 1 reads the combinations of the switch port ID and the MAC address of the switch 3 from the transfer information read response one by one and check if the MAC address matches with the MAC address of each storage port included in the storage device 1. If matched, the CPU 104 of the storage device 1 finds from the topology table 122 a record in which the content of the entry 1221 (switch ID) matches with the content inputted into the area 901 and the content of the entry 1222 (switch-port ID) matches with the switch-port ID.

Then, the CPU 104 of the storage device 1 registers "storage" in the entry 1223 (connected device type) of the found record, the storage ID of the storage device 1 in the entry 1224 (connected device ID), and the storage-port ID of the storage port in the entry 1225 (connected port ID).

The foregoing processing is executed with respect to all combinations of the switch port ID and the MAC address read from the transfer information read response. After the completion of the foregoing connected switch addition processing, the CPU 104 of the storage device 1 transmits to the management terminal 2 the switch addition response for representing the addition of the switch becomes successful (S817). When the management terminal 2 receives the switch addition response, the row composed of the contents inputted in the areas 901 and 902 is added to the area 905.

The system administrator executes the operation from the steps S805 to S817 the same times as the number of the switches 3 composing the IP-SAN 6.

After one row of the area 928 on the storage-port management screen 920 is specified, the system administrator specifies the button 927, when the CPU 204 of the management terminal 2 searches the record corresponding with the row from the storage-port table 125 of the storage device 1. Then, the CPU 204 of the management terminal 2 registers "0. 0. 0. 0" in the entry 1252 (IP address), the entry 1254 (subnet mask), and the entry 1255 (gateway) of the searched record. Moreover, the CPU 204 of the management terminal 2 is also caused to modify the display content of the area 928 in correspondence with the modified content of the storage port table 125.

Further, after one row on the area 905 of the switch management screen 900 is specified, the system administrator specifies the button 904, when the CPU 204 of the management terminal 2 deletes the record corresponding with the row from the switch table 123 of the storage device 1 through the management network 8. Further, the CPU 204 of the management terminal 2 is also caused to delete the row from the area 905.

In turn, the description will be oriented to the addition of the path between the iSCSI initiator and the iSCSI target.

The addition of a path by the system administrator may be divided into the following three cases. For the first case, a path is added between the iSCSI initiator and the iSCSI target between which no path is connected.

For this case, at first, the storage device 1 receives from the management terminal 2 the iSCSI names of the first iSCSI initiator and the first iSCSI target specified by the system administrator.

Then, the storage device 1 operates to refer to the topology table 122 and select the first switch port that is not in use and the second switch port connected with the storage device 1 from the switch ports included in the switch 3.

Next, the storage device 1 also operates to refer to the topology table 122 and specify the storage port connected with the second switch port. Then, the storage device 1 operates to modify the target table 126 and the LU table 127 so that the specified storage port may access the first iSCSI target.

Then, the storage device 1 operates to register in the name management device 5 the discovery domain composed of the first iSCSI initiator and the first iSCSI target.

Afterwards, the storage device 1 operates to set the switch 3 so that the packets may be transferred between the first switch port and the second switch port. (For example, the switch 3 is set so that those switch ports may belong to the same VLAN.)

Last, the management terminal 2 operates to display a port ID of the first switch port to which the host 4 of the first iSCSI initiator is to be connected on the display 205.

Figure 10:
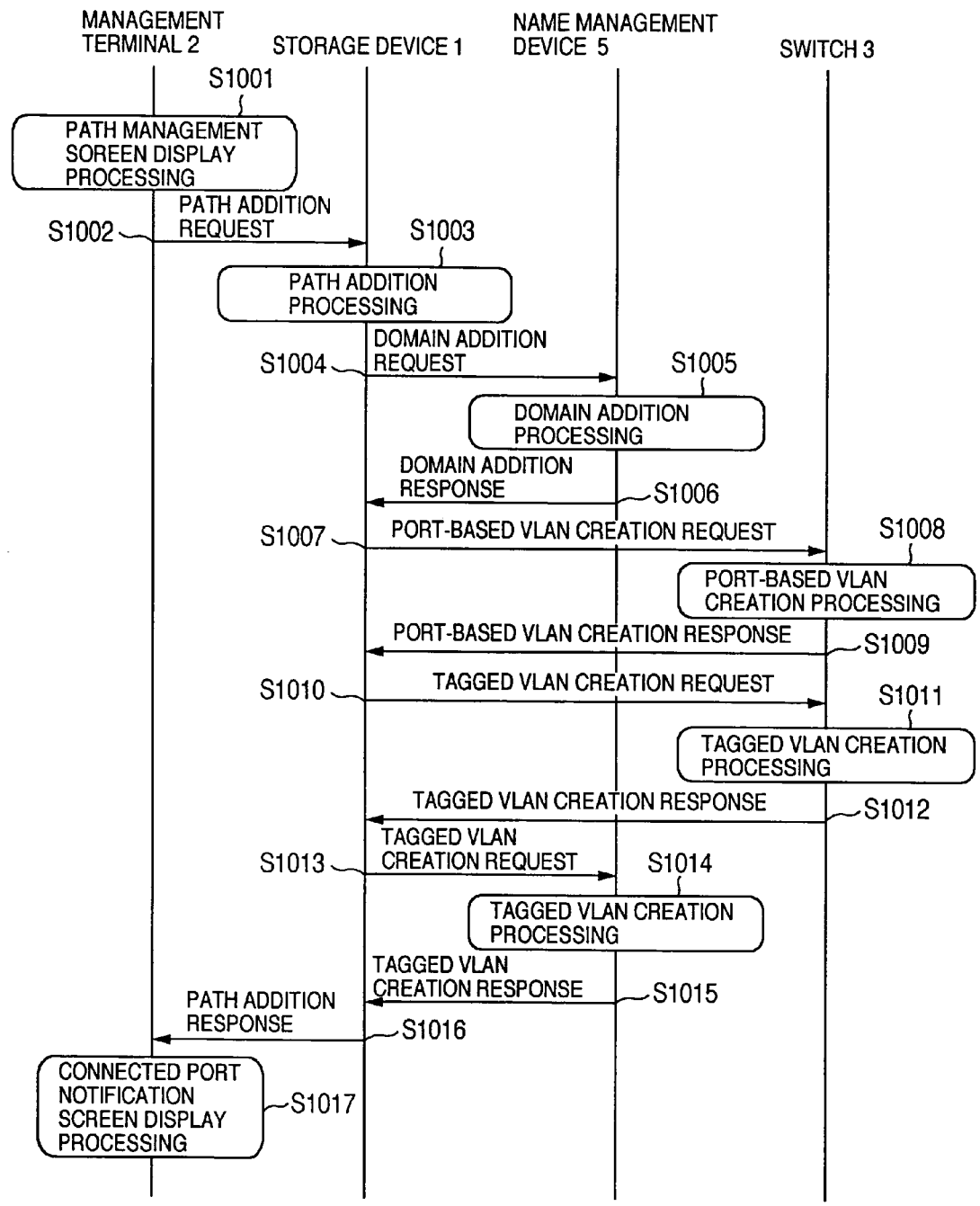
FIG. 10 is a diagram showing an example of the first communication sequence about addition of a path according to the first embodiment of the present invention.

The exemplary communication sequence of the first case is illustrated in FIG. 10.

For the second case, a path is added between the iSCSI initiator with no path connected and the iSCSI target with the path connected with another iSCSI initiator.

For this case, like the first case, the storage device 1 operates to receive from the management terminal 2 the iSCSI names of the first iSCSI initiator and the first iSCSI target.

Then, the storage device 1 operates to refer to the topology table 122, specify the switch 3 connected with the storage port assigned to the first iSCSI target, and select the first switch port that is not in use from the switch ports included in the specified switch 3.

Next, the storage device 1 operates to set the name management device 5 so that the first iSCSI initiator may be added to the discovery domain to which the first iSCSI target belongs.

Then, the storage device 1 operates to set the switch 3 so that the packets may be transferred among the first switch port, the second switch port connected with the storage port, and the switch port connected with the host 4 of the second iSCSI initiator with the path connected with the first iSCSI target. (For example, the switch 3 is set so that the three switch ports may be made to belong to the same VLAN.)

Last, the management terminal 2 operates to display a port ID of the first switch port to which the host 4 of the first iSCSI initiator is to be connected on the display 205.

Figure 17:
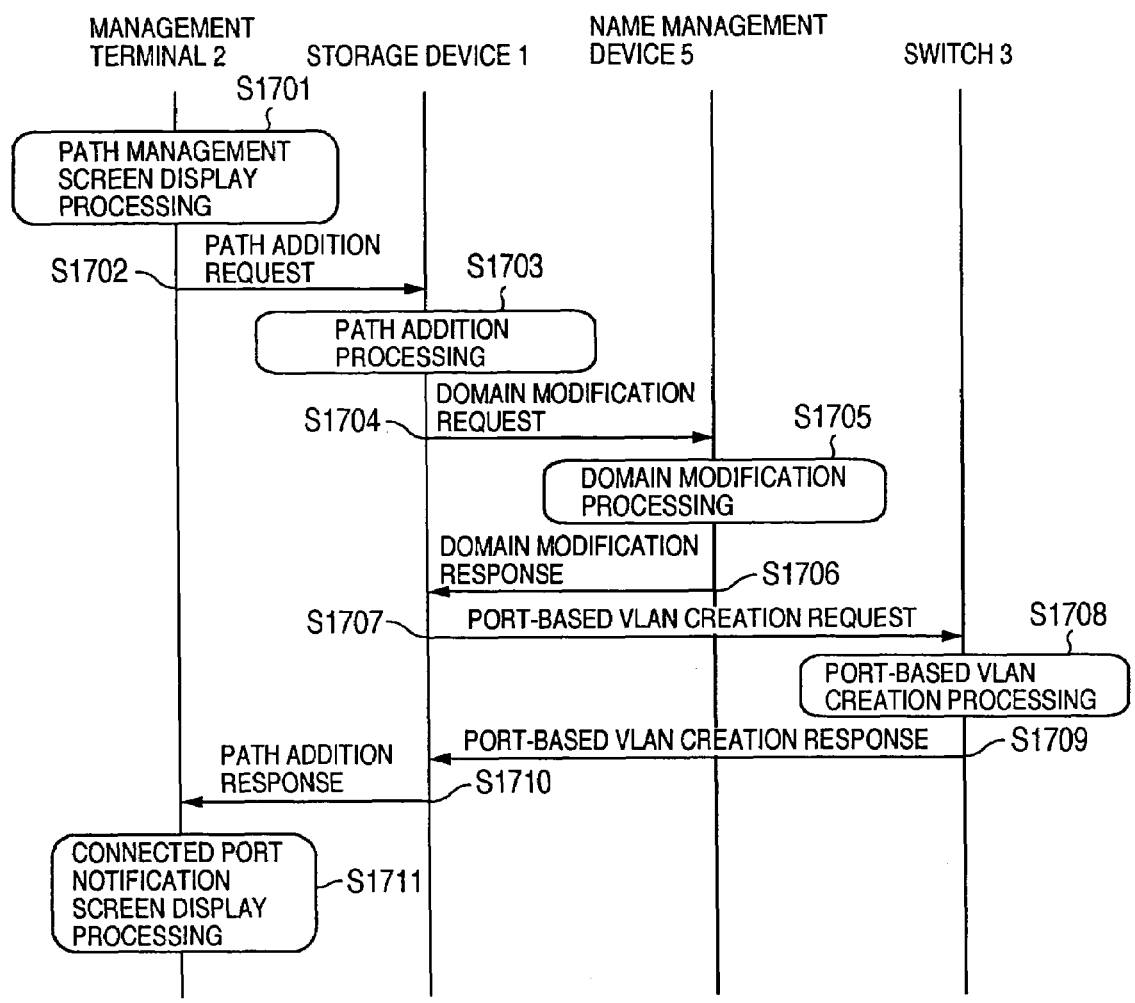
FIG. 17 is a diagram showing an example of the second communication sequence about addition of a path according to the first embodiment of the present invention.

The exemplary communication sequence of the second case is illustrated in FIG. 17. As the example of this case, the system administrator may add a path with another host 4d to the storage device 1 with the path connected with the host 4c and assemble the cluster composition so that the hosts 4c and 4d may share the LU of the storage device 1.

For the third case, a path is added between the iSCSI target with no path connected and the iSCSI initiator with the path connected with another iSCSI target.

For this case, like the first case, the storage device 1 operates to receive from the management terminal 2 the iSCSI names of the first iSCSI initiator and the first iSCSI target.

Next, the storage device 1 operates to refer to the topology table 122, specify the switch 3 to which the host 4 of the first iSCSI initiator is connected, and select the second switch port connected with the storage device 1.

Then, the storage device 1 performs a setting of adding the first iSCSI target to the discovery domain to which the first iSCSI initiator belongs with respect to the name management device 5.

The storage device 1 further performs a setting of transferring packets among the first switch port with which the host 4 of the first iSCSI initiator is connected, the second switch port, and a switch port connected with a storage port assigned to the second iSCSI target with the path connected with the first iSCSI initiator with respect to the switch 3. (For example, the storage device 1 sets the switch 3 so that the three switch ports may be made to belong to the same VLAN.)

Last, the storage device 1 operates to specify which of the storage ports is connected with the second switch port and modify the target table 126 and the LU table so that the storage port may access the first iSCSI target.

Figure 18:
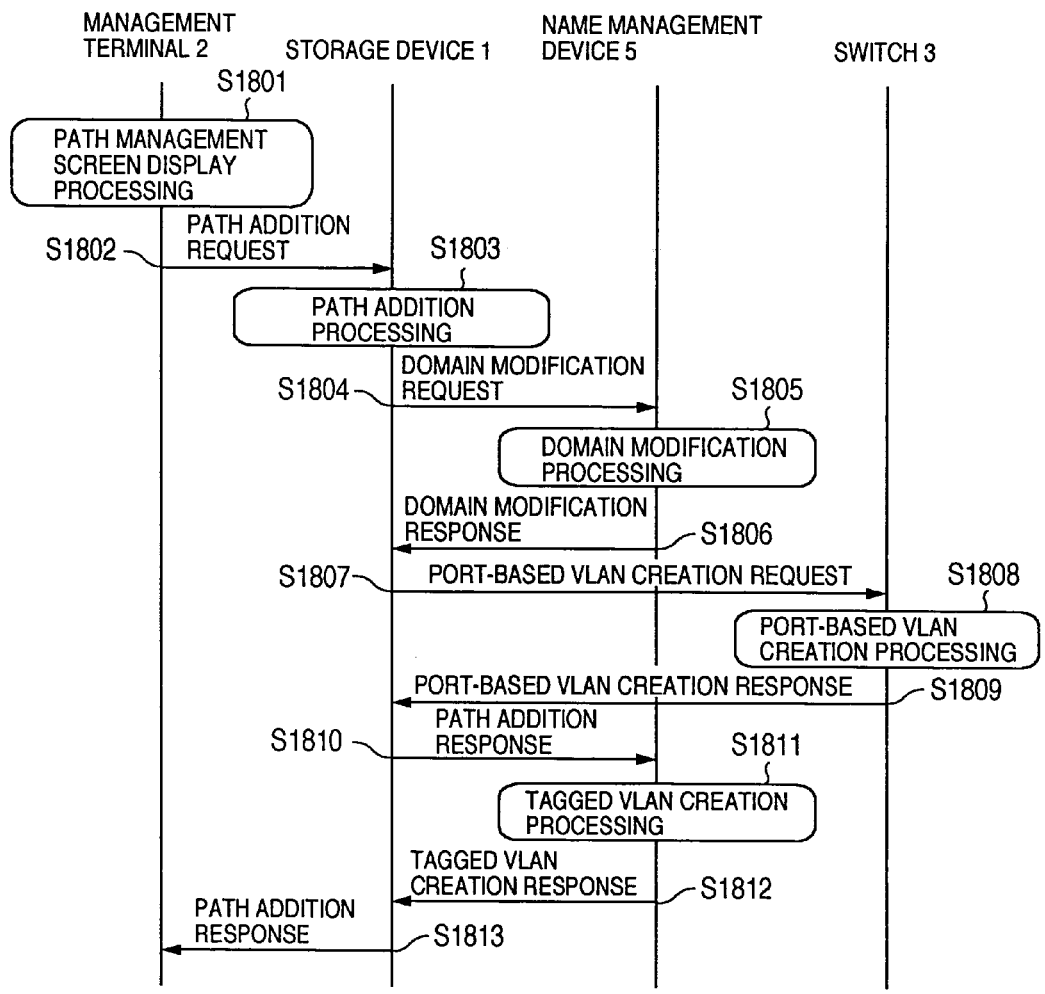
FIG. 18 is a diagram showing an example of the third communication sequence about addition of a path according to the first embodiment of the present invention.

The exemplary communication sequence of the third case is illustrated in FIG. 18. As an example of such a case, it is possible to refer to the case of assigning the LU of another storage device 1 to the host because the capacity of the LU becomes short through the host 4 uses the LU of the storage device 1. Hereafter, the exemplary communication sequence of each case will be concretely described below.

FIG. 10 shows an exemplary communication sequence of the first case of adding a path.

At first, when the system administrator instructs the management terminal 2 to display the path management screen 1100, the CPU 204 of the management terminal 2 performs a path management screen display processing for displaying the path management screen 1100 on the display 205 (S1001).

Figure 11A:
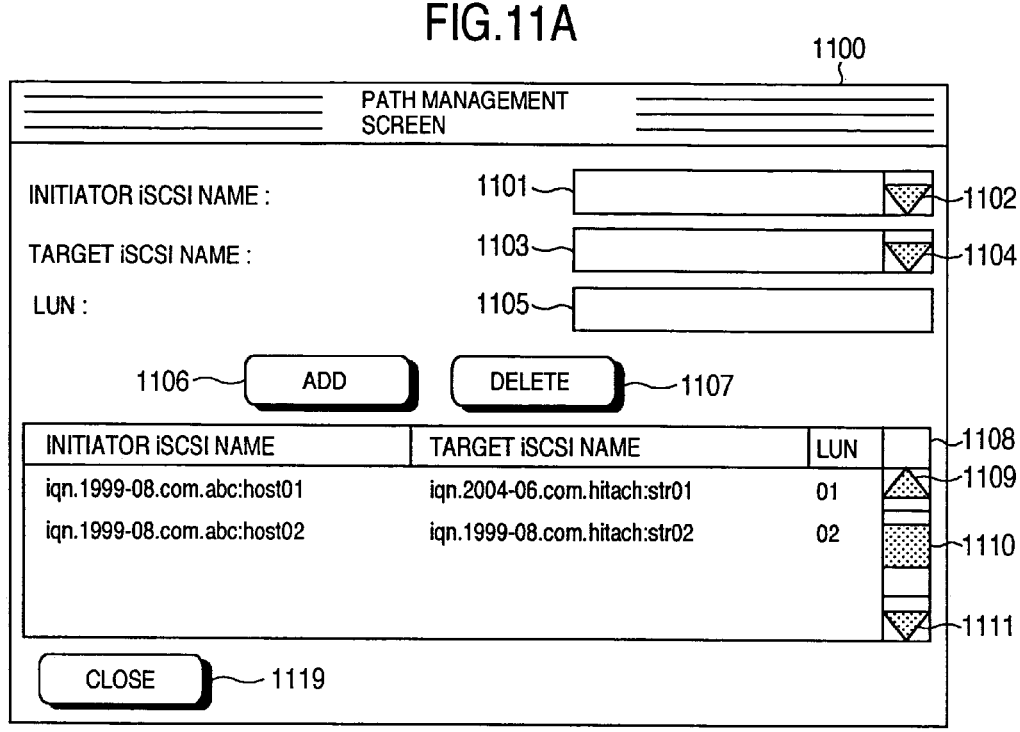
FIG. 11A is a diagram showing a path management screen.

FIG. 11A shows an example of the path management screen 1100 used for registering or deleting the information about a path between the host 4 that operates as the iSCSI initiator and the storage device 1 that operates as the iSCSI target in or from the storage device 1. The path management screen 1100 includes a button 1102 for selecting the iSCSI name of the iSCSI initiator from a list, an area 1101 on or to which the iSCSI name selected by the button 1102 is displayed or the iSCSI name of the iSCSI initiator not indicated in the list is inputted, a button 1104 for selecting the iSCSI name of the iSCSI target with a path connected with the iSCSI initiator, an area 1103 on or to which the iSCSI name selected by the button 1104 is displayed or the iSCSI name of the iSCSI target not indicated in the list is inputted, an area 1105 to which the LUN of the LU assigned to the iSCSI target is inputted, a button 1106 used when the information inputted to the areas 1101 to 1105 is registered in the storage device 1, a button 1107 used for when the information about the path specified by the area 1108 is deleted from the storage device 1, an area 1108 on which the information about a path registered in the storage device 1 is displayed, buttons 1109, 1110 and 1111 used when the display range of the area 1108 is changed, and a button 1119 used when the path management screen 1100 is closed.

Hereafter, the description will be oriented to the path management screen display processing. In this processing, the CPU 204 of the management terminal 2 reads all records of the path table 124 and the LU table 127 from the storage device 1 through the management network 8 when the path management screen 1100 is displayed on the display 205, merge the contents of all the records, and then display the merged content on the area 1108. Further, the CPU 204 of the management terminal 2 creates a list of the contents of the entry 1241 (initiator) and entry 1242 (target) of the read path table 124 and select the content from the list with the buttons 1102 and 1104. This is the path management screen display processing.

For the first case of adding a path, the system administrator enters the iSCSI names of the iSCSI initiator and the iSCSI target with no path connected therebetween on the areas 1101 and 1103. Afterwards, when the system administrator specifies the button 1126 after the other parameters are set, the CPU 204 of the management terminal 2 assembles the path addition request containing the contents inputted into the areas 1101, 1103 and 1105 and then transmit the path addition request to the storage device 1 (S1002). When the storage device 1 receives the path addition request, the CPU 104 of the storage device 1 executes the path management program 111 and perform the path addition processing (S1003).

Figure 12:
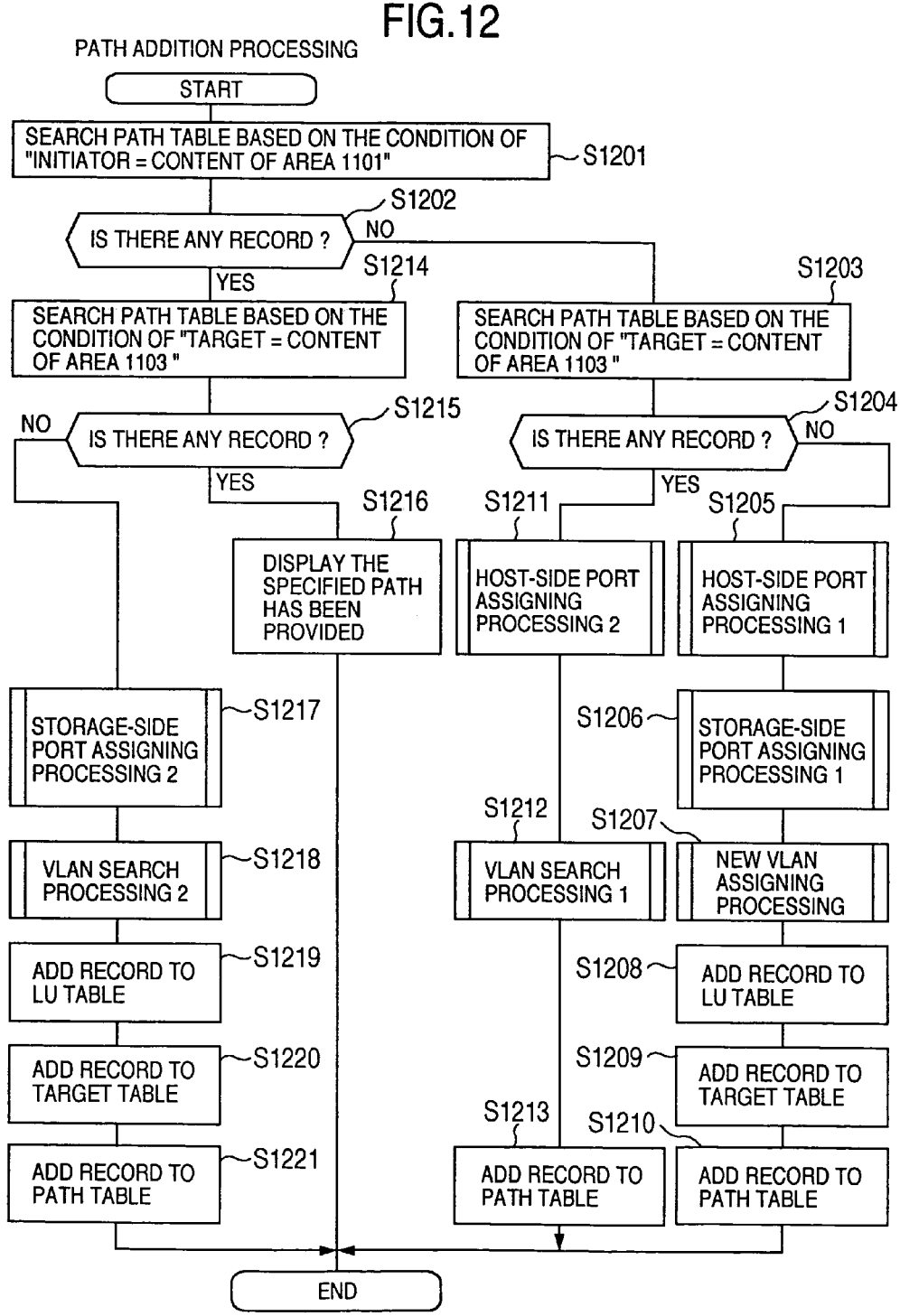
FIG. 12 is a flowchart showing an example of an operating process of adding a path according to the first embodiment of the present invention.

FIG. 12 is a flowchart showing an exemplary routine of the path addition processing. This processing is executed by the path management program 111 run by the CPU 104 of the storage device 1. The path addition processing is executed to branch the processing into three according to the foregoing three connected states of the path between the iSCSI initiator and the iSCSI target. For the first case (state), the storage device 1 operates to assign the switch port to the host 4 operating as the iSCSI initiator and the storage device 1 operating as the iSCSI target and also assign the VLAN to the path to be added. Last, according to these processed results, the storage device 1 operates to add the records to various tables. For the second case, the storage device 1 operates to assign the switch port to the host 4 operating as the iSCSI initiator. According to the processed result, the storage device 1 operates to add the records to various tables. For the third case, the storage device 1 operates to assign the switch port to the storage device 1 operating as the iSCSI target. Then, according to this processed result, the storage device 1 operates to add the records to various tables.

Hereafter, the description will be oriented to the concrete routine of the path addition processing. At first, the CPU 104 of the storage device 1 reads the contents inputted into the areas 1101, 1103 and 105 from the path addition request and search the path table 124 based on the condition that the content of the entry 1241 (initiator) matches with the content inputted in the area 1101 (S1201). If no record matched to the condition is found (S1202), the CPU 104 of the storage device 1 searches the path table 124 based on the condition that the content of the entry 1242 (target) matches with the content inputted in the area 1103 (S1203). If no record matched to the condition is found, this is assumed to be the first case (S1204). Then, the CPU 104 of the storage device 1 performs the host-side port assigning processing 1 (S1205), the storage-side port assigning processing 1 (S1206), and a new VLAN assigning processing (S1207), all of which will be described below.

Afterwards, according to these processed results, various records are modified by the CPU 104 of the storage device. At first, the CPU 104 of the storage device 1 adds a record to the LU table 127 (S1208). The content inputted in the areas 1103 is registered in the entry 1271 (target) of the record to be added in the step S1208. The content inputted in the area 1105 is registered in the entry 1272 (LUN) of the record thereof.

Then, the CPU 104 of the storage device 1 adds a record to the target table 126 (S1209). The content inputted in the area 1103 is registered in the entry 1261 (target) of the record to be added in the step S1209. The storage-port ID selected in the step S1312 of the storage-side port assigning processing 1 registered in the entry 1262 (storage-port ID). The VLAN ID read in the step S1602 of the new VLAN assigning processing is registered in the entry 1263 (VLAN ID). Last, the CPU 104 of the storage device 1 adds a record to the path table 124 and then terminate the path addition processing (S1210). The content inputted into the area 1101 is registered in the entry 1241 (initiator) of the record to be added in the step S1210. The content inputted in the area 1103 is registered in the entry 1242 (target).

If, in the step S1204, the record matched to the condition is found, this is assumed to be the second case. The CPU 104 of the storage device 1 performs the host-side port assigning processing 2 (S1211) and the VLAN search processing 1 (S1212), all of which will be described below. Afterwards, the CPU 104 of the storage device 1 adds a record to the path table 124 and then terminate the path addition processing (S1213). The content inputted in the area 1101 is registered in the entry 1241 (initiator) of the record to be added in the step S1213. The content inputted in the area 1103 is registered in the entry 1242 (target).

If, in the step S1202, the record matched to the condition is found, the CPU 104 of the storage device 1 searches the path table 124 based on the condition that the content of the entry 1242 (target) matches with the content inputted in the area 1103. If no record matched to the condition is found, this is assumed to be the third case (S1215). The CPU 104 of the storage device 1 performs the storage-side port assigning processing 2 (S1217) and the VLAN search processing 2 (S1218), both of which will be described below.

Afterwards, according to these processed results, various records are modified by the CPU 104 of the storage device 1. At first, the CPU 104 of the storage device 1 adds a record to the LU table 127 (S1219). The content inputted in the area 1103 is registered in the entry 1271 (target) of the record to be added in the step S1219. The content inputted in the area 1105 is registered in the entry 1272 (LUN). Then, the CPU 104 of the storage device 1 adds a record to the target table 126 (S1220). The content inputted in the area 1103 is registered in the entry 1261 (target) of the record to be added in the step S1220. The storage-port ID selected in the step S1503 of the storage-side port assigning processing 2 is registered in the entry 1261 (target) of the record to be added in the step S1220. The VLAN ID read in the step S1622 of the VLAN search processing 2 is registered in the entry 1263 (VLAN ID). Last, the CPU 104 of the storage device 1 adds a record to the path table 124 and then terminate the path addition processing (S1221). The content inputted in the area 1101 is registered in the entry 1241 (initiator) of the record to be added in the step S1221. The content inputted in the area 1103 is registered in the entry 1242 (target).

If, in the step S1215, the record matched to the condition is found, the CPU 104 of the storage device 1 assembles the path addition response for representing the specified path has been already provided, transmit the path addition response to the management terminal 2, and then terminate the path addition processing (S1216). This is the operating routine of the path addition processing. The case shown in FIG. 10 is the first case. Hence, the storage device 1 performs the processing from the steps S1201 to S1210 shown in FIG. 12.

Hereafter, the description will be oriented to the operating routine of the host-side port assigning processings 1 and 2, the storage-side port assigning processings 1 and 2, the new VLAN assigning processing, and the VLAN search processings 1 and 2, all of which have been mentioned in the description about the path addition processing.

FIG. 13A is a flowchart illustrating the exemplary routine of the host-side port assigning processing 1. This processing 1 is executed by the path management program 111 run by the CPU 104 of the storage device 1. In the processing 1, the CPU 104 of the storage device 1 searches a switch port that is not in use and assign the searched switch port to the host 4 operating as the iSCSI initiator.

Hereafter, the description will be oriented to the concrete routine of the host-side port assigning processing 1. At first, the CPU 104 of the storage device 1 searches the topology table 122 based on the condition that the content of the entry 1223 (connected device type) is "null" and read the contents of the entry 1221 (switch ID) and the entry 1222 (switch-port ID) of the record matched to the condition (S1301). If two or more records are found in the search of the step S1301, the CPU 104 of the storage device 1 selects the record with the smallest content of the entry 1222 (switch-port ID). Then, the CPU 104 of the storage device 1 registers "host" in the entry 1223 (connected device type) of the record and the content inputted in the area 1101 (the iSCSI name of the iSCSI initiator) in the entry 1224 (connected device ID). Last, the CPU 104 of the storage device 1 searches the switch table 123 based on the condition that the content of the entry 2311 (switch ID) matches with the content of the entry 1221 (switch ID) read in the step S1301, read the content of the entry 1232 (management IP address) of the record matched to this condition, and then terminate the host-side port assigning processing 1 (S1303). This is the operating routine of the host-side port assigning processing 1.

FIG. 13B is a flowchart illustrating the exemplary routine of the storage-side port assigning processing 1. This processing 1 is executed by the path management program 111 run by the CPU 104 of the storage device 1. In this processing 1, the CPU 104 of the storage device 1 searches the storage port with the smallest number of the assigned iSCSI targets from the storage ports and then assign the searched storage port to the iSCSI target.

Then, the description will be oriented to the concrete routine of the storage-side port assigning processing 1. At first, the CPU 104 of the storage device 1 searches the topology table 122 based on the condition that the content of the entry 1221 (switch ID) matches with the content of the entry 1221 (switch ID) read in the step S1301, the content of the entry 1223 (connected device type) is "storage", and the content of the entry 1224 (connected device ID) is the storage ID of its own, read the contents of the entries 1225 (connected port ID) of all the records matched to this condition, and then create a list of the storage-port IDs (S1311). Then, the CPU 104 of the storage device 1 searches the target table 126 based on the condition that the content of the entry 1262 (storage-port ID) matches with the content of each storage-port ID included in the list of the storage-port IDs created in the step S1311 and then select the storage-port ID with the smallest number of records matched to the condition (S1312).

Next, the CPU 104 of the storage device 1 searches the topology table 122 based on the condition that the content of the entry 1223 (connected device type) is "storage", the content of the entry 1224 (connected device ID) is a storage ID of its own, and the content of the entry 1225 (connected port ID) is the storage-port ID selected in the step S1312 and then read the contents of the entry 1221 (switch ID) and the entry 1222 (switch-port ID) of the record matched to this condition. Last, the CPU 104 of the storage device 1 searches the switch table 123 based on the condition that the content of the entry 1231

(switch ID) matches with the content of the entry 1221 (switch ID) read in the step S1313, read the content of the entry 1232 (management IP address) of the record matched to this condition, and then terminate the storage-side port assigning processing 1 (S1314). This is the operating routine of the storage-side port assigning processing 1.

At the step S1312, though the storage port with the smallest number of assigned iSCSI targets is selected by the CPU 104 of the storage device 1, instead, the storage device 1 may record traffics for each storage port and select the storage port with the smallest traffics.

Figure 14:
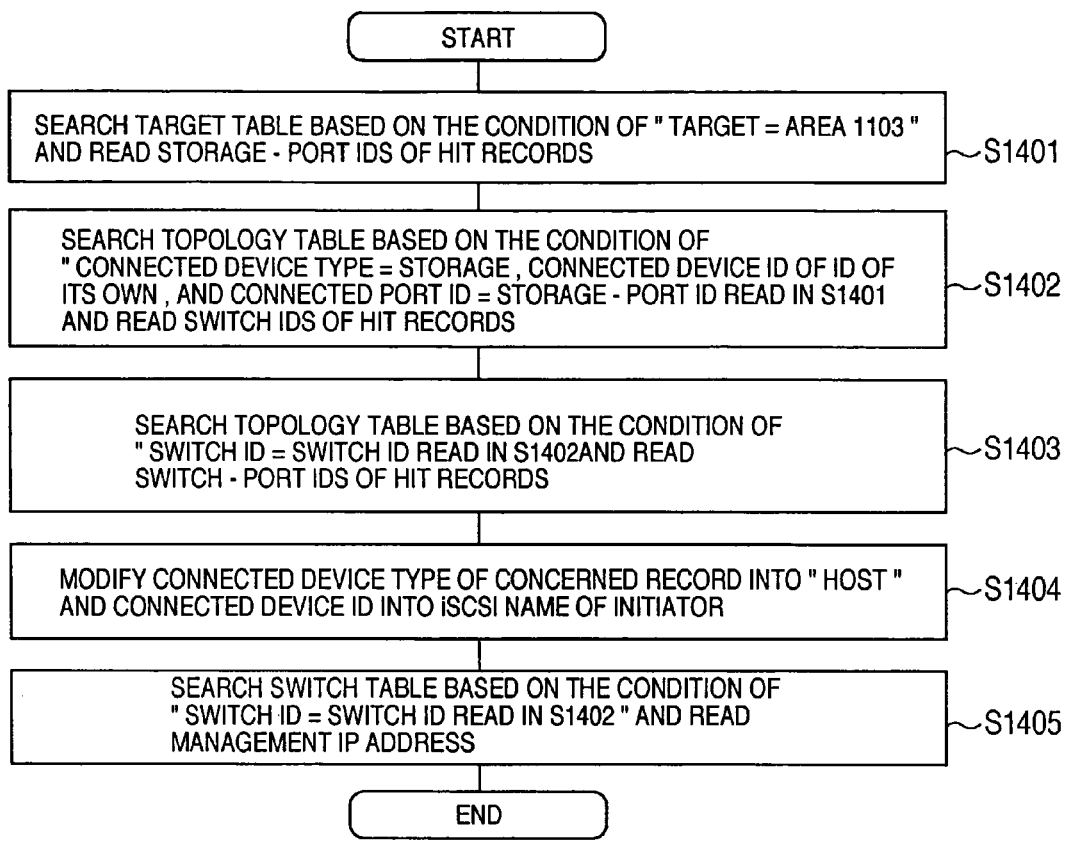
FIG. 14 is a flowchart showing an exemplary operating process of a process 2 of assigning a port to the host according to the first embodiment of the present invention.

FIG. 14 is a flowchart illustrating the exemplary routine of the host-side port assigning processing 2. This processing 2 is executed by the path management program 111 run by the CPU 104 of the storage device 1. In this processing 2, the CPU 104 of the storage device 1 searches the switch port that is not in use and then assign the proper switch port to the host 4 operating as the iSCSI initiator.

Hereafter, the description will be oriented to the concrete routine of the host-side port assigning processing 2. At first, the CPU 104 of the storage device 1 searches the target table 16 based on the condition that the content of the entry 1261 (target) matches with the content inputted in the area 1103 (iSCSI name of the iSCSI target) and then read the content of the entry 1262 (storage-port ID) of the record matched to this condition (S1401). Then, the CPU 104 of the storage device 1 searches the topology table 122 based on the condition that the content of the entry 1223 (connected device type) is "storage", the content of the entry 1224 (connected device ID) is a storage ID of its own, and the content of the entry 1225 (connected port ID) matches with the content of the entry 1262 (storage-port ID) read in the step S1401 and then read the content of the entry 1221 (switch ID) of the record matched to this condition (S1402).

Further, the CPU 104 of the storage device 1 searches the topology table 122 based on the condition that the content of the entry 1221 (switch ID) matches with the content of the entry 1221 (switch ID) read the step S1402 and the content of the entry 1223 (connected device type) is "null" and then read the content of the entry 1222 (switch-port ID) of the record matched to this condition (S1403). If, in the search of S1403, two or more records are found, the CPU 104 of the storage device 1 selects the record with the smallest content of the entry 1222 (switch-port ID) from those records. The processings of S1404 and S1405 are likewise to those of S1302 and S1303.

Figure 15:
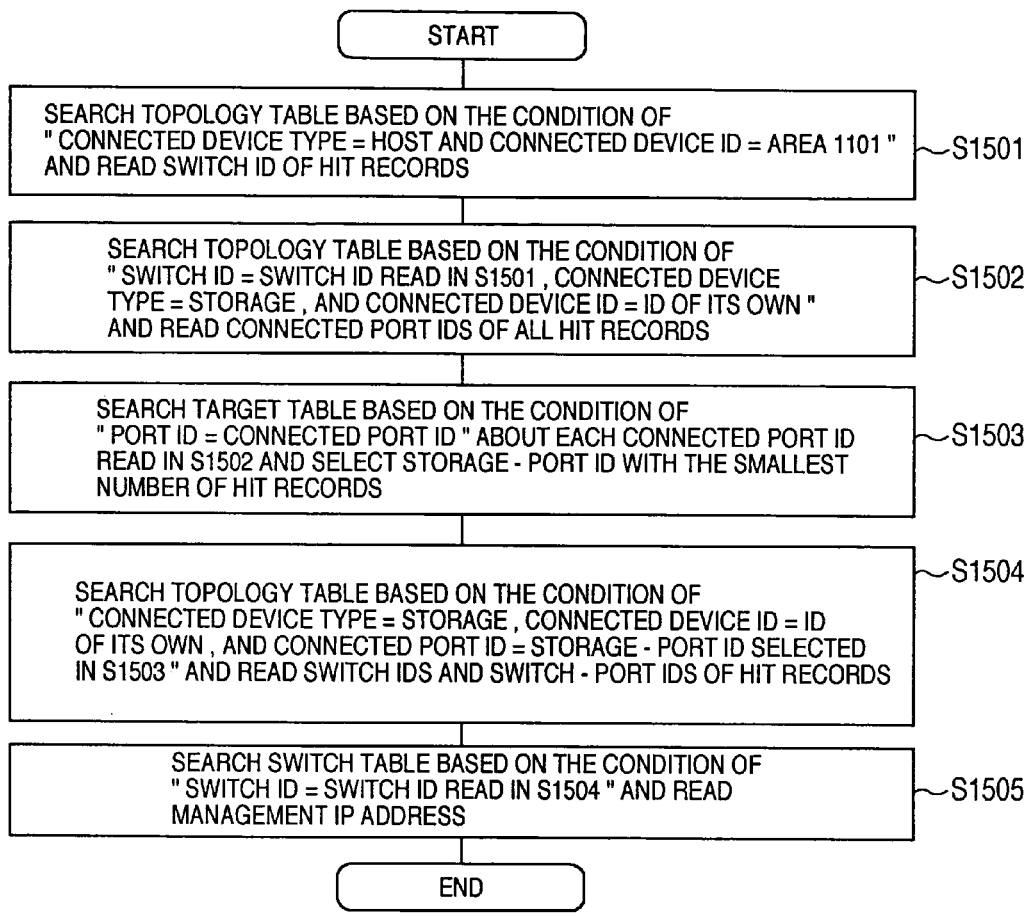
FIG. 15 is a flowchart showing an exemplary operating process of a process 2 of assigning a port to the storage device according to the first embodiment of the present invention.

FIG. 15 is a flowchart illustrating the exemplary routine of the storage-side port assigning processing 2. This processing 2 is executed by the bus management program 111 run by the CPU 104 of the storage device 1. In this processing 2, the CPU 104 of the storage device 1 searches the storage port with the smallest number of assigned iSCSI targets from the storage ports and then assign the proper storage port to the iSCSI target.

Then, the description will be oriented to the concrete routine of the storage-side port assigning processing 2. At first, the CPU 104 of the storage device 1 searches the topology table 122 based on the condition that the content of the entry 1223 (connected device type) is "host" and the content of the entry 1224 (connected device ID) matches with the content (the iSCSI name of the iSCSI initiator) inputted in the area 1101 and then read the content of the entry 1221 (switch ID) of the record matched to this condition (S1501). Next, the CPU 104 of the storage device 1 searches the topology table 122 based on the condition that the content of the entry 1221 (switch ID) matches with the content of the entry 1221 (switch ID) read in the step S1501, the content of the entry 1223 (connected device type) is "storage", and the content of the entry 1224 (connected device ID) is a storage ID of its own, read the content of the entry 1225 (connected port ID) of all the records matched to this condition, and then create a list of the storage-port IDs (S1502). The processing from the steps S1503 to S1505 is likewise to that from the steps S1312 to S1314.

Figure 16A:
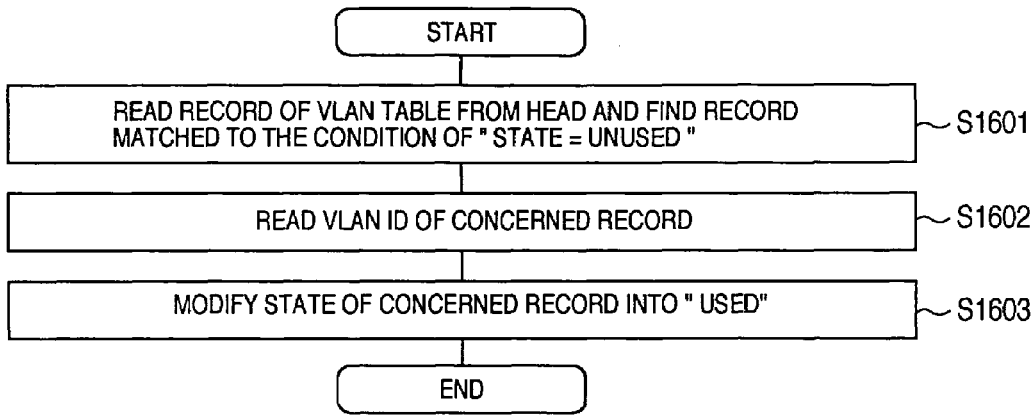
FIG. 16A is a flowchart showing a process of assigning a new VLAN.

FIG. 16A is a flowchart illustrating the exemplary routine of the new VLAN assigning processing. This processing is executed by the path management program 111 run by the CPU 104 of the storage device 1. In this processing., the CPU 104 of the storage device 1 searches the VLAN that is not in use and assign the proper VLAN to the path between the iSCSI initiator and the iSCSI target.

Hereafter, the description will be oriented to the concrete routine of the new VLAN assigning processing. At first, the CPU 104 of the storage device 1 reads the records of the VLAN table 121 from its head and find the record in which the content of the entry 1202 (state) is "unused" (S1601). Then, the CPU 104 of the storage device 1 reads the entry 1201 (VLAN ID) of the record found in the step S1601 (S1602) and then register "used" in the entry 1202 (state) of the record. This is the operating routine of the new VLAN assigning processing.

Figure 16B:
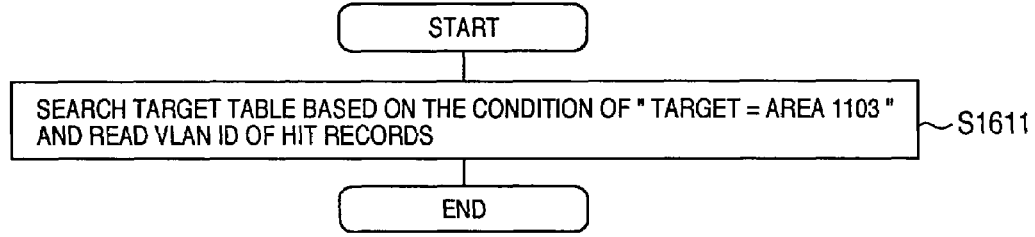
FIG. 16B is a flowchart showing a process 1 of retrieving a VLAN.

FIG. 16B is a flowchart illustrating the exemplary routine of the VLAN search processing 1. This processing 1 is executed by the path management program 11 run by the CPU 104 of the storage device 1. In this processing 1, the CPU 104 of the storage device 1 specifies which of the VLANs is connected with the storage port assigned to the iSCSI target.

Hereafter, the description will be oriented to the concrete routine of the VLAN search processing 1. The CPU 104 of the storage device 1 searches the target table 126 based on the condition that the content of the entry 1261 (target) matches with the content inputted in the area 1103, read the content of the entry 1263 (VLAN ID) of the record matched to this condition, and then terminate the VLAN search processing 1. This is the operating routine of the VLAN search processing 1.

Figure 16C:
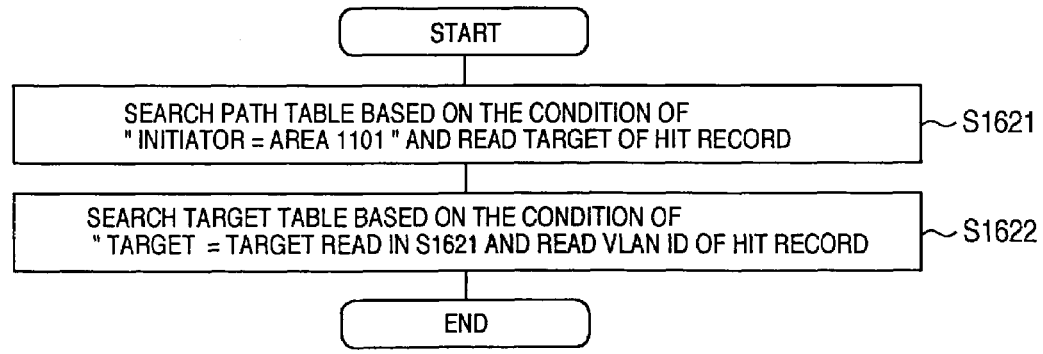
FIG. 16C is a flowchart showing an example of a process 2 of searching a VLAN.

FIG. 16C is a flowchart illustrating the exemplary routine of the VLAN search processing 2. This processing 2 is executed by the path management program 111 run by the CPU 104 of the storage device 1. In this processing 2, the CPU 104 of the storage device 1 specifies which of the VLANS is connected with the storage port assigned to the iSCSI target with the path connected with the iSCSI initiator.

Then, the description will be oriented to the concrete routine of the VLAN search processing 2. At first, the CPU 104 of the storage device 1 searches the path table 124 based on the condition that the content of the entry 1241 (initiator) matches with the content inputted in the area 1101 and then to read the content of the entry 1242 (target) of the record matched to this condition (S1621). Next, the CPU 104 of the storage device 1 searches the target table 126 based on the condition that the content of the entry 1261 (target) matches with the content of the entry 1242 (target) read in the step S1621, read the entry 1263 (VLAN ID) of the record matched to this condition, and then terminate the VLAN search processing 2 (S1622). This is the operating routine of the VLAN search processing 2.

Hereafter, the processing of the step S1004 or later shown in FIG. 10 will be described. At the step S1004 or later, the storage device 1 operates to register the discovery domain in the name management device 5, set the VLAN to the switch 3, and register the iSCSI name and the IP address of the iSCSI target to the name management device 5. Last, the management terminal 2 displays on the display 205 the switch port to be connected with the host 4 in which the iSCSI initiator inputted in the area 1101 is operating.

After the end of the path addition processing, the CPU 104 of the storage device 1 assembles the domain addition request containing a domain ID of a discovery domain to be newly added, the content inputted in the area 1101, and the content inputted in the area 1103 and then to transmit the domain addition request to the name management device 5 (S1004). In this embodiment, the domain ID is a character string composed of the VLAN ID and "DD" added at the head thereof. The VLAN ID is the content of the entry 1201 (VLAN ID) read in the step S1602. When the name management device 5 receives the domain addition request, the CPU 504 of the name management device 5 executes the domain management program 511 for performing the domain addition processing (S1005). In this domain addition processing, the CPU 504 of the name management device 5 reads the domain ID, the content inputted in the area 1101, and the content inputted in the area 1103 from the domain addition request and then to add two records to the domain table 522. Herein, the domain ID is registered in the entry 5221 (domain ID) of the first record to be added. The content inputted in the area 1101 is registered in the entry 5222 (iSCSI node). Further, the domain ID is registered in the entry 5221 (domain ID) of the second record. The content inputted in the area 1103 is registered in the entry 5222 (iSCSI node). After the foregoing domain addition processing is terminated, the CPU 504 of the name management device 5 assembles the domain addition response for representing that the domain addition becomes successful and then transmit the domain addition response to the storage device 1 (S1006).

In response to the domain addition response, the storage device 1 operates to assemble the port-based VLAN creation request containing the content of the entry 1222 (switch-port ID) read in the step S1301 and the content of the entry 1201 (VLAN ID) read in the step S1602 and then to transmit the port-based VLAN creation request to the switch 3 (S1007). The destination address of the port-based VLAN creation request transmitted in the step S1007 is the content of the entry 1232 (management IP address). When the switch 3 receives the port-based VLAN creation request, the CPU 304 of the switch 3 executes the VLAN configuration program 312 for performing the port-based VLAN creation processing (S1008). In the port-based VLAN creation processing, the CPU 304 of the switch 3 reads the content of the entry 1222 (switch-port ID) and the content of the entry 1201 (VLAN ID) from the port-based VLAN creation request and then search the record in which the content of the entry 3211 (switch-port ID) matches with the entry 1222 (switch-port ID) from the switch-port table 321. Then, the CPU 304 of the switch 3 registers the content of the entry 1201 (VLAN ID) in the entry 3212 (VLAN ID) of the proper searched record and the "port" in the entry 3213 (VLAN type). After the foregoing port-based VLAN creation processing is terminated, the CPU 304 of the switch 3 assembles the port-based VLAN creation response for representing the creation of the port-based VLAN becomes successful and then transmit the port-based VLAN creation response to the storage device 1 (S1009).

In response to the port-base VLAN creation response, the storage device 1 operates to assemble the tagged VLAN creation request containing the content of the entry 1222 (switch-port ID) read in the step S1313 and the content of the entry 1201 (VLAN ID) read in the step S1602 and then to transmit the tagged VLAN creation request to the switch 3 (S1010). The destination address of the tagged VLAN creation request transmitted in the step S1010 is the content of the entry 1232 read in the step S1314. When the switch 3 receives the tagged VLAN creation request, the CPU 304 of the switch executes the VLAN configuration program 312 for performing the tagged VLAN creation processing (S1011). In the tagged VLAN creation processing, the CPU 304 of the switch 3 reads the content of the entry 1222 (switch-port ID) and the content of the entry 1201 (VLAN ID) from the tagged VLAN creation request and then search from the switch-port table 321 the record in which the content of the entry 3211 (switch-port ID) matches with the content of the entry 1222 (switch-port ID). Then, the CPU 304 of the switch 3 adds the content of the entry 1201 (VLAN ID) to the entry 3212 (VLAN ID) of the record found in this search. The CPU 304 of the switch 3 registers "tag" in the entry 3213 (VLAN type) of the record. After the foregoing tagged VLAN creation processing is terminated, the CPU 304 of the switch 3 assembles the tagged VLAN creation response for representing the creation of the tagged VLAN becomes successful and then transmit the tagged VLAN creation response to the storage device 1 (S1012).

When the storage device 1 receives the tagged VLAN creation response, the CPU 104 of the storage device 1 executes the name registration program 112 for performing the following processing. At first, the CPU 104 of the storage device 1 searches the storage-port table 125 based on the condition that the content of the entry 1251 (storage-port ID) matches with the storage-port ID selected in the step S1312, read the entry 1252 (IP address) of the record matched to this condition, assemble the target registration request containing the content (iSCSI name of the iSCSI target) inputted in the area 1003 and the content of the entry 1252 (IP address), and then transmit the target registration request to the name management device 5 (S1013). When the name management device 5 receives the target request registration, the CPU 504 of the name management device 5 executes the iSCSI node management program 512 for performing the target registration processing (S1014). In the target registration processing, the CPU 504 of the name management device 5 reads the content inputted in the area 1003 and the content of the entry 1252 (IP address) from the target registration request and add the record to the iSCSI node table 521. The content inputted in the area 1003 is registered in the entry 5211 (iSCSI node) of the added record. The "target" is registered in the entry 5212 (node type). The content of the entry 1252 (IP address) is registered in the entry 5213 (IP address). After the completion of the foregoing target registration processing, the CPU 504 of the name management device 5 assembles the target registration response for representing the registration of the iSCSI target becomes successful and then transmit the target registration response to the storage device 1 (S1015).

When the storage device 1 receives the target registration response, the CPU 104 of the storage device 1 assembles the path addition response containing the contents of the entry 1221 (switch ID) and the entry 1222 (switch-port ID) read in the step S1301 and then transmit the path addition response to the management terminal 2 (S1016). When the management terminal 2 receives the path addition response, the CPU 204 of the management terminal 2 executes the GUI control program 211 for adding the rows composed of the contents inputted in the areas 1101, 1103 and 1105 to 1108 and performing the connected port notification screen display processing (S1017).

Figure 11B:
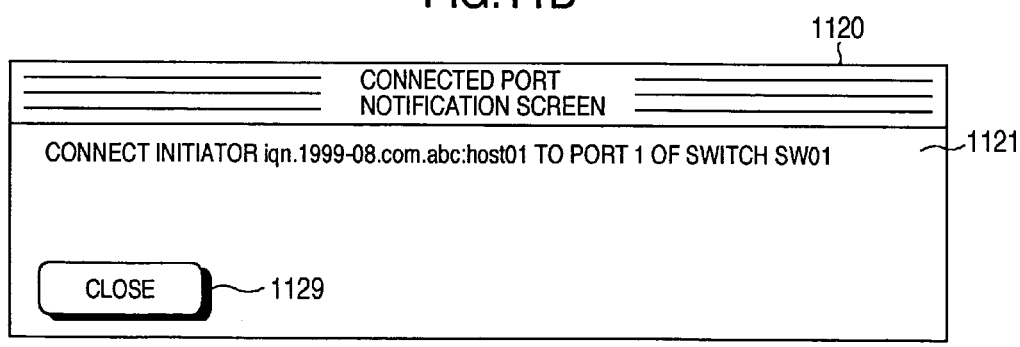
FIG. 11B is a diagram showing an example of a connecting destination port notice screen.

FIG. 11B shows an exemplary display of the connected port notification screen 1120. This screen 1120 includes an area 112 and a button 1129. The area 112 is used for representing the sentence for notifying the system administrator of the switch port to be connected with the host 4 in which the iSCSI initiator inputted in the area 1101 is operating. The button 1129 is used when the connected port notification screen 1120 is closed. In this connected port notification screen display processing, the CPU 204 of the management terminal 2 assembles the sentence for notifying the system administrator of the switch port to be connected with the host 4 from the content inputted in the area 1101 and the contents of the entries 1221 (switch ID) and 1222 (switch-port ID) read from the path addition response and then display the sentence on the area 1121.

The foregoing description has concerned with the exemplary communication sequence of the first case of the path addition. Next, the description will be oriented to the exemplary communication sequence of the second case of the path addition.

FIG. 17 shows an exemplary communication sequence of the second case of the path addition.

At first, when the system administrator instructs the management terminal 2 to display the path management screen 1100, the CPU 204 of the management terminal 2 executes the same path management screen display processing as the operation of the step S1001 (S1701). For the second case of the path addition, the system administrator inputs the iSCSI name of the iSCSI initiator with no path connected in the area 1101, specifies the button 1104, and selects the iSCSI name of the existing iSCSI target. Afterwards, when the system administrator specifies the button 1126 after the other parameters are set, like the step S1002, the CPU 204 of the management terminal 2 transmits the path addition request to the storage device 1 (S1702). When the storage device 1 receives the path addition request, like the step S1003, the CPU 104 of the storage device 1 performs the path addition processing (S1703). Since the case shown in FIG. 17 is the second one, the storage device 1 performs the processing from the steps S1201 to S1204 and S1211 to S1213 shown in FIG. 12.

After the completion of the path addition processing, the CPU 104 of the storage device 1 assembles the domain modification request for adding the iSCSI initiator to the existing discovery domain and transmit the domain modification request to the name management device 5 (S1704). This domain modification request includes the domain ID and the content inputted in the area 1101, the domain ID being composed of the content of the entry 1263 (VLAN ID) read in the step S1611 and the characters "DD" added at the head of the content. When the name management device 5 receives the domain modification request, the CPU 504 of the name management device 5 reads the domain ID and the content inputted in the area 1101 from the domain modification request and then add a record to the domain table 522. The domain ID is registered in the entry 5221 (domain ID) of the added record. The content inputted in the area 1101 is registered in the entry 5222 (iSCSI node). After the completion of the foregoing domain modification processing, the CPU 504 of the name management device 5 assembles the domain modification response for representing that the domain modification becomes successful and then transmit the domain modification response to the storage device 1 (S1706).

When the storage device 1 receives the domain modification response, the CPU 104 of the storage device 1 assembles the port VLAN creation request containing the content of the entry 1222 (switch-port ID) read in the step S1403 and the content of the entry 1263 (VLAN ID) read in the step S1611 and then transmit the port VLAN creation request to the switch 3 (S1707). The destination address of the port VLAN creation request transmitted in the step S1707 is the content of the entry 1232 (management IP address) read in the step S1405. When the switch 3 receives the port VLAN creation request, the CPU 304 of the switch 3 execute the VLAN configuration program 312 for performing the same port VLAN creation processing as the operation of S1008 (S1708). After the completion of the port VLAN creation processing, the CPU 304 of the switch 3 assembles the port VLAN creation response for representing that the creation of the port VLAN becomes successful and then transmit the port VLAN creation response to the storage device 1 (S1709).

When the storage device 1 receives the port VLAN creation response, like the step S1016, the CPU 104 of the storage device 1 transmits the path addition response to the management terminal 2 (S1710). When the management terminal 2 receives the path addition response, the CPU 204 of the management terminal 2 adds to the area 1108 rows composed of the contents inputted in the areas 1103 and 1105 and then perform the connected port notification screen display processing like the step S1017 (S1711).

The foregoing description has concerned with the exemplary communication sequence for the second case of the path addition. Then, the description will be oriented to the exemplary communication of the third case of the path addition.

At first, when the system administrator instructs the management terminal 2 to display the path management screen 100, the CPU 204 of the management terminal 2 executes the same path management screen display processing as the operation of S1001 (S1801). For the third case of the path addition, the system administrator specifies the button 1102, selects the iSCSI name of the existing iSCSI initiator, and inputs the iSCSI name of the iSCSI target with no path connected in the area 1103. Afterwards, when the system manger specifies the button 1126 after the other parameters are set, like the step S1002, the CPU 204 of the management terminal 2 transmits the path addition request to the storage device 1 (S1802). When the storage device 1 receives the path addition processing (S1803), like the step S1003, the CPU 104 of the storage device 1 performs the path addition processing (S1803). Since the case of FIG. 18 is the third case, the CPU 104 executes the processing from the steps 1201 to S1202, S1214 to S1215, and S1217 to 1221 shown in FIG. 12.

After the completion of the path addition processing, the CPU 104 of the storage device 1 assembles the domain modification request for adding the iSCSI target to the existing discovery domain and then transmit the request to the name management device 5 (S1804). This domain modification request is composed of a domain ID and the content inputted in the area 1103, the domain ID being composed of the content of the entry 1263 (VLAN ID) read in the step S1622 and the characters "DD" added at the head of the content. When the name management device 5 receives the domain modification request, the CPU 504 of the name management device 5 executes the same domain modification processing as the operation of the step S1705 except that the area 1101 in the step S1705 is substituted with the area 1103 (S1805). After the processing has completed, like the step S1706, the CPU 504 of the name management device 5 transmits the domain modification response to the storage device 1 (S1806).

When the storage device 1 receives the domain modification response, the CPU 104 of the storage device assembles the tagged VLAN creation request containing the content of the entry 1222 (switch-port ID) read in the step S1504 and the content of the entry 1263 (VLAN ID) read in the step S1622 and then transmit the tagged VLAN creation request to the switch 3 (S1807). The destination address of the tagged VLAN creation request transmitted in the step S1807 is the content of the entry 1232 (management IP address) read in the step S1505. When the switch receives the tagged VLAN creation request, the CPU 304 of the switch 3 executes the VLAN configuration program 312 and perform the tagged VLAN creation processing (S1808). In this processing, the CPU 304 of the switch 3 reads the content of the entry 1222 (switch-port ID) and the content of the entry 1263 (VLAN ID) from the tagged VLAN creation request, search from the switch-port table 321 a record in which the content of the entry 3211 (switch-port ID) matches with the content of the entry 1222 (switch-port ID), and then add the content of the entry 1263 (VLAN ID) to the entry 3212 (VLAN ID) of the record found in this search. Further, the CPU 304 of the switch 3 registers the "tag" in the entry 321 (VLAN type) of the record. After the completion of the foregoing tagged VLAN creation processing, the CPU 304 of the switch 3 assembles the tagged VLAN creation for representing the creation of the tagged VLAN becomes successful and then transmit the tagged VLAN creation response to the storage device 1 (S1809).

When the storage device 1 receives the tagged VLAN creation response, like the step S1013, the CPU 104 of the storage device 1 assembles the target registration request and then transmit the request to the name management device 5 (S1810). When the name management device 5 receives the target registration request, the CPU 504 of the name management device 5 executes the target registration processing like the step S1014 (S1811). After the completion of the target registration processing, like the step S1015, the CPU 504 of the name management device 5 transmits the target registration response to the storage device 1 (S1812).

When the storage device 1 receives the target registration response, the CPU 104 of the storage device 1 assembles the path addition response for representing that the path addition becomes successful and then transmit the response to the management terminal 2 (S1813).

When the management terminal 2 receives the path addition response, the rows composed of the contents inputted in the areas 1101, 1103 and 1105 are added to the area 1108.

The foregoing description has concerned with the exemplary communication sequence of the third case of the path addition.

In the following, path deletion between iSCSI initiator and iSCSI target will be explained.

The path deletion method executed by the system administrator may be divided into the following three cases. The first case concerns the deletion of a path between the iSCSI initiator with only one path connected and the iSCSI target.

For this case, at first, the storage device 1 receives the iSCSI names of the third iSCSI initiator and the third iSCSI target specified by the system administrator from the management terminal 2.

In order to unassign the storage port from the third iSCSI target, the target table 126 and the LU table 127 are modified by the storage device 1.

Then, the storage device 1 specifies the fourth switch port of the switch 3 connected with the host 4 of the third iSCSI initiator by referring to the topology table 122.

Further, the storage device 1 specifies the sixth switch port of the switch 3 connected with the switch port by referring to the topology table 122.

Then, the storage device 1 deletes from the name management device 6 the discovery domain composed of the third iSCSI initiator and the third iSCSI target.

Moreover, the storage device 1 deletes from the switch 3 a configuration of transferring packets between the fourth switch port and the sixth switch port (for example, a configuration of making these switch ports belong to the same VLAN).

Last, the management terminal 2 displays the port ID of the fourth switch port from which a cable is to be pulled on the display 205.

Figure 19:
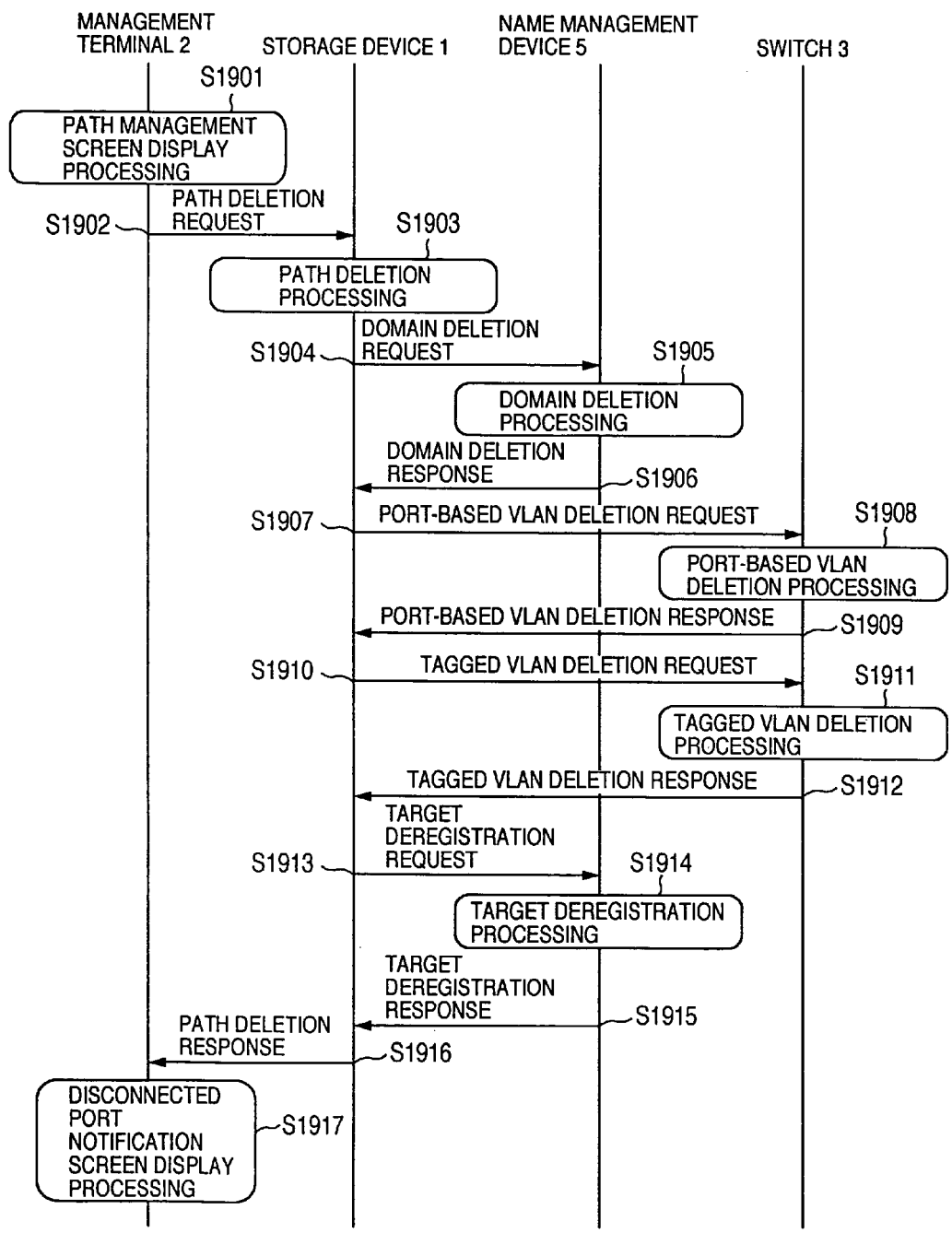
FIG. 19 is a diagram showing an example of the first communication sequence about deletion of a path according to the first embodiment of the present invention.

The exemplary communication sequence of the first case is illustrated in FIG. 19. The second case concerns deletion of a path between the iSCSI initiator with only one path connected and the iSCSI target with two or more paths connected.

For this case, like the first case, the storage device 1 receives the iSCSI names of the third iSCSI initiator and the third iSCSI target specified by the system administrator from the management terminal 2.

In order to unassign the third iSCSI target from the storage port, the target table 126 and the LU table 127 are modified by the storage device 1.

Then, the storage device 1 specifies the fourth switch port of the switch 3 connected with the host 4 of the third iSCSI initiator by referring to the topology table 122.

The storage device 1 specifies to the name management device 6 a configuration of deleting the third iSCSI initiator from the discovery domain to which the third iSCSI target belongs.

Further, the storage device 1 deletes from the switch 3 a configuration of transferring packets between the fourth switch port and another switch port (for example, a configuration of making these switch ports belong to the same VLAN).

Last, the management terminal 2 displays a port ID of the fourth switch port from which a cable is to be pulled.

Figure 22:
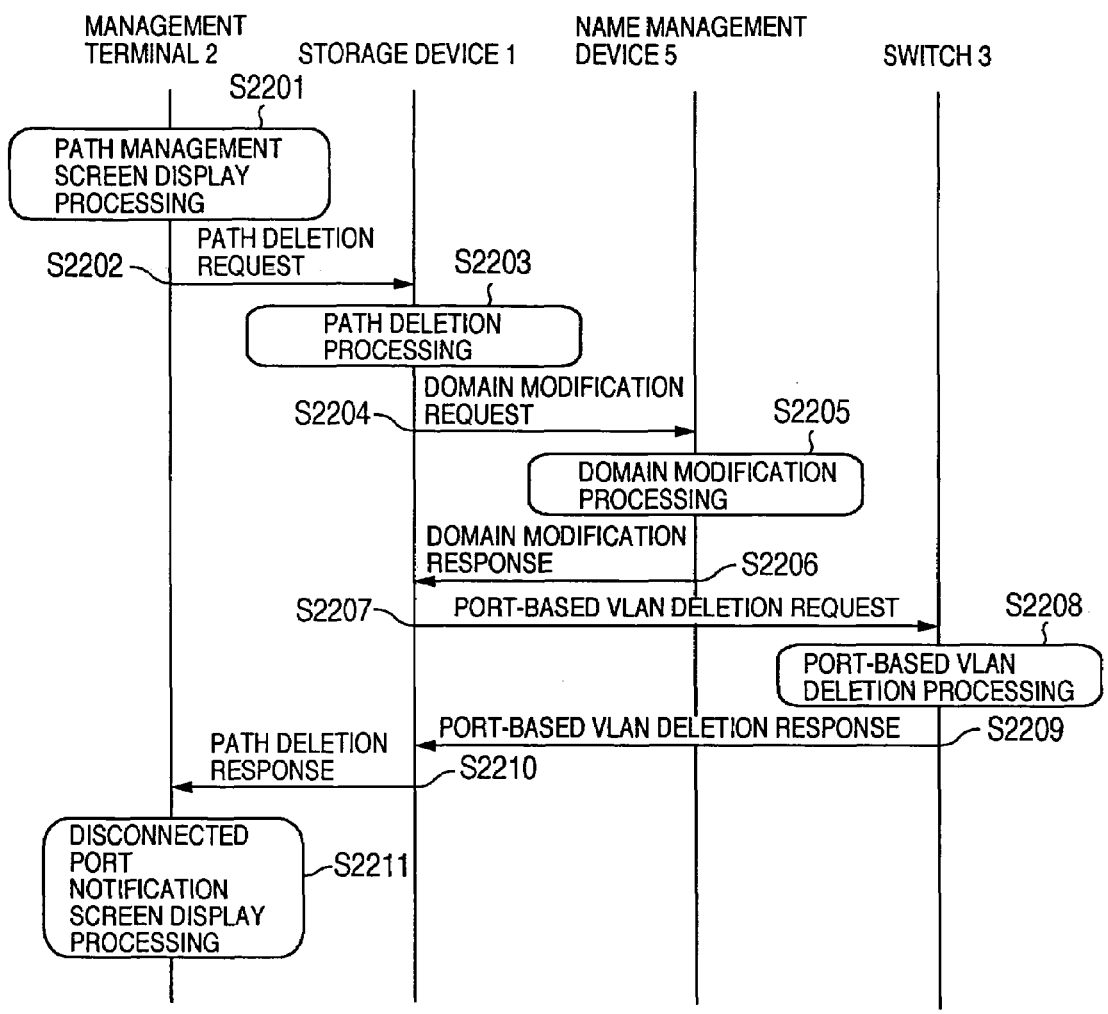
FIG. 22 is a diagram showing an example of the second communication sequence about deletion of a path according to the first embodiment of the present invention.

The exemplary communication sequence of the second case is illustrated in FIG. 22. As an example of this case, it is possible to refer to the case of deleting a host 4*d* from a cluster composed of the hosts 4*c* and 4*d* sharing the same LU of the storage device 1. The third case is the case of deleting a path between the iSCSI initiator with two or more paths connected and the iSCSI target with only one path connected.

For this case, like the first case, the storage device 1 receives the iSCSI names of the third iSCSI initiator and the third iSCSI target specified by the system administrator from the management terminal 2.

In order to unassign the storage port from the third iSCSI target,-the target table 126 and the LU table 127 are modified by the storage device 1.

Next, the storage device 1 specifies the sixth switch port of the switch 3 connected with the storage port by referring to the topology table 122.

Then, the storage device 1 specifies to the name management device 6 a configuration of deleting the third iSCSI target from the discovery domain to which the third iSCSI initiator belongs.

Further, the storage device 1 deletes from the switch 3 a configuration of transferring packets between the sixth switch port and another switch port (for example, a configuration of making these switch ports belong to the same VLAN).

Last, the management terminal 2 displays a port ID of the fourth switch port from which a cable is to be pulled on the display 205.

Figure 23:
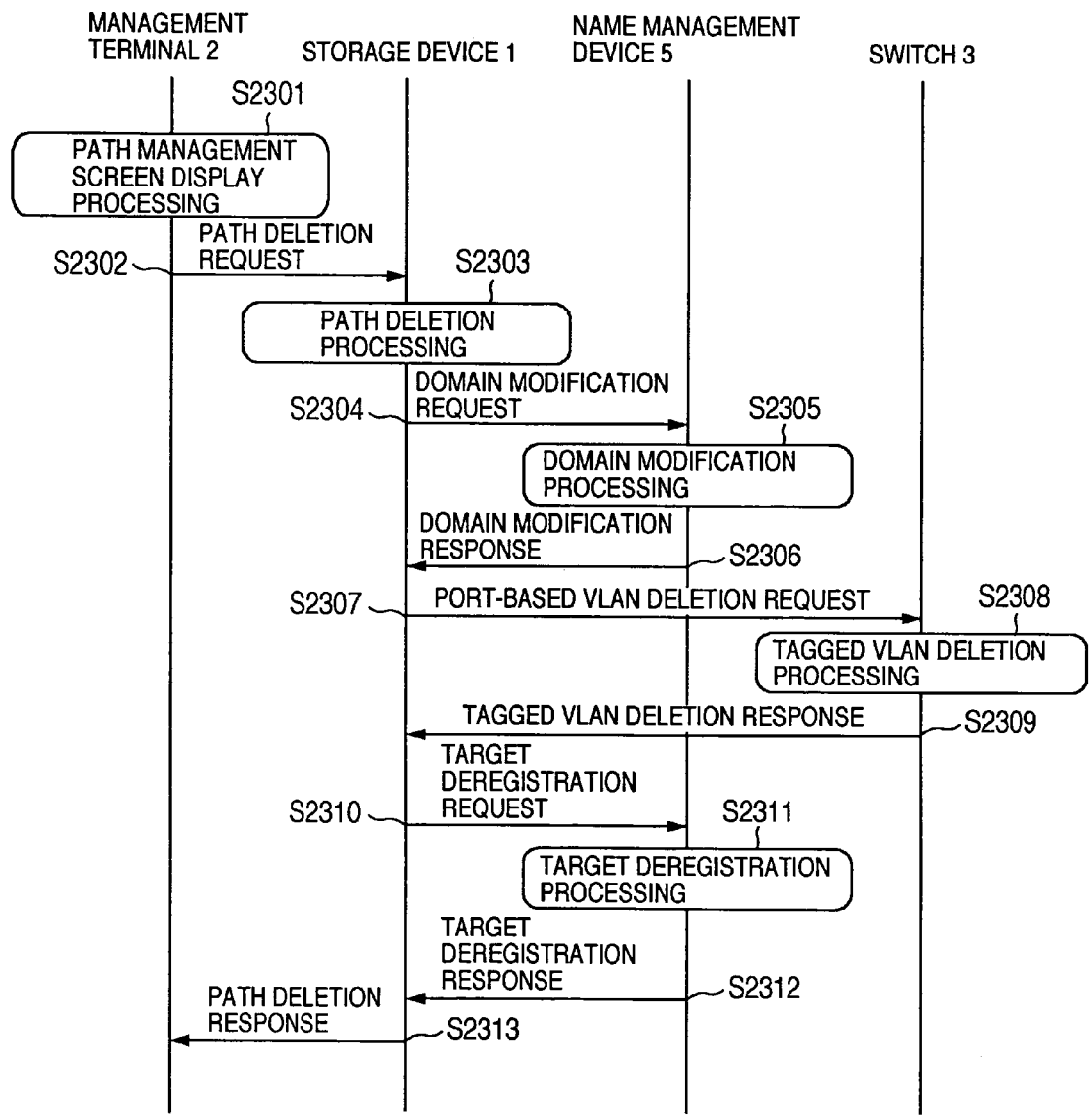
FIG. 23 is a diagram showing an example of the third communication sequence about deletion of a path according to the first embodiment of the present invention.

The exemplary communication sequence of the third case is illustrated in FIG. 23. As an example of this case, it is possible to refer to the following case. Though the LUs of two or more storage devices 1 are assigned to the host 4, one of these LUs is deregistered because the using frequency of the LU is quite low. Hereafter, the exemplary communication sequence of each case will be concretely described.

FIG. 19 shows an exemplary communication sequence of the first case of the path deletion.

At first, when the system administrator instructs the management terminal 2 to display the path management screen 1100, like the step S1001, the CPU 204 of the management terminal 2 executes the path management screen display processing (S1901). For the first case of the path deletion, when the system administrator specifies one row on the area 1108 and then specifies the button 1107, the CPU 204 of the management terminal 2 assembles the path deletion request containing the iSCSI name of the iSCSI initiator contained in the row, the iSCSI name of the iSCSI target, and the LUN and then transmit the path deletion request to the storage device 1 (S1902). When the storage device 1 receives the path deletion request, the CPU 104 of the storage device 1 executes the path management program 111 for performing the path deletion processing (S1903).

FIG. 20 is a flowchart illustrating the exemplary routine of the path deletion processing. This processing is executed by the path management program 111 run by the CPU 104 of the storage device 1. Like the path addition processing, the path deletion processing may be divided into three cases according to the foregoing cases about the number of the paths connected with the iSCSI initiator or the iSCSI target. For the first case, the CPU 104 of the storage device 1 deletes the records of each table, unassign the VLAN from the path to be deleted, and then unassign the switch port from the host 4 operating as the iSCSI initiator and the storage device 1 operating as the iSCSI target. For the second case, the CPU 104 of the storage device 1 deletes the records of each table and unassign the switch port from the host 4 operating as the iSCSI initiator. For the third case, the CPU 104 of the storage device 1 deletes the records of each table and unassign the switch port from the storage device 1 operating as the iSCSI target.

Then, the concrete routine of the path deletion processing will be described. At first, the CPU 104 of the storage device 1 reads the iSCSI names of the iSCSI initiator and the iSCSI target and the LUN from the path deletion request, search the path table 124 based on the condition that the content of the entry 1241 (initiator) matches with the iSCSI name of the iSCSI initiator, the content of the entry 1242 (target) matches with the iSCSI name of the iSCSI target, and delete the record matched to this condition (S2001). Next, the CPU 104 of the storage device 1 searches the target table 126 based on the condition that the content of the entry 1261 (target) matches with the iSCSI name of the iSCSI target read in the step S2001, read the contents of the entry 1262 (storage-port ID) and the entry 1263 (VLAN ID) of the record matched to this condition, and then delete the record (S2002). Herein, the process of the step S2002 is executed only for the first case. Next, the CPU 104 of the storage device 1 searches the LU table 127 based on the condition that the content of the entry 1271 (target) matches with the iSCSI name of the iSCSI target read in the step S2001 and delete the record matched to this condition (S2003). Herein, the process of the step S2003 is executed only for the third case.

Then, the CPU 104 of the storage device 1i searches the path table 124 based on the condition that the content of the entry 1241 (initiator) matches with the iSCSI name of the iSCSI initiator read in the step S2001 (S2004). Unless any record matched to this condition is found (S2005), the CPU 104 of the storage device 1 searches the path table 124 based on the condition that the content of the entry 1242 (target) matches with the iSCSI name of the iSCSI target read in the step S2001 (S2006). Unless any record matched to this condition is found, this is assumed to be the first case (S2007). Hence, the CPU 104 of the storage device 1 searches the VLAN table 121 based on the condition that the content of the entry 1201 (VLAN ID) matches with the content of the entry 1263 (VLAN ID) read in the step S2002 and then to register the "unused" in the entry 1202 (state) of the record matched to this condition (S2008). Then, the CPU 104 of the storage device 1 executes the host-side port unassigning processing (S2009) and the storage-side port unassigning processing (S2010), both of which will be described below, and then to terminate the path deletion processing.

If, in the step S2007, the record matched to the condition is found, this is assumed to be the second case. Hence, the CPU 104 of the storage device 1 executes the host-side port unassigning processing (S2011) and then to terminate the path deletion processing.

If, in the step S2005, the record matched to this condition is found, the CPU 104 of the storage device 1 searches the path table 124 based on the condition that the content of the entry 1242 (target) matches with the iSCSI name of the iSCSI target read in the step S2001 (S2012). If the record matched to this condition is found (S2013), it means the internal contradiction. As a result, the path deletion process is immediately terminated. If, in the step S2013, any record matched to this condition is not found, this is assumed to be the third case. Hence, the CPU 104 executes the storage-side port unassigning processing (S2014) and then terminate the path deletion processing. This is the operating routine of the path deletion processing. For the case of FIG. 19, the path deletion processing corresponds to the processing from the steps S2001 to S2010.

Hereafter, the description will be oriented to the routine of the host-side port unassigning processing and the storage-side port unassigning processing, which have been mentioned in the description about the path deletion processing.

FIG. 21A is a flowchart illustrating the exemplary routine of the host-side port unassigning processing. This processing is executed by the path management program 111 run by the CPU 104 of the storage device 1. In this processing, the CPU 104 specifies which of the switch ports has been assigned to the host 4 having been operating as the iSCSI initiator and then to unassign the switch port from the host 4.

Then, the description will be oriented to the concrete routine of the host-side port unassigning processing. At first, the CPU 104 of the storage device 1 searches the topology table 122 based on the condition that the content of the entry 1223 (connected device type) is "host" and the content of the entry 1224 (connected device ID) matches with the iSCSI name of the iSCSI initiator read in the step S2001 and then to read the contents of the entry 1221 (switch ID) and the entry 1222 (switch-port ID) of the record matched to this condition (S2101). Next, the CPU 104 of the storage device 1 registers the "null" in the entry 1223 (connected device type), the entry 1224 (connected device ID) and the entry 1225 (connected port ID) of the record found in the search of the step S2101 (S2102). Last, the CPU 104 searches the switch table 123 based on the condition that the content of the entry 1231 (switch ID) matches with the content of the entry 1221 (switch ID) read in the step S2101 and then to read the content of the entry 1232 from the record matched to this condition (S2103).

FIG. 21B is a flowchart illustrating the exemplary routine of the storage-side port unassigning processing. This processing is executed by the path management program 111 run by the CPU 104 of the storage device 1. In this processing, the CPU 104 specifies which of the switch ports have been assigned to the storage device 1 having been operating as the iSCSI target and then to unassign the specified switch port from the storage device 1.

Hereafter, the description will be oriented to the concrete routine of the storage-side port unassigning processing. At first, the CPU 104 of the storage device 1 searches the topology entry 122 based on the condition that the content of the entry 1223 (connected device type) is "storage", the content of the entry 1224 (connected device ID) is a storage ID of its own, and the content of the entry 1225 (connected port ID) matches with the content of the entry 1262 (storage-port ID) read in the step S2002 and then to read the entries 1221 (switch ID) and 1222 (switch-port ID) of the record matched to this condition (S2111). Then, the CPU 104 searches the switch table 123 based on the condition that the content of the entry 1231 (switch ID) matches with the content of the entry 1221 (switch ID) read in the step S2111 and then to read the content of the entry 1232 (management IP address) from the record matched to this condition (S2112).

Hereafter, the description will be oriented to the processing of the step S1904 or later shown in FIG. 19. At the step S1904 or later, the CPU 104 of the storage device 1 deletes the discovery domain, delete the configuration of the VLAN to the switch 3, and delete the information about the iSCSI target from the name management device 5. Last, the management terminal 2 displays a switch port from which a cable is to be pulled on the display 205.

After the completion of the path deletion processing, the CPU 104 of the storage device 1 assembles the domain deletion request containing a domain ID of the discovery domain to be deleted and then to transmit the request to the name management device 5 (S1904). The domain ID is composed of the entry 1263 (VLAN ID) read in the step S2002 and the characters "DD" added at the head thereof. When the name management device 5 receives the domain deletion request, the CPU 504 of the name management device 5 executes the domain deletion request for performing the domain deletion processing (S1905). In this processing, the CPU 504 of the name management device 5 reads the domain ID from the domain deletion request, search the domain table 522 based on the condition that the content of the entry 221 (domain ID) matches with the domain ID, and then delete all records matched to this condition. After the completion of the domain deletion processing, the CPU 504 of the name management device 5 assembles the domain deletion response for representing that the domain deletion becomes successful and then transmit the response to the storage device 1 (S1906).

When the storage device 1 receives the domain deletion response, the CPU 104 of the storage device 1 assembles the port VLAN deletion request containing the content of the entry 1222 (switch-port ID) read in the step S2101 and the content of the entry 1263 (VLAN ID) read in the step S2002 and then transmit the request to the switch 3 (S1907). The destination address of the port VLAN deletion request transmitted in the step S1907 is the content of the entry 1232 (management IP address) read in the step S2103. When the switch 3 receives the port VLAN deletion request, the CPU 304 of the switch 3 executes the VLAN configuration program 312 for performing the port VLAN deletion processing (S1908). In this processing, the CPU 304 of the switch 3 reads the contents of the entry 1222 (switch-port ID) and the entry 1263 (VLAN ID) from the port VLAN deletion request, search the record in which the content of the entry 3211 (switch-port ID) and the entry 1222 (switch-port ID), and then register "4096" in the entry 3212 (VLAN ID) of the record found in this search and "port" in the entry 3213 (VLAN type) thereof. After the completion of the port VLAN deletion processing, the CPU 304 of the switch 3 assembles the port VLAN deletion response for representing that the deletion of the port VLAN becomes successful and then transmits the response to the storage device 1 (S1909).

When the storage device 1 receives the port VLAN deletion response, the CPU 104 of the storage device 1 assembles the tagged VLAN deletion request containing the content of the entry 1222 (switch-port ID) read in the step S2111 and the content of the entry 1263 (VLAN ID) read in the step S2002 and then transmit the request to the switch 3 (S1910). The destination address of the tagged VLAN deletion request transmitted in the step S1910 is the content of the entry 1232 (management IP address) read in the step S2112. When the switch 3 receives the tagged VLAN deletion request, the CPU 3 of the switch 3 executes the VLAN configuration program 312 for performing the tagged VLAN deletion processing (S1911). In this processing, the CPU 304 of the switch 3 reads the contents of the entry 1222 (switch-port ID) and the entry 1263 (VLAN ID) from the tagged VLAN deletion request, search the record in which the content of the entry 3211 (switch-port ID) matches with the content of the entry 1222 (switch-port ID) from the switch-port table 321, and then delete the content of the entry 1263 (VLAN ID) from the entry 3212 (VLAN ID) of the record found in this search. If the content of the entry 3212 (VLAN ID) is made empty, the CPU 304 of the switch 3 registers "4096" in the entry 3212 (VLAN ID) of the record and "port" in the entry 3213 (VLAN type). This is because the VLAN default is the port-based VLAN. After the completion of the tagged VLAN deletion processing, the CPU 304 of the switch 3 assembles the tagged VLAN deletion response for representing that the deletion of the tagged VLAN becomes successful and then transmit the response to the storage device 1 (S1912).

When the storage device 1 receives the tagged VLAN deletion response, the CPU 104 of the storage device 1 searches the storage-port table 125 based on the condition that the content of the entry 1251 (storage-port ID) matches with the content of the entry 1262 (storage-port ID) read in the step S2002, read the content of the entry 1252 (IP address) of the record matched to this condition, assemble the target deregistration request containing the iSCSI name of the iSCSI target read in the step S2001 and the content of the entry 1252 (IP address) and then transmit the request to the name management device 5 (S1913). When the name management device 5 receives the target deregistration request, the CPU 504 of the name management device 5 executes the iSCSI node management program 512 for performing the target deregistration processing (S1914). In this processing, the CPU 504 of the name management device 5 reads the iSCSI name of the iSCSI target and the content of the entry 1252 (IP address) from the target deregistration request, search the iSCSI node table 521 based on the condition that the content of the entry 4211 (iSCSI node) matches with the iSCSI name of the iSCSI target, the content of the entry 5212 (node type) is "target", and the content of the entry 5213 (IP address) matches with the content of the entry 1252 (IP address), and then delete all records matched to this condition. After the completion of the target deregistration processing, the CPU 504 of the name management device 5 assembles the target deregistration response for representing that the deregistration of the information about the iSCSI target becomes successful and then transmit the response to the storage device 1 (S1915).

When the storage device 1 receives the target deregistration response, the CPU 104 of the storage device 1 assembles the path deletion response containing the contents of the entry 1221 (switch ID) and the entry 1222 (switch-port ID) read in the step S2101 and then transmit the response to the management terminal 2 (S1916).

When the management terminal 2 receives the path deletion response, the CPU 204 of the management terminal 2 executes the GUI control program 211, delete the one row corresponding with the deleted path from the area 1108, and perform the disconnected port notification screen processing (S1917).

Figure 11C:
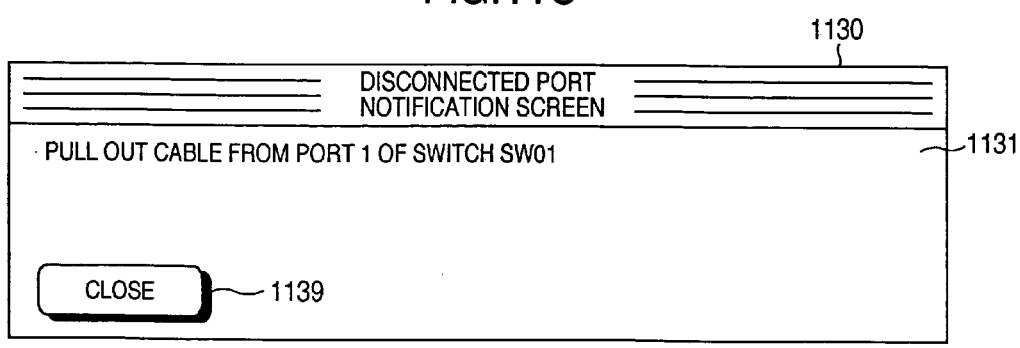
FIG. 11C is a diagram showing an example of a nullifying port notice screen.

FIG. 11C shows an example of the disconnected port notification screen 1130. This screen 1130 includes an area 1131 and a button 1139, the area 1131 being used for displaying the sentence for notifying the system administrator of the switch port from which the cable is to be pulled and the button 1139 being used when the disconnected port notification screen 1130 is closed. In the disconnected port notification screen processing, the CPU 204 of the management terminal 2 assembles the sentence for notifying the system administrator of the switch port from which the cable is to be pulled from the contents of the entry 1221 (switch ID) and the entry 1222 (switch-port ID) read from the path deletion response and then to display the sentence on the area 1131.

The foregoing description has concerned with the exemplary communication sequence of the first case of the path deletion. Next, the description will be oriented to the exemplary communication sequence of the second case of the path deletion.

FIG. 22 shows an exemplary communication sequence of the second case of the path deletion.

At first, when the system administrator instructs the management terminal 2 to display the path management screen 1100, like the step S1901, the CPU 204 of the management terminal 2 performs the path management screen display processing (S2201). When the system administrator specifies one row on the area 1108 and then specifies the button 1107, like the step S1902, the CPU 204 of the management terminal 2 assembles the path deletion request and then transmit the request to the storage device 1 (S2202). When the storage device 1 receives the path deletion request, the CPU 104 of the storage device 1 executes the path management program 111 for performing the path deletion processing (S2203). Since the case of FIG. 22 is the second case, the storage device 1 performs the processing from the steps S2001 to S2007 and S2011 shown in FIG. 20.

After the completion of the path deletion processing, the CPU 104 of the storage device 1 assembles the domain modification request for deleting the iSCSI initiator from the existing discovery domain and then to transmit the request to the name management device 5 (S2204). The domain modification request includes the domain ID and the iSCSI name of the iSCSI initiator read in the step S2001, the domain ID being composed of the content of the entry 1263 (VLAN ID) read in the step S2002 and the characters "DD" added at the head of the content. When the name management device 5 receives the domain modification request, the CPU 504 of the name management device 5 executes the domain management program 511 for performing the domain modification processing (S2205). In this process, the CPU 504 of the name management device 5 reads the domain ID and the iSCSI name of the iSCSI initiator from the domain modification request, search the domain table 522 based on the condition that the content of the entry 5221 (domain ID) matches with the domain ID and the content of the entry 5222 (iSCSI node) matches with the iSCSI name of the iSCSI initiator, and then delete all records matched to this condition. After the completion of the domain modification processing, the CPU 504 of the name management device 5 assembles the domain modification response for representing the domain modification becomes successful and then to transmit the response to the storage device 1 (S2206).

When the storage device 1 receives the domain modification response, like the step S1907, the CPU 104 of the storage device 1 assembles the port VLAN deletion request and then transmit the request to the switch 3 (S2207). When the switch 3 receives the port VLAN deletion request, like the step S1908, the CPU 304 of the switch 3 executes the port VLAN deletion processing (S2208). After the completion of the port VLAN deletion processing, like the step S1909, the CPU 304 of the switch 3 assembles the VLAN deletion response and then to transmit the response to the storage device 1 (S2209).

When the storage device 1 receives the VLAN deletion response, like the step S1909, the CPU 104 of the storage device 1 assembles the path deletion response and then to transmit the response to the management terminal 2 (S2210).

When the management terminal 2 receives the path deletion response, the CPU 204 of the management terminal 2 executes the GUI control program 211, delete the row corresponding with the deleted path from the area 1108, and, like the step S1917, perform the disconnected port notification screen display processing (S2211).

The foregoing description has concerned the exemplary communication sequence of the second case of the path deletion. In turn, the description will be oriented to the exemplary communication sequence of the third case of the path deletion.

FIG. 23 shows the exemplary communication sequence of the third case of the path deletion.

At first, when the system administrator instructs the management terminal 2 to display the path management screen 1100, the CPU 204 of the management terminal 2 performs the path management screen display processing (S2301) like the step S1901. Herein, when the system administrator specifies one row on the area 1108 and then specifies the button 1107, like the step S1902, the CPU 204 of the management terminal 2 assembles the path deletion request and then transmit the request to the storage device 1 (S2302). When the storage device 1 receives the path deletion request, the CPU 104 of the storage device 1, the CPU 104 of the storage device 1 executes the path management program 111 for performing the path deletion processing (S2303). Since the case shown in FIG. 23 is the third case, the storage device performs the processing from the steps S2001 to S2005 and from the steps S2012 to S2014.

After the completion of the path deletion processing, the CPU 104 of the storage device 1 assembles the domain modification request for deleting the iSCSI target from the existing discovery domain and then transmit the request to the name management device 5 (S2304). This domain modification request includes a domain ID and the iSCSI name of the iSCSI target read in the step S2001, the domain ID being composed of the content of the entry (VLAN ID) read in the step S2002 and the characters "DD" added at the head of the content thereof. When the name management device 5 receives the domain modification request, the CPU 504 of the name management device 5 executes the domain management program 511 for performing the domain modification processing (S2305). In this processing, the CPU 504 of the name management device 5 reads the domain ID and the iSCSI name of the iSCSI target from the domain modification request, search the domain table 522 based on the condition that the content of the entry 5221 (domain ID) matches with the domain ID, the content of the entry 5222 (iSCSI node) matches with the domain ID, and the content of the entry 5222 (iSCSI node) matches with the iSCSI name of the iSCSI target, and then delete all records matched to this condition. After the completion of the domain modification processing, the CPU 504 of the name management device 5 assembles the domain modification response for representing that the domain modification becomes successful and then transmits the response to the storage device 1 (S2306).

When the storage device 1 receives the domain modification response, like the step S1910, the CPU 1 of the storage device 1 assembles the tagged VLAN deletion request and then transmit the request to the switch 3 (S2307). When the switch 3 receives the tagged VLAN deletion request, like the step S1911, the CPU 304 of the switch 3 performs the tagged VLAN deletion processing (S2308). After the completion of the tagged VLAN deletion processing, like the step S1912, the CPU 304 of the switch 3 assembles the tagged VLAN deletion response and then transmit the response to the storage device 1 (S2309).

When the storage device receives the tagged VLAN deletion response, the CPU 104 of the storage device 1 searches the storage-port table 125 based on the condition that the content of the entry 1251 (storage-port ID) matches with the content of the entry 1262 (storage-port ID) read in the step S2002, read the content of the entry 1252 (IP address) of the record matched to this condition, assemble the target deregistration request containing the iSCSI name of the iSCSI target read in the step S2001 and the content of the entry 1252 (IP address), and then transmit the request to the name management device 5 (S2310). When the name management device 5 receives the target deregistration request, like the step S1914, the CPU 504 of the name management performs the target deregistration processing (S2311). After the completion of the target deregistration processing, like the step S1915, the CPU 504 of the name management device 5 assembles the target deregistration response and then transmit the response to the storage device 1 (S2312).

When the storage device 1 receives the target deregistration response, the CPU 104 of the storage device 1 assembles the path deletion response for representing that the path deletion becomes successful and then transmit the response to the management terminal 2 (S2313).

When the management terminal 2 receives the path deletion response, the CPU 204 of the management terminal 2 deletes one row specified by the system administrator from the area 1108.

The foregoing description has concerned with the exemplary communication sequence of the third case of the path deletion.

The foregoing description also has concerned with the first embodiment, According to the first embodiment, when the system administrator enters or selects the iSCSI name of the iSCSI initiator, the iSCSI name of the iSCSI target, and the LU on the path management screen 1100, the storage device 1 performs the configurations of the discovery domain and the VLAN at a batch in a manner to correspond the discovery domain with the VLAN one by one. This makes it possible to lessen the working load on the discovery domain and the VLAN, burdened to the system administrator, and prevent the erroneous configuration such as mismatch of the configuration of the discovery domain to that of the VLAN.

In turn, the description will be oriented to the second embodiment. The following description concerns with the different portion of the second embodiment from that of the first embodiment.

The second embodiment is concerned with a system including storage management device 9 for managing of plural storage devices 1. The storage management device 9 makes it easier to manage the path in a system composed of plural storage devices 1 by managing the information concerned with the plural storage devices.

Figure 24:
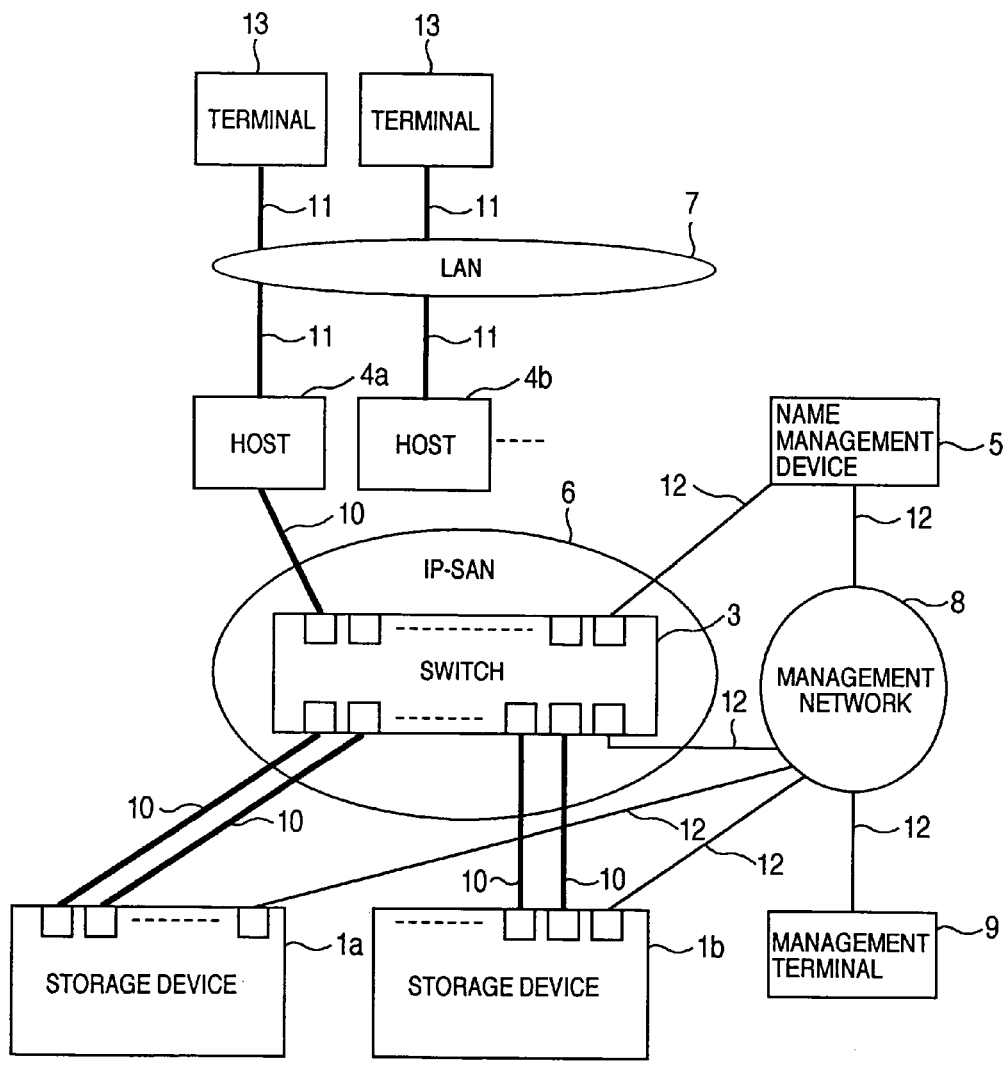
FIG. 24 is a block diagram showing an exemplary system arrangement according to the second embodiment of the present invention.

FIG. 24 shows an exemplary arrangement of the system according to the second embodiment, In this system, the storage devices 1a and 1b (collectively referred to as the "storage device 1") are connected with the IP-SAN 6 and the management network 8 with the communication lines 10 and 12, respectively. Further, the storage management device 9 is connected with the management network 8 through the communication line 12. The management terminal 2 is not included in this system.

Figures 25A, 25B:
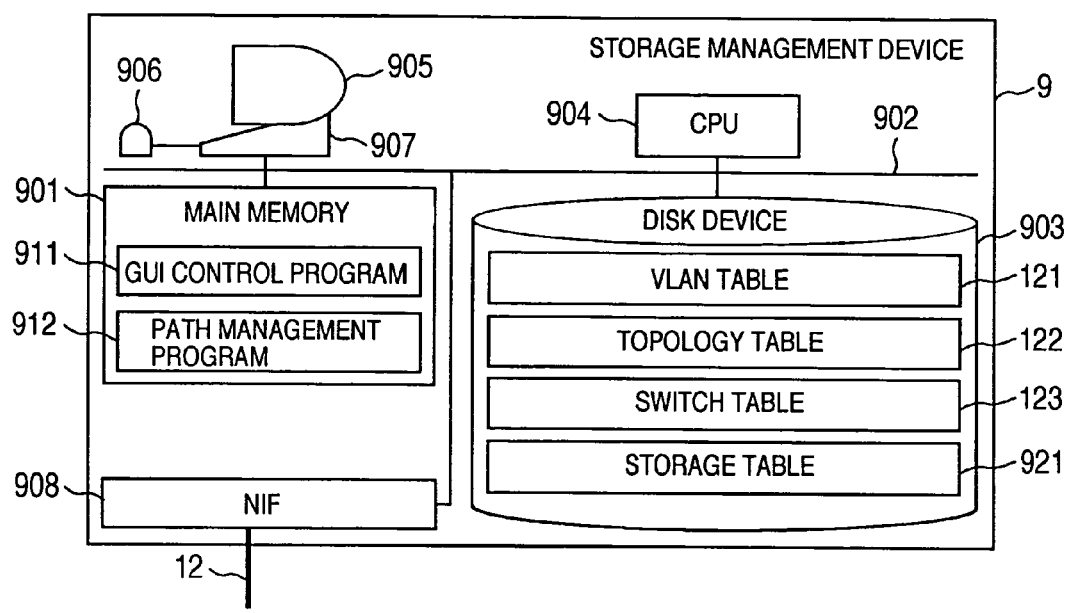
FIG. 25A is a diagram showing an exemplary arrangement of a storage management device.
FIG. 25B is a diagram showing an exemplary arrangement of a storage table.

FIG. 25A shows an exemplary arrangement of the storage management device 9. This device 9 is a computer including a main memory 901, a communication line 902, a disk device 903, a CPU 904, a display 905, a pointing device 906 such as a mouse, a character input device 907 such as a keyboard, and an NIF 908. The main memory 901 stores a GUI control program 911 to be executed in the CPU 904 when the graphical user interface is provided to the system administrator and a path management program 912 to be executed by the CPU 904 when the creation or deletion of the path is executed.

Further, the disk device 903 saves a storage table 921 for storing information about a VLAN table 121, a topology table 122, a switch table 123 and the storage device 1.

The storage device 1 of this embodiment has the same arrangement as that of the first embodiment except that the main memory 101 shown in FIG. 2 merely stores a cache area 110, a path management program 111, a name registration program 112, a path table 124, a storage-port table 125, a target table 126, and an LU table 127.

In turn, the description will be oriented to the data structures of each table stored in the disk device 903 of the storage management device 9. The storage table 821 takes an array structure and may store one or more records. However, the data structure of the table 821 is not limited to the array structure.

FIG. 25B shows the exemplary data structure of the storage table 921. The storage table 921 includes the same number of records as the storage devices located in the system. Each record of the storage table 921 includes an entry 9211 in which is registered a storage ID of the storage device 1 corresponding with the record and an entry 9212 in which is registered a management IP address. This management IP address is the destination IP address of the packets by which another device requests the storage device 1 to change its configuration.

Hereafter, the description will be oriented to the communication sequence, the GUI and the operating routine of this embodiment. The GUI is displayed on the display 905 by the GUI control program 911 run by the CPU 904 of the storage management device 905. The system administrator sets each parameter on the displayed GUI with the character input device 9 and the pointing device 906. In place of the GUI described in this embodiment, the storage management device 9 may provide a command line interface including the same function of the GUI.

Further, the display 905, the character input device 907, and the pointing device 906 may be provided in another computer rather than the storage management device 9. For example, those components such as the display 205 may be provided in the management terminal 2 being connected with the storage management device 9 through the management network 8 or a serial cable. In this case, the CPU 904 of the storage management terminal 2 executes the GUI control program 911 for transmitting the screen data to the management terminal 2 so that the management terminal 2 may display the GUI on the display 205. Further, the management terminal 2 is served to transmit to the storage management device 9 the parameters set by the system administrator with the character input device 207 and the pointing device 206.

In this embodiment, the system administrator performs the operations according to the following sequence. At first, the system administrator specifies initialization of the table to the storage device 1 and the switch 3 through the use of the storage management device 9. Then, the system administrator sets the information of each storage device that is a component of the system to the storage management device 9 with the storage management device 9. Further, the system administrator sets the information of each storage port included in each storage device 1 to the storage device 1 with the storage management device 9. Then, the system administrator sets the information of each switch 3 that is a component of the IP-SAN 6 to the storage management device 9 with the storage management device 9. After the completion of the foregoing operations, the system administrator adds a path between the iSCSI initiator and the iSCSI target with the storage management device 9.

At first, the description will be oriented to the initialization of the table used in this embodiment. When the system administrator instructs the storage management device 9 and the storage device 1 to perform the table initialization processing with the storage management device 9, like the first embodiment, the CPU 904 of the storage management device 9 eliminates all records in the topology table 122, the switch table 123 and the storage table 921, that is, make those tables empty. On the other hand, like the first embodiment, the CPU 104 of the storage device 1 performs the storage-port table initialization processing and eliminate all records in the path table 124, the target table 126 and the LU table 127. Afterwards, when the system administrator instructs the switch 3 to perform the table initialization processing with the storage management device 9, like the first embodiment, the CPU 304 of the switch 3 performs the switch-port table initialization processing and eliminate all records in the tables except the switch-port table.

Then, when the system administrator instructs the storage management device to display the storage management screen 2600, the CPU 904 of the storage management device 9 performs the storage management screen display processing for displaying the storage management screen 2600 on the display 905.

Figure 26A:
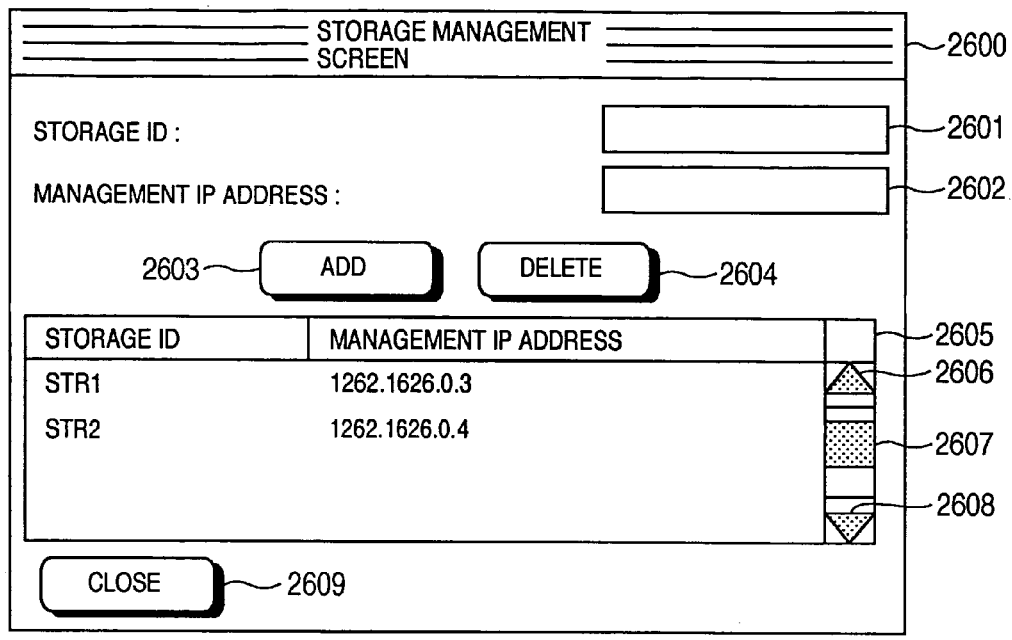
FIG. 26A is a diagram showing an example of a path management screen.

FIG. 26A shows an example of the storage management screen 2600 to be used by the system administrator when the information of the storage device is registered in or deleted from the storage management device 9. The storage management screen 2600 includes an area 2601 in which is registered the storage ID of the storage device 1 to be registered, an area 2602 in which is registered the management IP address of the storage device 1, a button 2603 to be used when the information inputted in the areas 2601 and 2602 is registered in the storage management device 9, a button 2604 to be used when the information of the storage device 1 specified by the area 2605 is deleted from the storage management device 9, an area 2605 on which is displayed the information of the storage device 1 registered in the storage management device 9, buttons 2606, 2607 and 2608 to used when the display range of the area 2605 is changed, and a button 2609 to be used when the storage management screen 2600 is closed.

The operation of the storage management screen display processing will be described below. In this processing, the CPU 904 of the storage management device 9 reads all records in the storage table 921 when the storage management screen 260 is displayed on the display 905 and then display the content of each record on the area 2605. This is the storage management screen display processing.

Afterwards, when the system administrator sets each parameter and then specifies the button 2603, the CPU 904 of the storage management device 9 adds the record to the storage table 921. The content inputted in the area 2601 is registered in the entry 9211 (storage ID) of the record to be added.

The content inputted in the area 2602 is registered in the entry 9212 (management IP address). Then, the CPU 904 of the storage management device adds the row composed of the contents in the areas 2601 and 2602 to the area 2605.

The system administrator repeats the foregoing operations the same times as the number of the storage devices 1 composing the system.

If the system administrator specifies one row in the area 2605 of the storage management screen 2600 and then the button 2604, the CPU 904 of the storage management device 9 deletes the record corresponding with the row from the storage table 921 and delete the row from the area 2605.

Like the operation of the first embodiment shown in FIG. 8, the system administrator sets the information of each storage port and each switch 3 included in each storage device 1. However, the operations of the steps S801, S802, S805, S810, S814 and S815 are executed by the storage management device 9, the operations of the steps S803, S804 and S812 are executed by the storage device 1, and the operations of the steps S803, S804 and S812 are executed by the switch 3. On the other hand, this embodiment does not need the operations of the steps S806 and S817. Further, after the end of the operation S811, the storage management device 9 transmits a request for transmitting a dummy packet to the storage device 1. In response, the storage device 1 executes the operation of the step S812. After the end of the operation S812, the storage device 1 transmits a dummy packet transmission response to the storage management device 9. In response, the storage management device 9 executes the operation of S813 or later.

Then, when the system administrator instructs the storage management device 9 to display the path management screen 2620, the CPU 904 of the storage management device 9 performs the path management screen display processing for displaying the path management screen 2620.

Figure 26B:
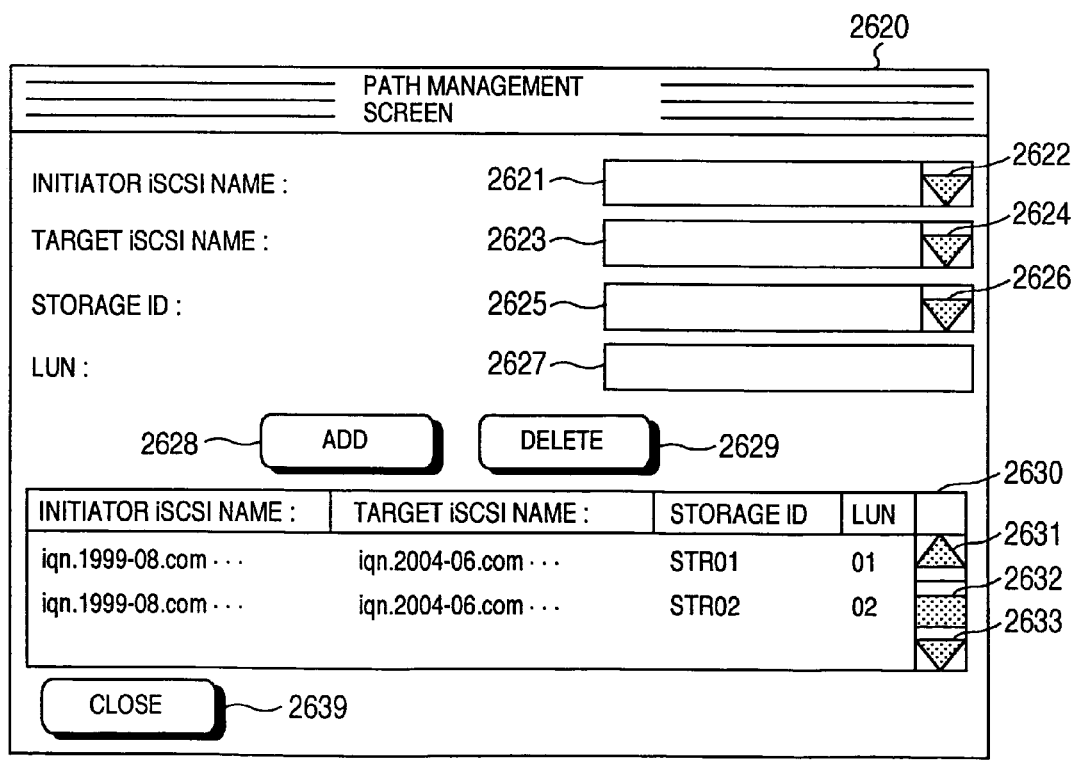
FIG. 26B is a diagram showing an example of a path management screen.

FIG. 26B shows an example of the path management screen 2620 of this embodiment, The path management screen 2620 is the same as the path management screen 1100 shown in FIG. 11A of the first embodiment except the respects of adding to the screen 1100 a button 2626 for selecting the storage ID of the storage device 1 from a list and an area 2625 for displaying the storage ID selected by the button 2626 and of adding the row for displaying the storage ID to the area 2630.

The path management screen display processing is the same as that of the first embodiment except that the storage management device 9 read all records of the path table 124 and the LU table 127 from the all storage devices 1 corresponding with the records of the storage table 921 through the management network 8 and that the contents of the entry 9211 (storage ID) of the storage table 921 are created as a list and the content may be selected on the list with the button 2626.

Herein, when the system administrator specifies the button 2628 or 2629, the CPU 904 of the storage management device 9 executes the path management program 912 for performing the path addition or deletion processing.

The communication sequence of the path addition of the first case in this embodiment is the same as that of the first embodiment shown in FIG. 10 except that the storage management device 9 executes the operations of the steps S1001, S1003, S1004, S1007, S1010 and S1017 shown in FIG. 10, that when the storage management device 9 receives the tagged VLAN creation response, the storage management device 9 transmits the target registration transmitting request to the storage device 1, in response, the storage device 1 executes the operation of the step S1013, receives the target registration response in the step S1015, transmit the target registration transmitting response to the storage management device 9 and in response, the storage management device 9 executes the operation of the step S1017, and that the operations of the steps S1002 and S1016 are not necessary. The communication sequence of the path addition of the second case in this embodiment is the same as that of FIG. 17 in the first embodiment except that the storage management device 9 executes the operations of the steps S1701, S1703, S1704, S1707 and S1711 and that the operations of the steps S1702 and S1710 are not necessary. The communication sequence of the path addition of the third case in this embodiment is the same as that of FIG. 18 in the first embodiment except that the storage management device 9 executes the operations of the steps S1801, S1803, S1804 and S1807 shown in FIG. 18, that when the storage management device 9 receives the tagged VLAN creation response in the step S1804, the storage management device 9 transmits the target registration transmitting request to the storage device 1, in response, the storage device 1 executes the operation of the step S1810, receives the target registration response in the step S1812 and then transmits the target registration transmitting response to the storage management device 9, and that the operations of the steps S1802 and S1813 are not necessary.

The path addition processing, the host-side port assigning processings 1 and 2, the storage-side port assigning processings 1 and 2, the new VALN assigning processing, the VLAN search processings 1 and 2 of this embodiment are the same as those of FIGS. 12 to 16 in the first embodiment except that the operations to the target table 126 and the LU table 127 are executed by the storage device 1 having the storage ID selected by the button 2626 but the other operations are executed by the storage management device 9 and that the storage ID of the storage device 1 is replaced with the storage ID selected by the button 2626.

The communication sequence of the path deletion of the first case in this embodiment is the same as that of FIG. 19 in the first embodiment except that the storage management device 9 executes the operations of the steps S1901, S1903, S1904, S1907, S1910 and S1917 shown in FIG. 19, that when the storage management device 9 receives the tagged VLAN deletion response in the step S1912, the storage management device 9 transmits the target deregistration transmitting request to the storage device 1, in response, the storage device 1 executes the operation of the step S1913 and receives the target deregistration response in the step S1915 and then transmits the target deregistration transmitting response to the storage management device 9, in response, the storage management device 9 executes the operation of the step S1917 and that the operations of the steps S1902 and S1916 are not necessary. The communication sequence of the path deletion of the second case in this embodiment is the same as that of FIG. 22 in the first embodiment except that the storage management device 9 executes the operations of the steps S2201, S2203, S2204, S2207 and S2211 and that the operations of the steps S2202 and S2210 are not necessary. The communication sequence of the path deletion of the third case in this embodiment is the same as that of FIG. 23 in the first embodiment except that the storage management device 9 executes the operations of the steps S2301, S2303, S2304 and S2307 shown in FIG. 23, that when the storage management device 9 receives the tagged VLAN deletion response in the step S2309, the storage management device 9 transmits the target deregistration transmitting request to the storage device 1, in response, the storage device 1 executes the operation of the step S2310 and receives the target deregistration response in the step S2312 and then transmits the target deregistration transmitting response to the storage management device 9 and that the operations of the steps S2302 and S2313 are not necessary.

The path deletion processing, the host-side port unassigning processing, and the storage-side port unassigning processing of this embodiment is the same as those of FIGS. 20 to 21 in the first embodiment except that the operations to the path table 123, the storage-port table 125, the target table 126 and the LU table 127 are executed by the storage device 1 having the storage ID specified on the area 2630 but the other operations are executed by the storage management device 9 and that the storage ID of the storage device 1 is replaced with the storage ID specified on the area 2630.

The foregoing description has been oriented to the second embodiment. According to the second embodiment, since the storage management device 9 manages the information about plural storage device 1, the system of this embodiment makes it possible to lessen the working load about the discovery domain and the VLAN configurations and prevent the erroneous configuration such as mismatch of the VLAN configuration to the discovery domain configuration even if the system is composed of plural storage devices 1.

The arrangement of the second embodiment to which the foregoing storage management device 9 is applied may hold true to the user's terminal 13. In this case, the user and the administrator may perform the same operations.

In turn, the description will be oriented to the different portion of the third embodiment from the first embodiment. The third embodiment concerns the storage device 1 for connecting the redundant path with the host 4. In this embodiment, when the system administrator adds a path between the iSCSI initiator and the iSCSI target through the use of the management terminal 2, the storage device 1 adds two paths passing through a different switch 3. This makes it possible to facilitate the path management in the highly available system that requires the redundant path.

Figure 27:
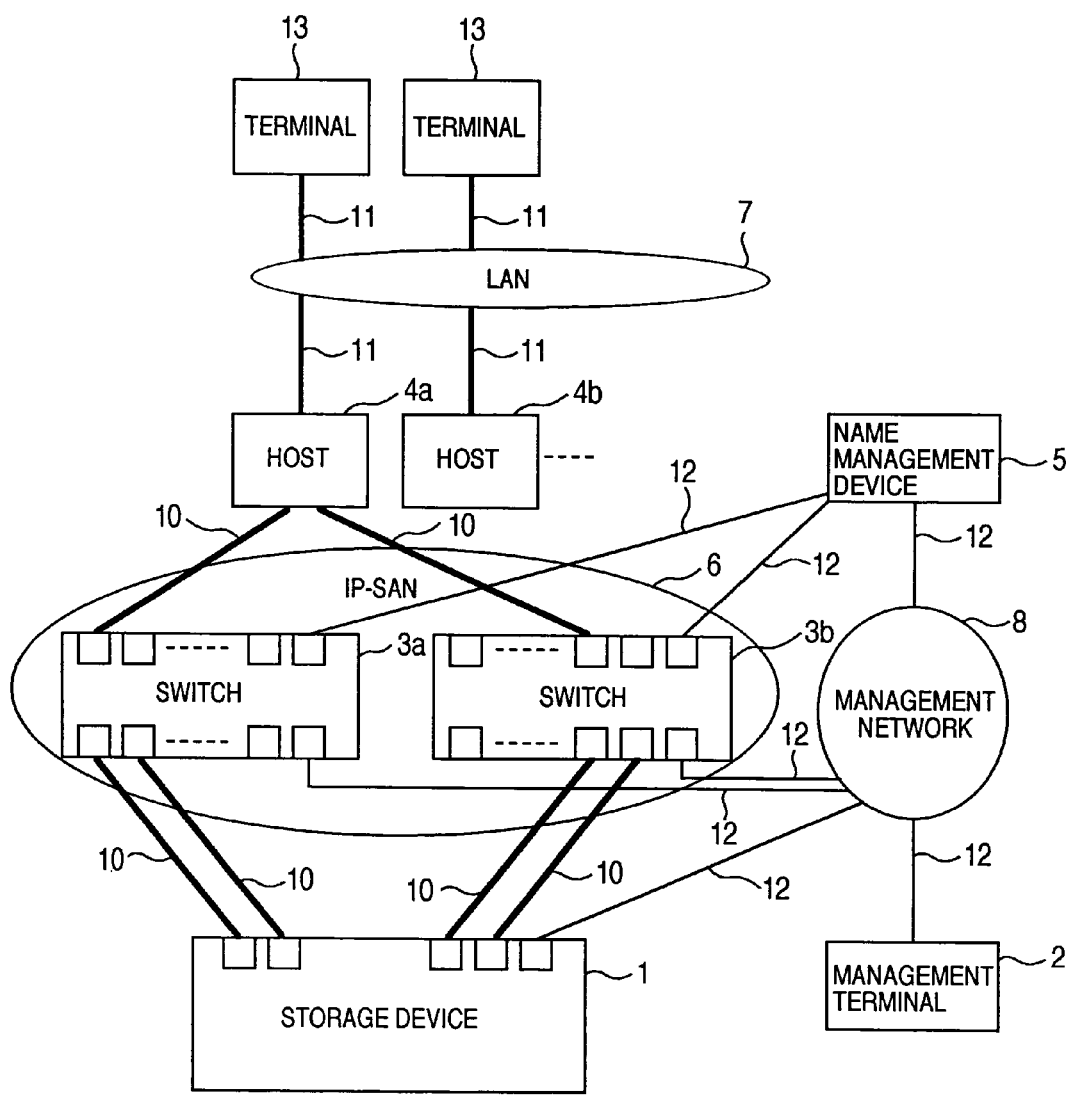
FIG. 27 is a block diagram showing an example of a system arrangement according to the third embodiment of the present invention.

FIG. 27 shows an exemplary arrangement of the system of this embodiment. In this embodiment, if the host 4 is connected with the IP-SAN 6, the two communication lines 10 are connected with their respective switches 3. In FIG. 27, for example, the host 4a with the path connected with the storage device 1 is connected with the switches 3a and 3b. Later, the switches 3a and 3b are collectively called the switch 3.

The communication sequence and the operating routine of this embodiment will be described below.

At first, the description will be oriented to the path addition processing, the host-side port assigning processings 1 and 2, and the storage-side port assigning processings 1 and 2 in this embodiment.

In the path addition processing shown in FIG. 12, the CPU 104 of the storage device 1 executes both the host-side assigning processing 1 (S1205) and the storage-side port assigning processing 1 (S1206) twice. However, the content of the entry 1221 (switch ID) in the first execution time is different from that in the second execution time. Further, in the step S1209, the CPU 104 of the storage device 1 adds two records to the target table 126. The content inputted in the areas 1103 is registered in the entry 1261 (target) and the VLAN ID read in the step S1602 of the new VLAN assigning processing is registered in the entry 1263 (VLAN ID). Further, the storage-port ID selected in the steps S1312 in the first execution time of the storage-side port assigning processing 1 is registered in the entry 1262 (storage-port ID) of the first record. The storage-port ID selected in the step S1312 in the second execution time of the storage-side port assigning processing 1 is registered in the entry 1262 (storage-port ID) of the second record.

In the host-side port assigning processing 2 (S1211), in the step S1401, the CPU 104 of the storage device 1 reads the contents of the entries 1262 (storage-port ID) of the two records matched to the condition and perform the processing from the steps S1402 to S1405 through these contents.

Likewise, in the storage-side port assigning processing 2 (S1217), in the step S1501, the CPU 104 of the storage device 1 reads the contents of the entries 1221 (switch ID) of the two records matched to the condition and perform the processing from the steps S1502 to S1505 through these contents. Further, in the step S1220, the CPU 104 of the storage device 1 adds two records to the target table 126. The content inputted in the area 1103 is registered in the entries 1261 (target) of the two added records. The VLAN ID read in the step S1622 of the VLAN search processing 2 is registered in the entry 1263 (VLAN ID). Then, the storage-port ID selected in the step S1503 in the first execution time of the storage-side port assigning processing 2 is registered in the entry 1262 (storage-port ID) of the first record. The storage-port ID selected in the step S1503 in the second execution time of the storage-side port assigning processing 2 is registered in the entry 1262 (storage-port ID) of the second record.

In turn, the description will be oriented to the communication sequence of the path addition according to this embodiment.

The communication sequence of the path addition of this embodiment is the same as that of the first embodiment except the following respects. First, the CPU 104 of the storage device executes the operation and communication from the steps S1007 to S1009 shown in FIG. 10 with respect to two switches 3. The management IP address of each switch 3 is read by the CPU 104 of the storage device 1 in the step S1303 of the first execution time of the host-side port assigning processing 1 and the step S1303 of the second execution time thereof. Second, the CPU 104 of the storage device 1 executes the operation and communication from the steps S1010 to S1012 shown in FIG. 10 with respect to the two switches 3. The management IP address of each switch 3 is read by the CPU 104 of the storage device 1 in the step S1314 of the first execution time of the storage-port assigning processing 1 and the step S1013 of the second execution thereof. Third, the CPU 104 of the storage device 1 executes the operation and communication from the steps S1013 to S1015 shown in FIG. 10 twice. For the first execution time is used the storage ID selected in the step S1312 when the storage-port assigning processing 1 is executed first. For the second execution time is used the storage-port ID selected in the step S1312 in the second execution time of the storage-port assigning processing 1.

The communication sequence of the path deletion of the second case in this embodiment is the same as that of the first embodiment except that the CPU 104 of the storage device 1 executes the operation and communication from the steps S1707 to S1709 shown in FIG. 17 with respect to the two switches 3. The management IP address of each switch 3 is read by the CPU 104 of the storage device 1 in the first and the second execution times of the step S1405 of the host-side port assigning processing 2.

In this embodiment, the communication sequence of the path deletion of the third case in this embodiment is the same as that of the first embodiment except the following two respects. First, the CPU 104 of the storage device 1 executes the operation and communication from the steps S1807 to S1809 shown in FIG. 18 with respect to the two switches 3. The management IP address of each switch 3 is read by the CPU 104 of the storage device 1 in the first and the second execution times of the step S1505 of the storage-side port assigning processing 2. Second, the CPU 104 of the storage device 1 executes the operation and communication from the steps S1810 to S1812 shown in FIG. 18 twice. For the first time is used a storage-port ID selected in the first execution time of the step S1503 of the processing 2. For the second is used a storage-port ID selected in the second execution time of the step S1503 of the processing 2.

In turn, the description will be oriented to the path deletion processing, the host-side port unassigning processing, and the storage-side unassigning processing of this embodiment.

In the path deletion processing, the CPU 104 of the storage device 1 reads the contents of the entries 1262 (storage-port ID) of the two records matched to the condition in the step S2002 shown in FIG. 20 and then execute the storage-port unassigning processing (S2010 and S2014) through the use of these contents twice.

Further, the CPU 104 of the storage device 1 reads two pairs of the entry 1221 (switch ID) and the entry 1222 (switch-port ID) of the two records matched to the condition in the step S2101 and then execute the processing from the steps S2102 to S2103 through the use of these contents.

In turn, the description will be oriented to the communication sequence of the path deletion of this embodiment.

In this embodiment, the communication sequence of the path deletion of the first case is the same as that of the first embodiment except the following three respects. First, the CPU 104 of the storage device 1 executes the operation and communication from the steps S1907 to S1909 shown in FIG. 19 with respect to the two switches. The management IP address of each switch 3 is read by the CPU 104 of the storage device 1 in the first execution time of the step S2103 of the host-side port unassigning processing and the second execution time of the step S2013 of the host-side unassigning processing. Second, the CPU 104 of the storage device 1 executes the operation and communication from the steps S1910 to S1912 shown in FIG. 19 with respect to the two switches 3. The management IP address of each switch 3 is read in the step S2112 of the first execution time of the storage-side port unassigning processing and the step S2112 of the second execution time thereof. Third, the CPU 104 of the storage device 1 executes the operation and communication from the steps S1913 to S1915 through the use of the contents of the two entries 1262 (storage-port ID) read in the step S2002 twice.

The communication sequence of the path deletion of the second case of this embodiment is the same as that of the first embodiment except that the CPU 104 of the storage device 1 executes the operation and communication from the steps S2207 to S2209 shown in FIG. 22 with respect to the two switches 3. The management IP address of each switch 3 is read by the CPU 104 of the storage device 1 in the first execution time of the step S2103 of the host-side unassigning processing and the second execution time of the step S2103 thereof.

The communication sequence of the path deletion of the third case of this embodiment is the same as that of the first embodiment except the following two respects. First, the CPU 104 of the storage device 1 executes the operation and communication from the steps S2307 to S2309 shown in FIG. 23 with respect to the two switches 3. The management IP address of each switch 3 is read by the CPU 104 of the storage device 1 in the step S2112 of the first execution time of the storage-side port unassigning processing and in the steps S2112 of the second execution time thereof. Second, the CPU 104 of the storage device 1 executes the operation and communication from the steps S2310 to S2312 through the contents of the two entries 1262 (storage-port ID) read in the step S2002 twice.

Last, the description will be oriented to the GUI of this embodiment.

The connected port notification screen of this embodiment is the same as that shown in FIG. 11C except that on the area 1221 shown in FIG. 11B are displayed two combinations of the switch 3 and the switch port to which the host 4 is to be connected.

The disconnected port notification screen of this embodiment is the same as that shown in FIG. 11C except that on the area 1231 shown in FIG. 11C are displayed two combinations of the switch 3 and the switch port from which the cable is to be pulled.

The foregoing description has concerned with the foregoing third embodiment. According to the third embodiment, the storage device 1 adds two paths passing through the different switch 3 for the path deletion processing. If the system requires the high availability, this embodiment makes it possible for that system required to make the path redundant to lessen the operating work about the configuration of the discovery domain and the VLAN, burdened to the system administrator, and to prevent the erroneous configuration such as mismatch of the VLAN configuration to the discovery domain configuration.

The present invention is effective in lessening the working load of the system administrator about the configurations of the discovery while adding path between iSCSI initiator and iSCSI target domain and the VLAN and preventing the erroneous configuration such as mismatch of the VLAN configuration to the discovery domain configuration.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage system coupled to a packet transfer device and a name management device, the storage system comprising:
   a control device comprising a memory; and
   a plurality of disk devices to configure a plurality of logical volumes under control of said control device;
   a plurality of storage ports coupled with the packet transfer device and the name management device, said packet transfer device including a plurality of packet transfer device ports coupled with a plurality of computers, and said name management device being configured to manage a domain including at least one of said plurality of computers and at least one of said plurality of logical volumes which is accessible from said at least one of said plurality of computers;
   wherein connection relation information which describes the connections among said plurality of storage ports included in said storage system, said plurality of computers, and said plurality of packet transfer device ports included in said packet transfer device is recorded in said memory;
   wherein said control device receives a computer identifier of a first computer of said plurality of computers and a logical volume identifier of a first logical volume of said plurality of logical volumes from a management terminal coupled with said storage system;
   wherein by referring to said connection relation information, said control device specifies an unused first packet transfer device port of said plurality of packet transfer device ports and a second packet transfer device port of said plurality of packet transfer device ports, said first packet transfer device port being coupled with said first computer, and said second packet transfer device port being coupled with said storage system;
   wherein said control device instructs said packet transfer device to allow packets to be transferred between said first packet transfer device port and said second packet transfer device port;
   wherein said control device transmits said computer identifier of said first computer and said logical volume identifier of said first logical volume to said name management device to register a domain including said first computer and said first logical volume in said name management device, so that said name management device informs said first computer of logical volumes including said first logical volume which belong to a same domain as said first computer when said first computer sends an inquiry to said name management device;
   wherein by referring to said connection relation information, said control device specifies a first storage port of said plurality of storage ports, wherein said first storage port being coupled with said second packet transfer port;
   wherein said control device assigns said first storage port to said first logical volume to allow access to said first logical volume via said first storage port; and
   wherein when the control device receives a request to add a packet transfer device, the control device is configured to:
   receive, from the added packet transfer device, identifiers of packet transfer ports of the added packet transfer device;
   get MAC addresses of each packet transfer port of the added packet transfer device, wherein each packet transfer port is coupled to one of said plurality of storage ports;
   receive, from the added packet transfer device, information about relationships between each of the MAC addresses of each of the packet transfer ports of the added packet transfer device and each of the identifiers of each packet transfer port of the added packet transfer device;
   generate information representing connection relationships between said plurality of storage ports and said plurality of packet transfer ports based on the received identifiers, the MAC addresses, and the received relationship information; and
   add the generated information to said connection relation information.

2. A storage system according to claim 1, further comprising said control device selecting said second packet transfer device port, and when said control device is selecting said second packet transfer device port, said control device specifies a storage port with the smallest number of assigned logical volumes from said plurality of storage ports included in said storage system and selects a packet transfer device port from said plurality of packet transfer device ports included in said packet transfer device connected with said specified storage port as said second packet transfer device port.

3. A storage system according to claim 2, wherein said control device stores traffic of each of said plurality of storage ports included in said storage system, when selecting said second packet transfer device port, specifies a storage port with the smallest traffic from said plurality of storage ports included in said storage system and selects a packet transfer device port from said plurality of packet transfer device ports included in said packet transfer device connected with said specified storage port as said second packet transfer device port.

4. A storage system according to claim 3, wherein said control device selects said first packet transfer device port and then outputs an identifier of said packet transfer device and an identifier of said first packet transfer device port to a display device included in said name management terminal.

5. A storage system according to claim 4, wherein said control device receives an identifier of a third computer and an identifier of a third logical volume from said name management device, specifies a fourth storage port included in said packet transfer device connected with said third computer by referring to information about said connection relation information, specifies a fifth storage port included in said storage system and assigned to said third logical volume, specifies a sixth storage port included in said packet transfer device and connected with said fifth storage port, instructs said name management device to execute a processing of deleting a group composed of said third computer and said third logical volume, and instructs said packet transfer device to deregister a configuration of allowing packets to be transferred between said fourth storage port and said sixth storage port.

6. A storage system according to claim 5, wherein said control device unassigns said fifth storage port from said third logical volume before specifying said fourth storage port included in said packet transfer device.

7. A storage system according to claim 5, wherein said control device specifies said fourth storage port and then outputs an identifier of said packet transfer device and an identifier of said fourth storage port to a display device included in said name management device.

8. A storage system according to claim 5, wherein if a fourth computer rather than said third computer has been configured to that said fourth computer may access said third logical volume, said control device instructs said name management device to delete said third computer from a group composed of said third computer, said fourth computer and said third logical volume, specifies said fourth storage port of said packet transfer device connected with said third computer by referring to said information about said connection relation information, instructs said packet transfer device to deregister a configuration of allowing packets to be transferred between said fourth storage port and a storage port included in said packet transfer device connected with said fourth computer, and instructs said packet transfer device to deregister a configuration of allowing packets to be transferred between said sixth storage port and said fourth storage port.

9. A storage system according to claim 5, wherein if said third computer has been configured so that said computer may access a fourth logical volume rather than said third logical volume, said control device instructs said name management device to delete said third logical volume from a group composed of said third computer, said third logical volume and said fourth logical volume, specifies said fifth storage port assigned to said third logical volume and said sixth storage port included in said packet transfer device connected with said fifth storage port, instructs said packet transfer device to deregister a configuration of allowing packets to be transferred between said sixth storage port and a storage port included in said packet transfer device connected with a storage port included in said storage system and assigned to said fourth logical volume, and instructs said packet transfer device to deregister a configuration of allowing packets to be transferred between said fourth storage port and said sixth storage port.

10. A storage system according to claim 2, wherein said control device instructs said packet transfer device so that said first and second packet transfer device ports belong to the same VLAN.

11. A storage system according to claim 10,
wherein said control device instructs said packet transfer device so that said first packet transfer is used on the VLAN; and
wherein said control device instructs said packet transfer device so that said second packet transfer port is used on two or more VLANs including the VLAN.

12. A storage system according to claim 2, wherein if said first computer is configured so that said first computer has access a second logical volume rather than said first logical volume, said control device instructs said name management device to add said first logical volume to a group composed of said first computer and said second logical volume, specifies said packet transfer device connected with said first computer by referring to said information about connecting relation, selects said first storage port connected with said storage system from said plurality of storage ports included in said specified packet transfer device, and instructs said specified packet transfer device to execute a configuration of allowing packets to be transferred among said first storage port connected with said first computer, said second storage port and a storage port included in said specified packet transfer device connected with a storage port assigned to said second logical volume.

13. A storage system according to claim 1, wherein said storage system communicates with said name management device through the use of iSNSP.

14. A storage system according to claim 1, wherein if a second computer rather than said first computer is configured so that said second computer accesses said first logical volume through the use of said first storage port included in said storage system, said control device instructs said name management device to add said first computer to a group composed of said second computer and said first logical volume, specifies said packet transfer device connected with said first storage port by referring to said information about connecting relation, selects a unused fourth packet transfer device port and specifies said second packet transfer device port connected with said first storage port from said plurality of said packet transfer device ports included in said specified packet transfer device, and instructs said specified packet transfer device to execute a configuration of allowing packets to be transferred among said fourth packet transfer device port, said second packet transfer device port and a packet transfer device port included in said specified packet transfer device connected with said second computer.

15. A storage management computer coupled to a packet transfer device and a name management device, the storage management computer comprising:
a comprising a memory;
a plurality of disk devices to configure a plurality of logical volumes under control of said control device;
a plurality of storage ports coupled with the packet transfer device and the name management device, said packet transfer device including a plurality of packet transfer device ports coupled with a plurality of computers, and wherein said name management device being configured to manage a domain including at least one of said plurality of computers and at least one of said plurality of logical volumes which is accessible from said at least one of said plurality of computers;

wherein connection relation information which describes the connections among said plurality of storage ports included in said storage system, said plurality of computers, and said plurality of packet transfer device ports included in said packet transfer device is recorded in said memory;

wherein said control device receives a computer identifier of a first computer of said plurality of computers and a logical volume identifier of a first logical volume of said plurality of logical volumes from a management terminal coupled with said storage system;

wherein by referring to said connection relation information, said control device specifies an unused first packet transfer device port of said plurality of packet transfer device ports and a second packet transfer device port of said plurality of packet transfer device ports, said first packet transfer device port being coupled with said first computer, and said second packet transfer device port being coupled with said storage system;

wherein said control device instructs said packet transfer device to allow packets to be transferred between said first packet transfer device port and said second packet transfer device port;

wherein said control device transmits said computer identifier of said first computer and said logical volume identifier of said first logical volume to said name management device to register a domain including said first computer and said first logical volume in said name management device, so that said name management device informs said first computer of logical volumes including said first logical volume which belong to a same domain as said first computer when said first computer sends an inquiry to said name management device;

wherein by referring to said connection relation information, said control device specifies a first storage port of said plurality of storage ports, wherein said first storage port being coupled with said second packet transfer port;

wherein said control device assigns said first storage port to said first logical volume to allow access to said first logical volume via said first storage port; and wherein when the control device receives a request to add a packet transfer device, the control device is configured to:

receive, from the added packet transfer device, identifiers of packet transfer ports of the added packet transfer device;

get MAC addresses of each packet transfer port of the added packet transfer device, wherein each packet transfer port is coupled to one of said plurality of storage ports;

receive, from the added packet transfer device, information about relationships between each of the MAC addresses of each of the packet transfer ports of the added packet transfer device and each of the identifiers of each packet transfer port of the added packet transfer device;

generate information representing connection relationships between said plurality of storage ports and said plurality of packet transfer ports based on the received identifiers, the MAC addresses, and the received relationship information; and add the generated information to said connection relation information.

16. A storage system according to claim 15, wherein said control device selects said plurality of storage ports when selecting unused storage ports included in said packet transfer device and selects a plurality of storage ports when selecting storage ports included in said packet transfer device connected with said storage system.

* * * * *